United States Patent
Gokalp et al.

(10) Patent No.: US 11,120,364 B1
(45) Date of Patent: Sep. 14, 2021

(54) ARTIFICIAL INTELLIGENCE SYSTEM WITH CUSTOMIZABLE TRAINING PROGRESS VISUALIZATION AND AUTOMATED RECOMMENDATIONS FOR RAPID INTERACTIVE DEVELOPMENT OF MACHINE LEARNING MODELS

(71) Applicant: Amazon Technologies, Inc., Seattle, WA (US)

(72) Inventors: Sedat Gokalp, Issaquah, WA (US); Tarun Gupta, Seattle, WA (US); Abhishek Dan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 730 days.

(21) Appl. No.: 16/008,903

(22) Filed: Jun. 14, 2018

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS

| 8,086,549 | B2 | 12/2011 | Qi et al. |
|---|---|---|---|
| 2004/0143602 | A1 | 7/2004 | Ruiz et al. |
| 2006/0160774 | A1 | 7/2006 | Parker |
| 2009/0252404 | A1 | 10/2009 | Lecerf |
| 2012/0095943 | A1 | 4/2012 | Yankov et al. |
| 2015/0091946 | A1 | 4/2015 | Wang |
| 2015/0254555 | A1 | 9/2015 | Williams, Jr. et al. |
| 2016/0162802 | A1 | 6/2016 | Chickering et al. |
| 2016/0180557 | A1 | 6/2016 | Yousaf et al. |
| 2019/0244113 | A1 | 8/2019 | Ramos et al. |
| 2020/0388358 | A1 | 12/2020 | Chen et al. |

FOREIGN PATENT DOCUMENTS

WO 2017032775 3/2017

OTHER PUBLICATIONS

Quindlen, Data-Driven Methods for Statistical Verification of Uncertain Nonlinear Systems, Doctoral Thesis, Massachusetts Institute of Technology, 2018, pp. 1-290 (Year: 2018).*
Dzyuba, Mine, Interact, Learn, Repeat: Interactive Pattern-based Data Exploration, Doctoral Thesis, Arenberg Doctoral School, 2017, pp. 1-162 (Year: 2017).*

(Continued)

*Primary Examiner* — Wilbert L Starks
(74) *Attorney, Agent, or Firm* — Robert C. Kowert; Kowert, Hood, Munyon, Rankin & Goetzel, P.C.

(57) ABSTRACT

At an artificial intelligence system, respective status indicators for classifier training iterations are determined. A visualization data set comprising the status indicators is presented via an interactive programmatic interface. A training enhancement action, based at least partly on an objective associated with a status indicator, is initiated. The action includes selecting data items for which labeling feedback is to be obtained programmatically during one or more classifier training iterations. A classification model that is trained using the labeling feedback obtained as a result of the action is stored.

20 Claims, 29 Drawing Sheets

(56) References Cited

OTHER PUBLICATIONS

Depenau, Automated Design of Neural Network Architecture for Classification, Doctoral Thesis, Aarhus University, 1995, pp. 1-148 (Year: 1995).*

Daniel Smilkov, et al., "SmoothGrad: removing noise by adding noise", arXiv:1706.03825v1, Jun. 12, 2017, pp. 10.

Unknown, "Andosa/treeinterpreter", Retrieved from https://github.com/andosa/treeinterpreter on Dec. 30, 2019, pp. 3.

Tim Bock, "How to Interpret Logistic Regression Coefficients", Retrieved from https://www.displayr.com/how-to-interpret-logistic-regression-coefficients/ on Dec. 30, 2019, pp. 8.

Edward Ma, "Interpreting your deep learning model by Shap", Retrieved from https://towardsdatascience.com/interpreting-your-deep-learning-model-by-shap-e69be2b47893 on Dec. 10, 2019, pp. 10.

Marco Tulio Ribeiro, et al, "Local Interpretable Model-Agnostic Explanations (LIME): An Introduction", Retrieved from https://www.oreilly.com/learning/introduction-to-local-interpretable-model-agnostic-explanations-lime on Dec. 10, 2019, pp. 17.

Sebastian Lapushkin, et al, "LRP Toolbox for Artificial Neural Networks 1.2.0—Manual", 2016, pp. 20.

Unknown, "Simplifying Decision Tress Interpretability with Python & Scikit-learn", Retrieved from https://www.kdnuggets.com/2017/05/simplifying-decision-tree-interpretation-decision-rules-python.html on Dec. 30, 2019, pp. 12.

U.S. Appl. No. 16/742,746, filed Jan. 14, 2020, Shikhar Gupta et al.

Gregory Druck et al "Active Learning by Labeling Features" (Proceedings of the 2009 Conference on Empirical Methods in Natural Language Processing.) Aug. 2009, pp. 81-90.

Nicholas Roy et al "Toward Optimal Active Learning through Monte Carlo Estimation of Error Reduction" pp. 1-8.

Burr Settles "Active Learning Literature Survey" Jan. 26, 2010, pp. 1-67.

Burr Settles et al "Behavioral Factors in Interactive Training of Text Classifiers" pp. 1-5.

Burr Settles et al "Multiple-Instance Active Learning" (Appears in Advances in Neural Information Processing Systems), 2008, pp. 1289-1296.

Burr Settles et al "Active Learning with Real Annotation Costs" (Appears in Proceedings of the NIPS Workshop on Cost-Sensitive Learning), 2008, pp. 1-10.

Amazon Web Services, "Amazon Machine Learning—Developer Guide", Updated Aug. 2, 2016, pp. 1-39.

U.S. Appl. No. 15/045,030, filed Feb. 16, 2016, Bibaswan Kumar Chatterjee.

U.S. Appl. No. 16/008,897, filed Jun. 14, 2018, Sedat Gokalp.

U.S. Appl. No. 16/008,903, filed Jun. 14, 2018, Sedat Gokalp el al.

\* cited by examiner

Diagnosis summary box 1502

Diagnoses: 6/13 passed

Diagnosis details list 1504

| | | |
|---|---|---|
| X | Class member stabilization: 3.0% | |
| X | Class non-member stabilization: 5.0% | |
| X | PPV Volatility: 55.5% | Prioritize? |
| ✓ | NPV Volatility: 0.2% | |
| i | PPV Trend: 3.3% | |
| ✓ | NPV Trend: -0.01% | |
| ✓ | Last 100 FPR: 0.0% | |
| ✓ | Last 100 FNR: 0.1% | |
| X | Unlabeled confusion: 2.4% | Prioritize? |
| X | Term confusion: 1.8% | Prioritize? |
| ✓ | Negative labels: 1.3K | |
| ✓ | Positive labels: 577 | |
| i | Coverage: 94.6% | |

Add new diagnosis test 1592

ARTIFICIAL INTELLIGENCE SYSTEM WITH CUSTOMIZABLE TRAINING PROGRESS VISUALIZATION AND AUTOMATED RECOMMENDATIONS FOR RAPID INTERACTIVE DEVELOPMENT OF MACHINE LEARNING MODELS

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Classification, or the task of identifying to which of a set of categories (sub-populations) a new observation belongs, on the basis of learning from a training set of data containing observations or examples whose category membership is known, is one of the most useful and often-used categories of machine learning techniques. A number of algorithms for classification of different levels of sophistication have been developed over the years, including, for example, linear classifiers such as logistic regression algorithms, Bayesian classifiers, support vector machines, decision-tree based algorithms, neural network-based algorithms and the like.

For many classification problem domains, a very large number of unlabeled observations or examples may be available, and labels may have to be assigned to at least a subset of the examples to generate an appropriate training data set for the particular classification algorithm being used. In order to assign the labels, depending on the complexity of the problem, in some cases subject matter experts may have to be employed. For example, to label some types of medical records to indicate the likely presence or absence of a disease, the assistance of medical professionals may be required. Even in scenarios where the task of distinguishing among classes is less complex, generating sufficient numbers of labeled examples may require substantial human input. Furthermore, it is sometimes hard to determine the number of training examples that may eventually be required to train a classifier that meets targeted quality requirements, since the extent to which different examples assist in the model's learning may differ. As a result of these and other factors, generating a training set of labeled examples may often represent a non-trivial technical and resource usage challenge.

BRIEF DESCRIPTION OF DRAWINGS

FIG. 15 illustrates example interactive interface elements that provide information about a set of selected diagnosis tests pertaining to classifier training completion, according to at least some embodiments.

Figure 1:
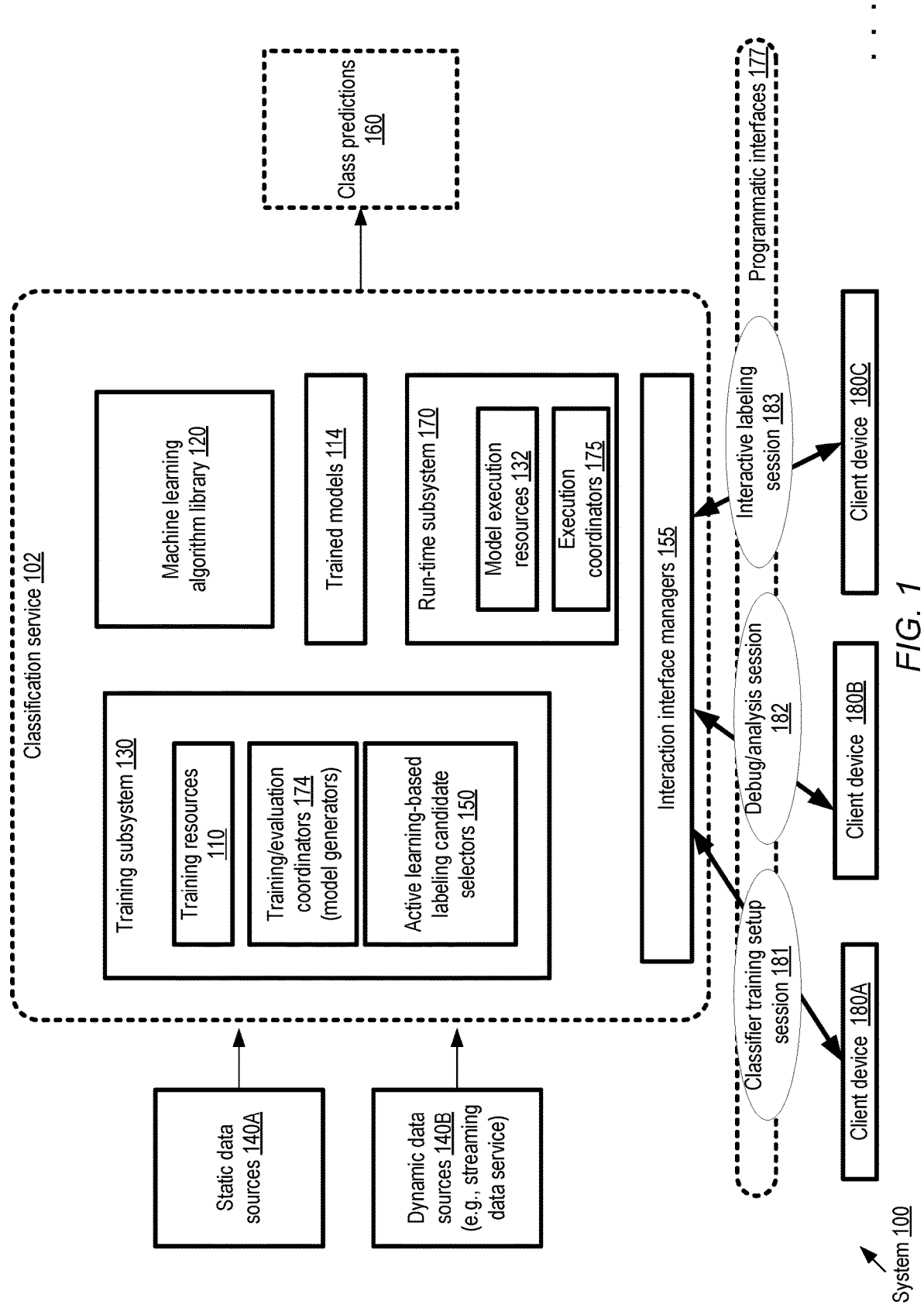
FIG. 1 illustrates an example system environment in which a classification service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for efficient training of machine learning models such as classifiers using an automated workflow comprising intelligently guided labeling feedback sessions are described. In some embodiments, easy to use interactive programmatic interfaces may be implemented to simplify and speed up the process of obtaining labels for data items that are deemed likely to contribute to faster learning. In various embodiments, customizable visualizations of training progress may be provided, and a number of techniques involving the provision of automated recommendations leading to rapid development of the models may be implemented. The provision of labeling feedback in a systematic manner so as to enable rapid development of machine learning models may be referred to as "teaching" the machine learning system in various embodiments, and the set of tools and interfaces used for managing the training of the models may be referred to as an interactive machine training tool in such embodiments. By way of example, classifiers or classification models, in which individual data items are categorized into one of a discrete set of pre-defined classes by the machine learning models, are used to illustrate various aspects of the techniques and interactive interfaces used for speeding up machine learning training procedures in much of the following description. Note that similar approaches may also be used for other types of machine learning problems, such as regression-type problems, with similar levels of success in at least some embodiments.

The techniques and algorithms described for efficient development of models such as classifiers may be implemented as part of a network-accessible machine learning service or a network-accessible classification service in at least some embodiments. Such a service may, for example, help to streamline various stages of the workflow of building classifiers, such as data collection through training iterations, evaluation and deployment of the models in various embodiments. The service may support the automation of, among other parts of the workflow, the following steps in at least some embodiments: (a) gathering of raw data items pertinent to a particular classification problem, (b) active learning, in which unlabeled documents may be ranked in order of potential training/learning benefit or impact, (c) user-controlled teaching, in which respective label providers can focus their labeling efforts on subspaces of the data items, (d) optimized training iterations, in which the service may try a variety of models and/or hyper-parameter combinations and select the best among the models and hyper-parameter combinations, (e) justification-based debugging and analysis of the models, (f) continuous performance evaluation as training iterations proceed, (g) plug-in support for different types of input data items or documents, feature processing, etc., (h) customizable export of data, including labels, intermediate results, final results and the like for consumption by other automated systems and/or (i) customizable diagnosis and tracking of trends in various training progress metrics, and the like.

As one skilled in the art will appreciate in light of this disclosure, certain embodiments may be capable of achieving various advantages, including some or all of the following: (a) reducing the overall amount of CPU, memory, networking and storage resources that have to be utilized for developing machine learning models of a desired quality level, even in scenarios in which hundreds of millions of unlabeled data items or observations pertaining to a given machine learning problem are available, (b) enhancing the user experience of at least three types of users interacting with an automated machine learning environment: individuals or entities that specify the machine learning problems to be solved using machine learning models, label providers for data items used for training models, and data scientists or machine learning experts who may wish to analyze or debug the models being developed, (c) simplifying the presentation of potentially complex combinations of metrics and analysis results (for example by incorporating multi-dimensional information regarding the distribution of predicted classes within a simple two-dimensional ribbon that takes up only a small portion of the user interface, or by using color shades/intensities to visually indicate/highlight significant attributes relevant to respective classes) to enable even non-experts in machine learning to interpret the available information, and/or (d) reducing the resources needed by identifying label providers that are experts at specific aspects of one or more machine learning problem domains, thereby further reducing the overall time and computational resources needed to train machine learning models. In some embodiments, the resources and/or time required to generate a classifier may be reduced by orders of magnitude relative to at least some conventional techniques.

According to some embodiments, a system may comprise one or more computing devices of an artificial intelligence-based classification service. The computing devices may perform one or more interactive classifier training iterations until a training completion criterion is met. The set of classes into which data items are eventually to be categorized for a given classification problem, and for which respective labels may be required for at least some data items to be used as members of the classifier training data, may be termed "target" classes in at least some embodiments. Binary as well as multi-class classification efforts may be supported by the classification service in at least some embodiments. In various embodiments, a given training iteration may include obtaining, via an interactive programmatic interface, respective class labels for at least some data items of a particular set of data items identified as candidates for labeling feedback in a previous interactive training iteration. At least some class labels may be obtained asynchronously with respect to the start or end of the given training iteration in some embodiments—that is, individuals selected as label providers may submit respective batches of one or more labels at any convenient time relative to training iterations being performed by the computing devices. The given training iteration may, in some embodiments, also comprise generating, using one or more classifiers, classification predictions corresponding to a test set of data items. An individual classifier may be trained using a training set that includes at least a portion of a data item of the particular set for which labels were obtained in such embodiments. Based at least in part on an analysis of the classification predictions, an active learning algorithm and/or on an intelligent sampling algorithm, another set of data items may be identified as candidates for labeling feedback for a subsequent training iteration in some embodiments. In at least one embodiment, thus, at least three types of operations may be performed during a given training iteration: (a) labels may be collected and accumulated asynchronously for some set of data items that were selected for labelling feedback during some earlier iteration, (b) an updated version of one or more classifier may be trained using a training set which includes labels obtained earlier and (c) a new set of labeling candidates may be selected based on the results obtained from the updated version of the classifier(s).

After the overall training completion criteria have been satisfied, a particular classifier (which may be referred to as the "published" or "final" classifier) may be used to obtain classification predictions with respect to one or more data items that were not used for the training iterations, and the obtained predictions may be provided to one or more destinations in various embodiments. The published classifier that is used to make post-training classification predictions may also be trained using at least some data items whose labels were obtained from the label providers. In at least some embodiments, at least two types of models may be trained iteratively: (a) a set of one or more models whose output with respect to a training set is used to select candidates for labeling feedback for subsequent training iterations (e.g., using an active learning algorithm which uses variance in predictions among the different models for a given data item), and (b) a final (with respect to a current training iteration) model whose results are used to evaluate the overall progress towards the training objectives, to identify attribute values that are correlated with membership in different classes, and so on. The latter type of model may be termed the "iteration-final" model in some embodiments.

A variety of training completion criteria may be employed in different embodiments—e.g., in some embodiments, training may be considered complete after acceptable results are obtained on a set of diagnosis tests, or when values of selected metrics values meet threshold criteria, while in other embodiments, the training iterations may simply be terminated when a budget of resources is used up.

According to at least one embodiment, a "committee" comprising a plurality of classifiers may be used to identify candidates for labeling feedback during a given training iteration. For example, with respect to a set of data items (D1, D2, Dp), respective class predictions may be obtained from each of several classifiers (C1, C2, Ck), where each of the classifiers may have been trained using a different training set in one such embodiment. A measure of variation among the predictions generated by the different models may be computed, and those data items whose variation measures meet a threshold criterion may be selected as candidates for labeling feedback in the next training iteration in some embodiments. Such a variation-based selection of candidates for labeling feedback may be based, for example, on the intuition that if the different classifiers are unable to "agree" on the class of a given data item, that data item is more likely to be difficult to classify, and therefore more likely to help improve the quality of the model once it is labeled and included in a training set for subsequent training iterations. In at least one embodiment, a k-fold cross validation algorithm may be used to select candidates for labeling feedback. In at least one embodiment, instead of or in addition to using such a variance metric to rank data items as candidates for labeling feedback, other metrics (such as proximity of a predicted classification score to a class boundary) may be used, and/or other types of active learning approaches may be employed.

In some embodiments, a pool of label providers may be selected, and each such label provider may be presented, via an interactive interface such as web page, with a respective set of data items for which labeling feedback is desired. Such label providers may issue respective "submit" requests to provide batches of one or more labels to the computing devices where training sets for subsequent iterations are identified. Different label providers may submit batches of labels asynchronously with respect to each other, and asynchronously with respect to the start or end of the training iterations, in at least some embodiments. The set of newly-labeled (or re-labeled) items that are to be included in the training sets for the next iteration of model training may be accumulated as more submissions are received from the label providers in such embodiments. That is, in such embodiments, a label provider need not wait for a training iteration to complete before submitting the next batch of labels, and the back-end resources at which the models are being trained need not wait for any particular batch of label submissions—each side may proceed asynchronously with respect to the other, as long as more labels are gradually provided over time.

In some embodiments, a number of candidate data items selected for labeling feedback, e.g., using a committee of models, may be subdivided into smaller subsets, e.g., comprising N data items each, and only an individual subset may be presented to a label provider for feedback at a time. For example, from among 200 data items for which labels are desired, 10 items may be presented to a given label provider at a time, so as not to overwhelm the label provider with too many items at once. After a given subset is labeled and submitted, the next subset may be presented to the label provider. The label providers may, in at least some embodiments, be able to specify a desired batch size (the number of candidates that are presented to them for labeling feedback at a time) via a programmatic interface.

In at least one embodiment, the label providers (and/or other users) may be able to provide additional guidance, in the form if filtering criteria, to the classification service, to determine the set of data items that are presented to the label providers via an interactive interface. For example, label providers may submit search predicates or queries (e.g., sets of search tokens or attribute values), class labels, and the like to be used to filter the data items in some embodiments. In at least some embodiments, the classification service may suggest or provider recommended search terms to be used for filtering, e.g., based on analysis of the correlations between different terms and class membership, or based on the presence of the search terms in data items that have been found to be more difficult to classify than others.

As mentioned earlier, in various embodiments, several steps of the workflow for training classifiers may be automated and simplified by the classification service in some embodiments. According to some embodiments, the classification service may implement one or more programmatic interfaces, such as an interactive web-based interface, a set of application programming interfaces (APIs), command-line tools, graphical user interfaces and the like, that can be used to initiate one or more of the steps. In one embodiment, a client of the service (such as an individual authorized to initiate classifier development) may submit a programmatic request via such an interface, indicating a data source from which various input data items can be obtained, and/or a classification objective (e.g., an explanation of how data items are to be categorized among a specified set of categories). The classification service may obtain or extract data items from the data source for different training iterations, and present an indication of the classification objective to a label submitter to enable the label submitter to perform his/her labeling duties in various embodiments. In at least some embodiments, the programmatic interfaces may be used to specify feature processing operations to be applied to the data items, such as various vectorization algorithms to be used to generate feature vectors from the raw versions of the data items, which can then be consumed as input by the classifiers. The types of models (such as logistic regression models, neural network models and the like) that are to be developed for classification, together with various hyperparameter settings to be tried, may also be specified via programmatic interfaces in at least some embodiments.

In at least one embodiment, the classification service may employ one or more label providers for a given classification problem, such as subject matter experts with respect to the problem domain, volunteers, or a group of individuals who have been identified via a web-based task marketplace (e.g., a web site at which individuals may register their interest in performing tasks such as labeling data items for a fee). The cardinality of the set of label providers may be selected based on various factors in different embodiments, and may change over time as the training iterations proceed in at least one embodiment. The factors may for example include the size of the data set available, the expected variation among the characteristics of the data items, the type of model being developed (e.g., larger training data sets may be needed if a neural network-based model is being generated than if a logistic regression model is being generated), a desired label provider pool size indicated by a requester for the classifier, a budget available for labeling, and so on. In at least some embodiments, as the training iterations proceed, the interactions with individual label providers may be analyzed, e.g., to determine which label providers are more proficient in identifying particular classes of data items, to determine the rate at which individual label providers are able to generate labels, and so on. In at least some embodiments, the classification service may enable some users to view the sets of labels provided by an individual label provider, and/or one or more metrics pertaining to label submission by the label provider such as the rate at which labels are generated, a comparison of the labels with respect to predicted classes, and so on. Based on the characteristics of individual labelers revealed by analysis of their interactions with the classification service, in at least one embodiment, respective groups of feedback candidate data items may be identified and presented for different label providers. For example, in a scenario in which data items are to be classified as being members of one of three categories CatA, CatB and CatC, a particular label provider L1 may be better at identifying CatA data items than CatB data items, so if more examples of CatA data items are needed for the training iterations, more candidate data items may be directed to L1 than to other label providers of the pool being used. In at least one embodiment, software programs may be included among label providers—that is, label providers may not be limited to humans.

According to some embodiments, the classification service may be able to detect correlations between specific input features and different target classes into which data items are being categorized. Such correlations may be used to highlight specific features (such as text tokens, images and the like) in the interactive labeling sessions with label providers in some embodiments, potentially assisting the label providers in their categorization and labeling decisions. In at least one embodiment, correlation metrics may also be used to select feedback candidate data items. In one such embodiment, another machine learning model (different from the classifiers being trained) may be generated to identify a correlated-with-classification-variation subset of properties of individual data items, such that a particular group of properties of the subset has a correlation above a selected threshold with a variation in classification predictions generated for data items that have that particular group of properties. For example, it may be discovered using such a model that if a given data item D1 has properties P1, P2 and P3, the variation in classification predictions generated for D1 by a committee of classifiers tends to be higher than a threshold T, with a positive correlation between the presence of the three properties and the high variation in the predicted class. Having determine such a subset of correlated with-classification-variation properties, in some embodiments, the classification service may use the subset to identify at least some candidates for labeling feedback for a particular training iteration.

Note that at least in some embodiments, an initially-provided label for a data item may not necessarily be permanent—that is, a labeling feedback candidate data item selected by the classification service may already have a label, but the label may be changed based on reconsideration by a label provider. The classification service may, for example, be able to identify possible candidates for label reconsideration based on the presence of features that are correlated highly with a class other than the one currently assigned to the data item, and present such data items via an interactive interface that indicates why the current labels may be incorrect. In at least some embodiments, one of the metrics provided by the classification service may include an indication of a number of provided labels (e.g., in some recent time interval or during some recent training iteration)

that differ from the predicted classes for the data items for which the labels were provided.

A number of different types of visualization data sets and corresponding interactive interface elements may be generated in various embodiments by the classification service for presentation to clients on whose behalf the classifiers are being developed, presentation to label providers, and/or presentation to data scientists or other entities interested in analyzing/debugging the classifiers, following the classifier training progress, and so on. According to some embodiments, a guided labeling feedback session may be initiated between a label provider and a model trainer or training coordinator (e.g., a component of the classification service responsible for developing a requested classifier) by one or more computing devices of an artificial intelligence-based classification service. During such a session, the computing devices may cause one or more visualization data sets to be presented to the label provider via an interactive programmatic interface, including a particular visualization data set which comprises an ordered representation of one or more data items for which labeling feedback is requested. The order in which the data items are arranged may be based at least in part on an estimated rank, with respect to one or more metrics such as an estimated learning contribution, associated with including respective ones of the one or more data items in a training set for one or more training iterations of one or more classification models in some embodiments. In at least one embodiment, a representation of the first data item may indicate a particular attribute of the first data item whose correlation with a particular predicted class exceeds a threshold—for example, features (such as text token sets) of the input data that are highly correlated with different classes may be highlighted in different colors in some implementations.

A guided labeling feedback session may also comprise obtaining, by the one or more computing devices, respective indications from the label provider via the interactive programmatic interface of (a) respective labels for one or more data items represented in the one or more visualization data sets and (b) a filter criterion to be used to select one or more other data items to be presented via the interactive programmatic interface to the label providers in some embodiments. A variety of filter criteria may be specified in different embodiments, such as search terms or query predicates (either generated by the label provider, or recommended by the classification service and approved by the label provider), class labels (e.g., either the names of classes into which the data items are to be categorized, or labeler-created temporary class labels as discussed below), properties of data items such as their data sources, dates of data item creation/collection etc. In at least one embodiment, when providing a label for a particular data item, the label provider may indicate a justification for the label (e.g., the presence/absence of some set of features, the apparent similarity with another similarly labeled item, etc.), and such justification information may be stored and/or displayed later by the classification service. The labels provided in the session may be used to train a classification model in various embodiments; after the model is trained, its classification predictions with respect to various data items may be provided to one or more destinations (such as a client of a classification service, or a program which consumes the output generated by the classification service).

A number of interactive interface elements may simplify and/or guide the tasks performed by label providers in different embodiments. For example, various aspects of the statistical distribution among classes assigned to data items, resulting from the set of training iterations that have been completed thus far, may be presented visually to the label providers in some embodiments. Such interfaces, such as a zoom-in-capable ribbon interface described below, may enable the labelers to examine or re-examine data items that are designated as belonging to a particular class with a classification score within a particular range, to examine data items that have not yet been assigned a class with a desired level of confidence, and so on. In effect, in one embodiment, a label provider may indicate an "examples-requested" region of the statistical distribution as part of the filtering criteria to be used to present additional data items to the label provider. Portions of such an interface may be used to demarcate class boundaries in some embodiments—e.g., in a scenario in which binary classification is being performed, boundary markers may be used to provide a visual indication of the fraction of the data items that have been designated as belonging to each of the two classes being considered, and the fraction that have not yet been classified with a targeted confidence level.

Visualization data sets pertaining to selected training status indicators and diagnosis tests may be generated and presented via interactive interfaces in at least some embodiments. According to some embodiments, one or more computing devices of a classification service may determine, corresponding to individual ones of a plurality of classifier training iterations, respective sets of status indicators. A first set of such status indicators may, for example, include (a) a representation of a fraction of a first set of data items for which classification results that have been obtained in a particular classifier training iteration meet a threshold criterion and (b) a representation of a stability trend of a particular training metric over a plurality of classifier training iterations. A training data set of the particular classifier training iteration may, for example, comprise at least some labels obtained in response to a presentation of one or more data items of the first set as candidates for labeling feedback in various embodiments. In response to a programmatic request, a visualization data set representing at least one set of status indicators may be presented via an interactive programmatic interface in one embodiment. A presentation of the visualization data set may, for example, include an indication, within a first display, of (a) respective values of a plurality of selected status indicators as of a first classifier training iteration and (b) a plurality of values of an individual status indicator as of respective successive classifier training iterations in some embodiments—that is, the display may make it easy to see the values of several different metrics as of a given training iteration, and also make it easy to identify trends in any one of the status indicators or metrics.

In some embodiments, one or more training enhancement actions may be initiated (e.g., after the visualization data set has been presented, or asynchronously with respect to the presentation of the visualization data set) to meet one or more goals or objectives associated with or expressed using the status indicators. For example, one such training enhancement action may comprise selecting, by the computing devices based at least in part on an objective associated with a particular status indicator, one or more data items for which respective labeling feedback is to be obtained programmatically in a subsequent classifier training iteration. Other training enhancement actions may include, for example, directing a larger number of feedback candidate data items to specific label providers selected based on learning about the capabilities of the different label providers, modifying one or more hyper-parameters, and the like. Eventually, e.g., after one or more training objectives have been met, a trained version of a classifier (which has been trained using a data set that includes labels obtained as a result of a training enhancement action) may be used to obtain and provide classification predictions for various data items.

According to at least some embodiments, programmatic interfaces such as interactive web pages, graphical user interfaces, command line tools or APIs may be used by clients or users of the classification service to indicate a set of training metrics and associated objectives, for which corresponding status indicators included in the visualization data sets may be determined. Any desired combination of a wide variety of metrics may be indicated via the programmatic interfaces in different embodiments, depending on the type of classification problem (binary versus multi-class) being addressed: such as (among others) positive predictive value (PPV), negative predictive value (NPV), accuracy, prevalence, precision, false discovery rate, false omission rate, recall, sensitivity, diagnostic odds ratio, coverage, and/or an F1 score. Respective objectives may be defined for the different metrics via the programmatic interface, and the training status with respect to the objectives may be indicated in the visualization data set in at least some embodiments. In at least some cases, the progress indicator with respect to a given metric may be a value on a continuous range, such as "X % of objective achieved as of training iteration I12". In other cases, the progress indicator may be binary, such as "Target X not achieved as of training iteration I22". In at least some cases, the status indicators may be defined in terms of trends, as in the case where stability with respect to a given metric is used as a progress indicator.

In various embodiments, new labeled examples may be added to training sets as the training iterations proceed, e.g., as new batches of labels are submitted by label providers in guided labeling sessions of the kind discussed above. In some embodiments, in response to input received via an interactive programmatic interface, the classification service may provide an indication of a difference in training data sets between one training iteration and another, which may help data scientists or other analysts to understand why some status indicators have changed between the iterations. In at least one embodiment, the classification service may itself perform an analysis of the difference in training data sets between a pair of training iterations, and provide an indication of one or more candidate explanatory factors associated with a difference in training metrics between the pair of training iterations. Such explanatory factors may include, for example, a histogram or some other summarization of significant token sets or terms in the training sets used for different iterations—if the significant tokens are very different from one iteration to another, this may help explain the differences in the metrics.

In at least one embodiment, with respect to a subset of training metrics and associated training status, a set of diagnosis tests may be defined to help determine when the training procedure has met its overall objectives and should therefore be terminated. In effect, a given diagnosis test may provide a binary indicator of whether a given metric's status has met a particular threshold condition for publishing or finalizing the classifier being trained, and the aggregation of multiple diagnosis tests may provide an indicator if whether all the threshold conditions selected for the classifier with respect to a plurality of metrics have been met. Note that not all the metrics whose status indicators are displayed may have associated binary diagnosis tests in at least some embodiments: users may view status indications of an arbitrary collection of metrics, which may differ from the collection of metrics being used for diagnosis tests. In some embodiments, a user may indicate one or more diagnosis tests to be used via a programmatic interface to the service; in other embodiments, a default set of diagnosis tests may be selected by the classification service itself, e.g., based on the type of classification problem being solved, and the user may add/remove tests from the default set of desired. Up-to-date summaries or detailed results of the diagnosis tests may be provided via interactive programmatic interfaces upon request in various embodiments. In some embodiments, in situations where a particular diagnosis test results is unsatisfactory (e.g., if a corresponding metric has not met a targeted threshold), a recommended remedial action (such as adding more labeled examples of a particular class to the training set) may be indicated by the classification service via the programmatic interface. In one embodiment, an explanation of a remedial action may be provided as well. In some embodiments, a user may approve a recommended remedial action via an interactive programmatic interface, and in response to determining that the remedial action has been approved, the remedial action may be initiated by the classification service.

In some embodiments, a range of automation levels may be supported with respect to the actions taken by the classification service without corresponding requests having to be submitted by a user during various stages of a workflow for classifier development, relative to the actions taken in response to user guidance. For example, a user may choose a "fully automated" mode of operation, in which case remedial actions with respect to diagnosis tests (as well as other optimization operations) may be initiated automatically by the service, or a "manual" mode of operation, in which the user may have to select and/or approve remedial actions and other optimizations. Similarly, in a fully automated mode, decisions regarding the types of classification algorithm to be used, the criteria to be used by the service to terminate training, and the like, may be made largely or entirely by the service.

In some embodiments, one or more data items may be labeled as members of a particular class, but the classification service may predict that the data items belong to a different class in at least some training iteration—that is, the conclusions reached by the classification service in such an iteration regarding class membership of one or more data items may differ from those of the user. For example, it may be the case that during training iteration T5, the service predicts that item 14 belongs to class C1, and a label provider or other user may label the item 14 later as belonging to class C2. In at least some embodiments, an indication of such a labeling-versus-prediction contrast may be provided via an interactive interface, e.g., enabling a user to reconsider their labeling decision with respect to such data items. In at least one embodiment, the service may provide a justification for the prediction—e.g., by highlighting or otherwise indicating token sets or attributes of the data items that are correlated with the predicted class. The user may decide to confirm the original labeling decision, or change the label to match the predicted class. A number of additional features and capabilities that help to speed up the process of training machine learning models in various embodiments are discussed below in further detail.

Example System Environment

FIG. 1 illustrates an example system environment in which a classification service may be implemented, according to at least some embodiments. As shown, system 100 may comprise resources and artifacts of a classification service 102, including a training subsystem 130 and a run-time subsystem 170 in the depicted embodiment. Raw data items to be used to train models and/or to exercise trained models 114 may be extracted from a variety of data sources in some embodiments, including static data sources 140A and dynamic data sources 140B (such as streaming data services which collect and/or emit data items on an ongoing or continuous basis, e.g., based on signals collected at various types of sensors or other devices). A variety of machine learning algorithms may be available at library 120 for use during various stages of training, evaluation and/or execution of classifiers for numerous types of problem domains, including for example neural network based algorithms, logistic or other regression algorithms, tree-based algorithms such as Random Forest algorithms and the like.

The classification service 102 may implement a collection of programmatic interfaces 177, including for example web sites or pages, graphical user interfaces, command line tools and/or APIs, which can be used for interactions between various types of users and the service 102 in various embodiments. At least three broad categories of programmatic user interactions may be supported in the depicted embodiments: classifier training setup sessions 181, debug/analysis sessions 182 and interactive labeling sessions 183. In training setup sessions 181, in some embodiments an authorized user such as a business unit or department manager or some other stakeholder interested in classifying a collection of data items obtained from data sources 140 may use a client device 180A (e.g., a desktop, laptop, tablet computing device, smart phone or the like) to initiate the process of training one or more classifiers, e.g., by submitting a training request to the service 102. In debug/analysis sessions 182, in some embodiments data scientists, subject matter domain experts and the like may use client devices 180B to examine the progress of classifier training, to modify various parameters or hyper-parameters based on observed metrics, status information and the like. In interactive labeling sessions 183, in various embodiments one or more label providers may be presented at client devices 180C with candidate data items for which labeling feedback is requested, and such label providers may submit labels for the candidate items, submit filtering requests to view and/or label additional data items, and so on. Intuitive, easy-to-use feature-rich customizable interactive programmatic interfaces 177 may be provided for each of the three categories of user sessions indicated in FIG. 1 in various embodiments; details of various aspects of the interfaces are provided below. Note that a single user session need not necessarily be limited to one type of interaction in at least some embodiments—e.g., a single user may setup classifier training, provide labels when needed, and debug/analyze the progress of the training via the same session. At the classification service 102, one or more interaction interface managers 155, implemented using one or more computing devices, may receive messages submitted programmatically from the client devices 180, pass on internal versions of the communications to other components of the service 102, receive internal responses from such components, and provide external responses to the messages via the programmatic interfaces 177 to the users as needed.

In many cases, at least some of the raw data items generated at and available from data sources 140A and 140B pertaining to a particular problem to be addressed using a classifier may be unlabeled. In order to train a classifier, a sufficient number of the data items may have to be labeled in various embodiments, and the exact number that is ultimately sufficient to attain a desired classification quality may vary with the data set, the classification algorithm(s) being used and the subtlety or difficulty of the classification problem domain. In general, since the labeling task may require sophisticated human judgments, this phase of obtaining the training data set can be quite time consuming and resource intensive—for example, for some neural network based algorithms, millions of data items may potentially have to be labeled. In various embodiments, the training of a classifier (or an ensemble of classifiers) developed for a particular classification problem may be accelerated at the service 102 using the following high level approach.

Initially, after the set of classes into which the data items are to be categorized is identified (e.g., in a training setup session 181), a small subset of data items may be labeled using a fairly rough approach (using, for example, simple keyword-based labeling or even random labeling) in various embodiments to obtain an initial training set. Then, a sequence of training sessions may be initiated in at least some embodiments, in each of which a current version of one or more classifier models (such as a committee of models trained on a respective random subset of the currently available training set) may be trained, e.g., by training/evaluation coordinators 174 using training resources 110 of subsystem 130. Training/evaluation coordinators 174 may be referred to as model generators in some embodiments. A set of interactive guided labeling sessions 183 may be set up (e.g., between model generators and label providers, with the help of interaction interface managers 155) to gradually expand the training set as the training iterations proceed in various embodiments. Analysis/debug sessions 182 may be used in some embodiments to help initiate various training enhancement actions based on various training status indicators, such as increasing the number of labeling candidates that are likely to belong to a subset of the classes being considered, adding new labeling sessions, etc.

The results obtained in a given training iteration may be utilized, e.g., by active learning-based labeling candidate selectors 150, to identify an additional set of data items for which labeling feedback is expected to help improve the classifiers more quickly than other data items, and such candidates may be presented to label providers in the interactive labeling sessions. The active learning methodology may be employed in the depicted embodiment based on the intuition that some data items can provide more substantive contributions to the learning of the models than others—for example, labeled data items that are very easy to classify may not help the model's learning very much, while data items that are close to class boundaries and are therefore more difficult to classify may be more useful for accelerating learning. Any combination of one or more active learning algorithms, including for example query by committee, uncertainty sampling, expected model change algorithms, expected error reduction algorithms, variance-reduction algorithms, and/or density-weighted algorithms, may be used in various embodiments. The training iterations, the presentation to label providers of the candidate data items, and the submission of additional or corrected labels by the label providers, may all be asynchronous with respect to one another in various embodiments—e.g., the presentation of candidate data items may not have to wait for a training iteration to complete, and label providers may submit labels and/or filtering requests at any time, independently of when a training session starts or ends. The overall objective of the iterative interactive training procedure may in various embodiments comprise quickly gathering, given the set of label providers and budget available, a reasonable training data set to achieve a desired level of quality for the classifier(s) being generated, while simplifying the user experience of the various entities interacting with the service.

In at least some embodiments, during a given training iteration, classification predictions corresponding to a test set of data items may be generated from each of a plurality of classifiers, where individual classifiers of the plurality are trained using a training subset that includes labels obtained from the label providers. The training data sets of the classifiers may differ from one another in some embodiments. Based on an analysis (e.g., a variance analysis) of the classification predictions generated by the different classifiers, filtering criteria indicated by the label providers, and/or a sampling algorithm, a new set of candidate data items for labeling feedback may be identified, and labels obtained for the new set may be used to gradually expand the training sets available for classifiers over time in various embodiments. Any of a variety of active learning algorithms and techniques (some of which may not necessarily be variance based) may be employed in different embodiments to help select labeling candidates likely to be more useful for learning than others. In one embodiment, several different classification algorithms may be employed with the same training data set, and the results of the different algorithms may be compared with one another, with items whose class predictions differ widely among the algorithms being designated as difficult to classify and therefore good candidates for labeling feedback.

In at least some embodiments, in addition to a group of classifiers used to help identify the next set of labeling feedback candidates, a final (with respect to the current training iteration) classifier may also be trained in a given iteration, e.g., using all the labeled training data available, and the results obtained from the final-with-respect-to-the-current-iteration classifier on a test set may be used to evaluate whether quality-related training completion criteria have been met. Of course, training iterations may also be terminated for reasons other than achieving a desired level of classification quality with respect to various measures— e.g., training may be concluded when a budget of resources or time is exhausted in some embodiments, even if all the classification quality goals have not been reached.

In various embodiments, presentation of visualization data sets via intuitive interactive interfaces may play a key role in accelerating the development of high-quality classifiers. In the labeling sessions 183, for example, labeling candidates items may be presented in an order based on respective ranking of the data items with respect to contribution towards attaining one or more training objectives in some embodiments, so that if a label provider is only able to provide a few labels, the most useful labels (with respect to learning benefit/contribution) are more likely to be obtained first. Token sets or other features that are highly correlated with membership in a particular class may be highlighted to help label providers make their decisions in some embodiments, and interface elements that enable label providers to narrow down the set of data items they wish to inspect and/or label may be provided in various embodiments. With respect to analysis and/or debugging of the classifiers as they are being trained, interface elements that enable users to specify or modify a set of metrics to be tracked, to display the change in metrics value or status over time, to determine how many diagnosis tests have been satisfied, and/or to approve or specify training enhancement actions associated with metrics of interest may be provided in various embodiments. Additional examples and details of various interface elements that may help different categories of users to understand, guide and speed up the training of classifiers are provided below.

After training is concluded, in at least some embodiments the trained models 114 (e.g., the most recent version of the final classifier) may be published or accepted for production use. Execution coordinators 175 of the run-time subsystem 170 may use model execution resources 132 to run the trained models 114 to generate class predictions 160 corresponding to various data items that were not part of the training sets in the depicted embodiment. In various embodiments, one or more computing devices may be employed for individual ones of the components shown in FIG. 1, such as the training subsystem, the run-time subsystem, the interaction session managers, and/or the labeling candidate selectors.

Training Subsystem

Figure 2:
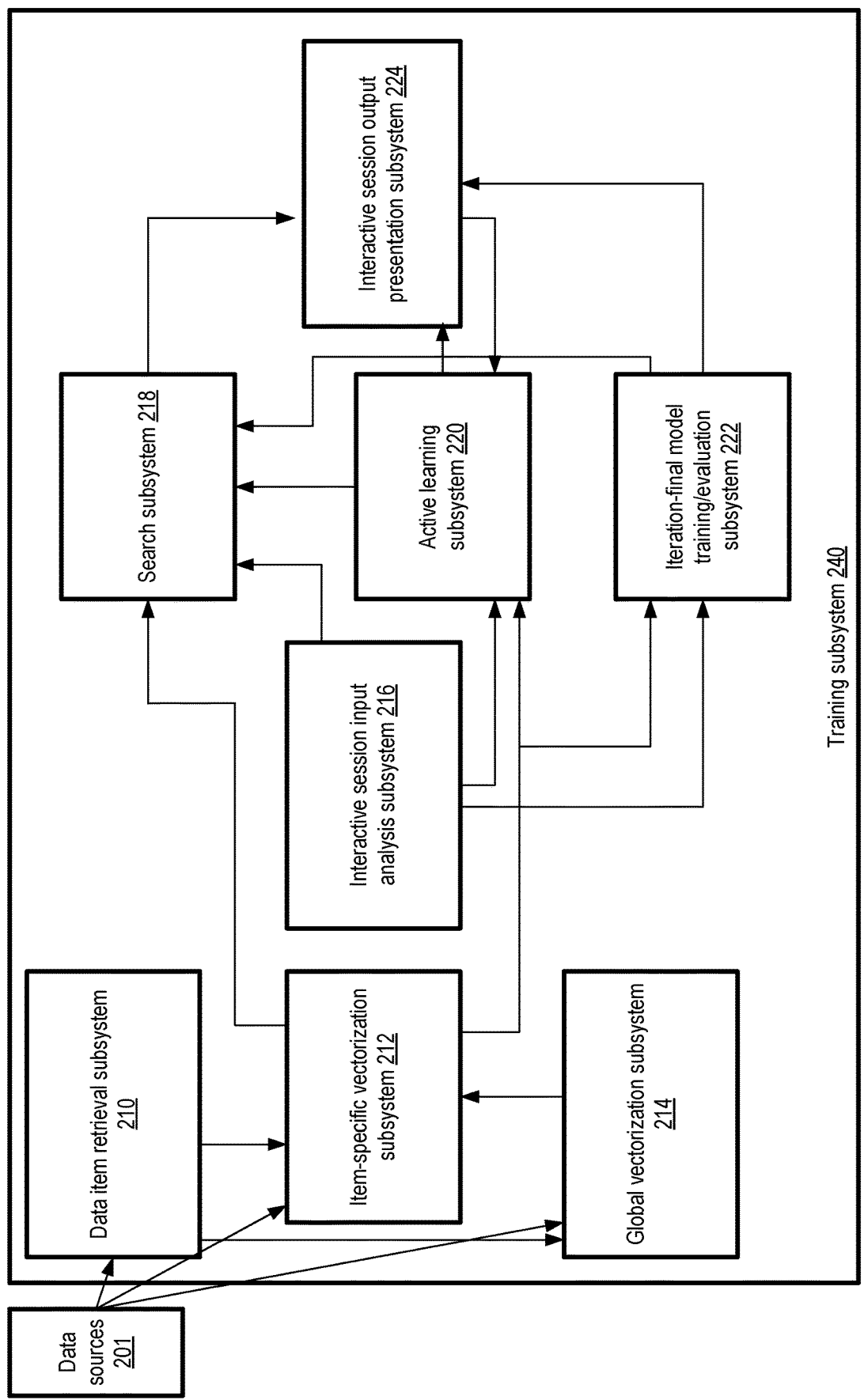
FIG. 2 illustrates example components of a training subsystem of a classification service, according to at least some embodiments.

FIG. 2 illustrates example components of a training subsystem of a classification service, according to at least some embodiments. In the depicted embodiment, training subsystem 240 (which may be similar in capabilities and features to training subsystem 130 of FIG. 1) may comprise, for example, a data item retrieval subsystem 210, an item-specific vectorization subsystem 212, a global vectorization subsystem 214, an interactive session input analysis subsystem 216, a search subsystem 218, an active learning subsystem 220, an iteration-final model training/evaluation subsystem 222, and an interactive session output presentation subsystem 224. In other embodiments, the training subsystem may comprise other combinations of subcomponents.

In various embodiments, the data sources 201 whose items have to be categorized may comprise either static collections of data items, dynamic (e.g., streaming) collections of data items, or a combination. For example, in some large-scale e-retailing environments, the data sources may comprise entries of an expanding catalog, and a particular binary classification task to be accomplished may comprise which items of the catalog are affected by a particular legal or regulatory requirement. The data item retrieval subsystem 210 may be responsible for extracting data items from a variety of data sources 201 in various embodiments, e.g., employing data-source specific APIs, performing some level of normalization on the raw data items retrieved, and so on. A data retriever may be defined in several ways in the depicted embodiment—e.g., by providing a lookup predicate to be used to search or filter a data source, by indicating parent nodes in a previously-created hierarchy of data items (such that data items corresponding to children nodes of the parent nodes should be retrieved), by indicating other classifiers whose output is to be used as input for a new classifier, and so on. As with other components of the classification service, the data item retrieval subsystem may be designed to be extensible and customizable in various embodiments—e.g., users may add modules to access different types of data sources as desired, to utilize desired data source access APIs, to perform different types of normalization on raw data item contents, and so on.

In at least some embodiments, at least some of the attributes or elements of raw data items (e.g., text tokens, images, other unstructured fields and the like) may have to be transformed into vectors before being used as input for classification or other machine learning models. Such transformations may represent one example of feature processing performed at the classification service, e.g., based on user requests or automatically. In the depicted embodiment, two types of vectorization may be performed—global vectorization at subsystem 214, in which properties or attributes common to all data items retrieved for a particular classification problem may be transformed into vectors, and item-specific vectorization performed at subsystem 212, in which attributes that may not be shared among all the data items may be vectorized and/or combined with the outputs of the global vectorization subsystem 214 to generate the final feature vectors for individual data items. Common components of vectorizers (used at either the global level or for item-specific vectorization) may include, among others, tokenizers for text, case normalizers, n-gram extractors, term-frequency-inverse-document-frequency (tfidf) generators, 1-hot encoders, bucket generators for discretizing continuous-valued numerical attributes, and the like in various embodiments. In some embodiments, the classification service may provide default implementations of various types of vectorizers, and users may customize or extend vectorizers as desired. A matrix comprising feature vectors for a plurality of data items may be prepared as output of the vectorization subsystems in some embodiments. In at least one embodiment, attributes extracted from individual data items may be provided as input to a search subsystem 218 from the vectorization subsystems, where for example an inverted index may be created on the attribute values to enable filtering based on the attribute values.

Input generated during interactive labeling sessions by various label providers and/or by other users may be examined at the session input analysis subsystem 216 in the depicted embodiment. The input may comprise, for example, the labels designated by the label providers for various displayed candidate data items, search terms for filtering, and/or other types of input such as zoom-in requests for various class members, and the like. At the search subsystem 218, the search terms or predicates may be used to help identify the subset of data items for which labeling feedback is to be requested next in the depicted embodiment from label providers. In the active learning subsystem 220, in some embodiments, the results obtained from one or more classifiers (e.g., a committee of classifiers) may be examined in conjunction with the filtering requests input from the labelers, and a ranking of a selected set of data items may be performed in at least some embodiments, in which the data items may be arranged in order of potential contribution of to-be-assigned labels towards one or more training objectives. In at least some embodiments, data items whose predicted classes show the greatest variation among the members of the committee may be considered harder to classify and may therefore be considered better candidates for labeling feedback.

In addition to the classifiers used for selecting candidates, an iteration-final model (also referred to as the final-with-respect-to-the-current-iteration classifier) may also be trained in at least some embodiments using resources of subsystem 222. For example, if N classifiers are used to obtain prediction variation measures to help rank the unlabeled data items, in one embodiment individual ones of the N classifiers may be trained using 1/Nth of the available training data, while the iteration-final classifier model may be trained using the entire training data set available. The quality of the predictions generated by the iteration-final model, as estimated using one or more selected metrics, may be used to determine whether additional training iterations are required in some embodiments, or whether the training procedure can be concluded. The predictions of the iteration-final model may also be used in at least some embodiments to identify terms, attributes or features that are highly correlated with membership in various classes being considered. Results of the search, active learning and iteration-final model training/evaluation subsystems may be formatted for presentation as output by subsystem 224 in the depicted embodiment. Such displayed results may include, for example, important or significant tokens, attributes or features, training status metrics, diagnosis test results and the like in some embodiments. In at least some embodiments, the results obtained for the iteration-final model may be included in the criteria used at the search subsystem to rank data items for labeling feedback purposes—e.g., if a goal for a particular metric measured using the iteration-final model is more likely to be satisfied by obtaining a label for a data item D1 than by a data item D2, D1 may have a higher probability of being included in the search results generated at search subsystem 218.

Figure 3:
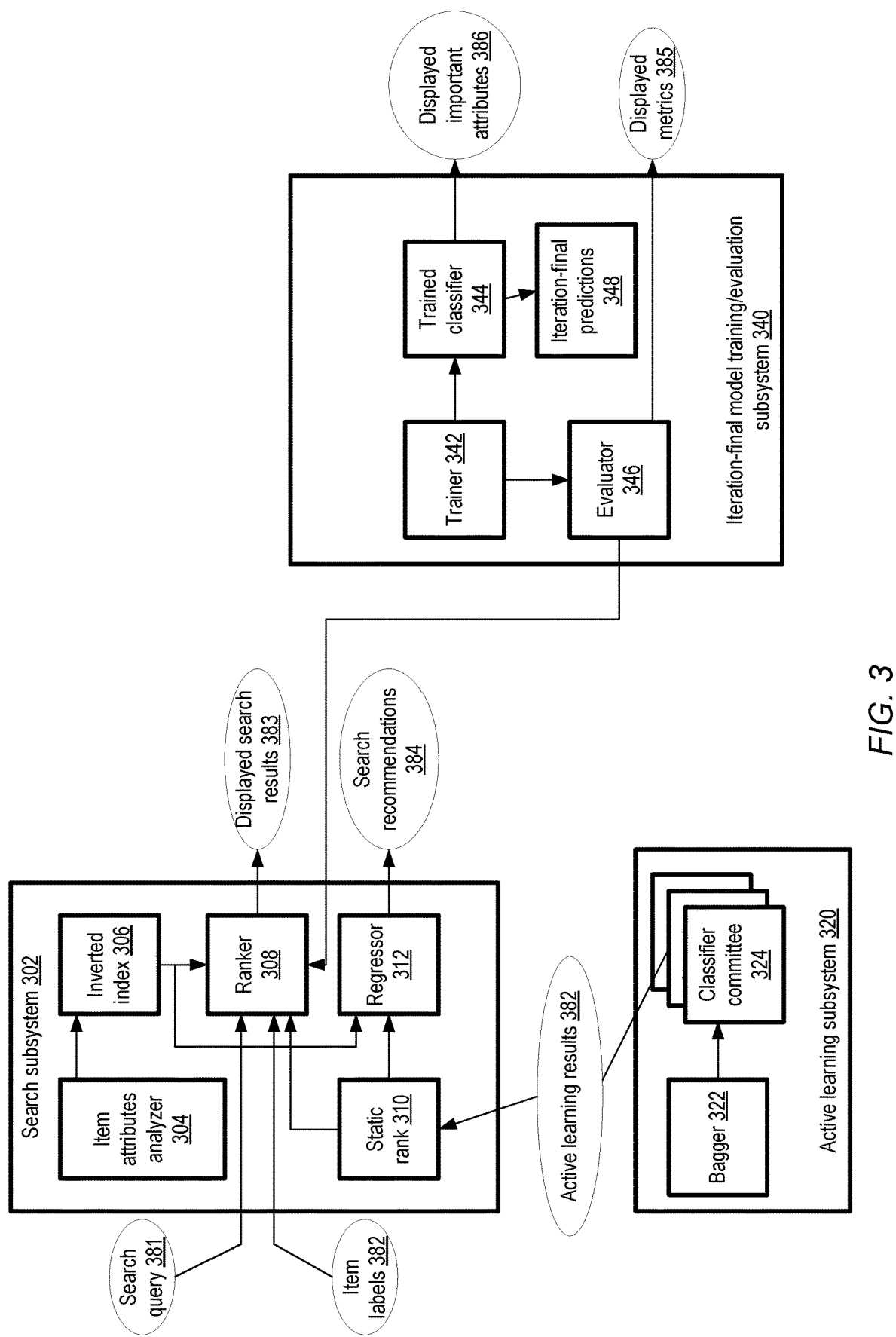
FIG. 3 illustrates additional details of example elements of a training subsystem of a classification service, according to at least some embodiments.

FIG. 3 illustrates additional details of example elements of a training subsystem of a classification service, according to at least some embodiments. In the depicted embodiment, a search subsystem 302 within a training subsystem (similar to that discussed earlier in the context of FIG. 2 and FIG. 1) may include an item attribute analyzer 304 which is used to create an inverted index 306 on attribute values identified from the data items. Results 382 obtained from an active learning subsystem 320 may be used to generate a static rank among potential candidates for labeling feedback in some embodiments at the search subsystem 302. The inverted index 306 as well as the static rank information 310 may be used as input to a regression model or regressor 312 which is trained to identify attributes that are highly correlated with membership of one or more classes. The output of the regressor 312 may be used to generate search recommendations 384 in some embodiments—e.g., token sets that are recommended as search predicates when a user fills out a search input form via an interface presented by the classification service. In at least one embodiment, recommended search terms may be combined with auto-complete and/or auto-correct features of the search input interface—e.g., in a scenario where the term "scooter" is identified by the regressor as being highly correlated with membership in a particular class, and a use types in the letters "sc" in a search term entry box, the term "scooter" may be listed among the alternative recommended search terms that can be selected by the user. A final ordering of the set of data items to be presented as labeling feedback candidates may be performed by a ranker module 308, which may use the search query terms entered by users, the item labels generated by users, the inverted index, and/or the static rank obtained from the active learning subsystem as inputs in the depicted embodiment. As indicated in FIG. 3, the final ranking produced by the ranker 308 may be based on a combination of factors in at least some embodiments, including but not necessarily limited to the static rank 310 obtained from the active learning results, features extracted from terms of search queries 381, additional features extracted from the attributes of the data items, detections of potentially incorrect labels obtained from label providers, and the like. As such, the final ranking may be considered an example of dynamic ranking (rather than purely static ranking) in such embodiments. The displayed search results 383 may be presented in an order selected by the ranker 308 in various embodiments. In some embodiments, a slightly different approach may be used to determine the order in which labeling candidate items should be presented to users via the classification service's interactive interfaces. First, a determination may be made as to whether a given label provider has indicates one or more filters (e.g., via the search input interface, via label selection interfaces, via indicated ranges of classification scores, or the like), and a set of candidate data items may be identified based on the filters. Next, from among the filter-based set of candidate data items, results obtained from the active learning subsystem may be used to identify the candidates likely to be most helpful in learning, and the items may be arranged in order of decreasing influence on learning before being presented to the users. Thus, in different embodiments, the manner in which user-specified filters and active learning results are used to arrange labeling feedback candidate data items may differ.

A variety of active learning approaches may be employed in different embodiments to help select candidate data items for labeling. In the depicted embodiment, a bagger 322 may assign different combinations of labeled data items among the respective training sets of members of a committee 324 of classifiers, and the variation among the classes predicted for a given unlabeled data item by the different members may be used as an indication of the potential benefit of labeling the item. For example, consider two unlabeled data items UD1 and UD2, a committee comprising four classifiers C1, C2, C3 and C4 trained using respective training subsets, and a binary classification scenario in which an individual data item is either assigned a "1" or a "0" to indicate one of the two possible classes by a given classifier. Assume further that the binary classification comprises generating a real-valued classification score in the range zero to one, and an item is predicted as being a member of class "1" if the score exceeds 0.5, and as being a member of class 0 if the score is less than or equal to 0.5. Assume further than the scores generated for UD1 by the four members of the committee are 0.8, 0.75, 0.9 and 0.87, and the scores assigned to UD2 are 0.33, 0.67, 0.8, and 0.2. Because the scores for UD1 are more consistent (i.e., the score variance is low) with respect to one another, one may infer that it is "easier" to classify UDA as a member of class "1". In contrast, the variance of the scores is higher for UD2, so UD2 may be considered harder to classify, and therefore a better candidate for obtaining labeling feedback from a label provider. By selecting harder candidates for labeling feedback sooner in the training process, the speed with which the iteration-final model learns may be increased relative to scenarios in which easy-to-classify items are used sooner than harder-to-classify items in various embodiments. Note that metrics other than variation in the classification scores may be used to rank candidates in some embodiments—e.g., proximity to a class boundary may also or instead be used. If, for example, the scores for UD2 were 0.52, 0.51, 0.54, and 0.55 in the above example, the variation for UD2 would be less than the variation for UD1, but the proximity of the scores to the class boundary score (0.5) may still lead to ranking UD2 over UD1 as a labeling feedback candidate. In some embodiments, other active learning approaches such as uncertainty sampling, expected model change algorithms, expected error reduction algorithms, variance-reduction algorithms, and/or density-weighted algorithms, may be used at active learning subsystem 320. Combinations of such algorithms and/or the committee-based approach shown in FIG. 3 may be employed in at least one embodiment. At least in some embodiments, a data item need not necessarily be unlabeled to be selected as a labeling feedback candidate—e.g., reconsideration of a previously-assigned label may be requested from a label provider in some cases especially if the predictions of the model do not match the previously-provided label. In some embodiments, k-fold cross validation may be used (e.g., with k members of the committee 324) at the active learning subsystem.

The training/evaluation subsystem 340 for the iteration-final model may comprise a trainer 342 and an evaluator 346 in the depicted embodiment. The trainer 342 may, for example generate a trained classifier version 344 use a training set comprising all the currently available labeled data items, from which a set of iteration-final predictions 348 may be obtained on an evaluation data. One or more classification metrics may be obtained by an evaluator 346 and included in the set of displayed metrics 385 in some embodiments. A set of important attributes 386 (e.g., text tokens or other attributes that are found to be highly correlated with membership in various classes) of data items may be identified in at least some embodiments and included in the visualization data sets presented to various users of the classification service (e.g., by highlighting the attributes in the set of displayed items presented to a label provider). In at least some embodiments, metrics and associated status or diagnosis test results obtained by evaluator 346 may also be used by the ranker when generating the candidate data items for which labeling feedback is to be requested—e.g., data items which, if labeled, would lead to achieving a particular as-yet-unmet objective associated with a metric may be ranked higher than data items which would be less likely to help meet the objective.

Timing of Label Submissions Relative to Training Iterations

Figure 4:
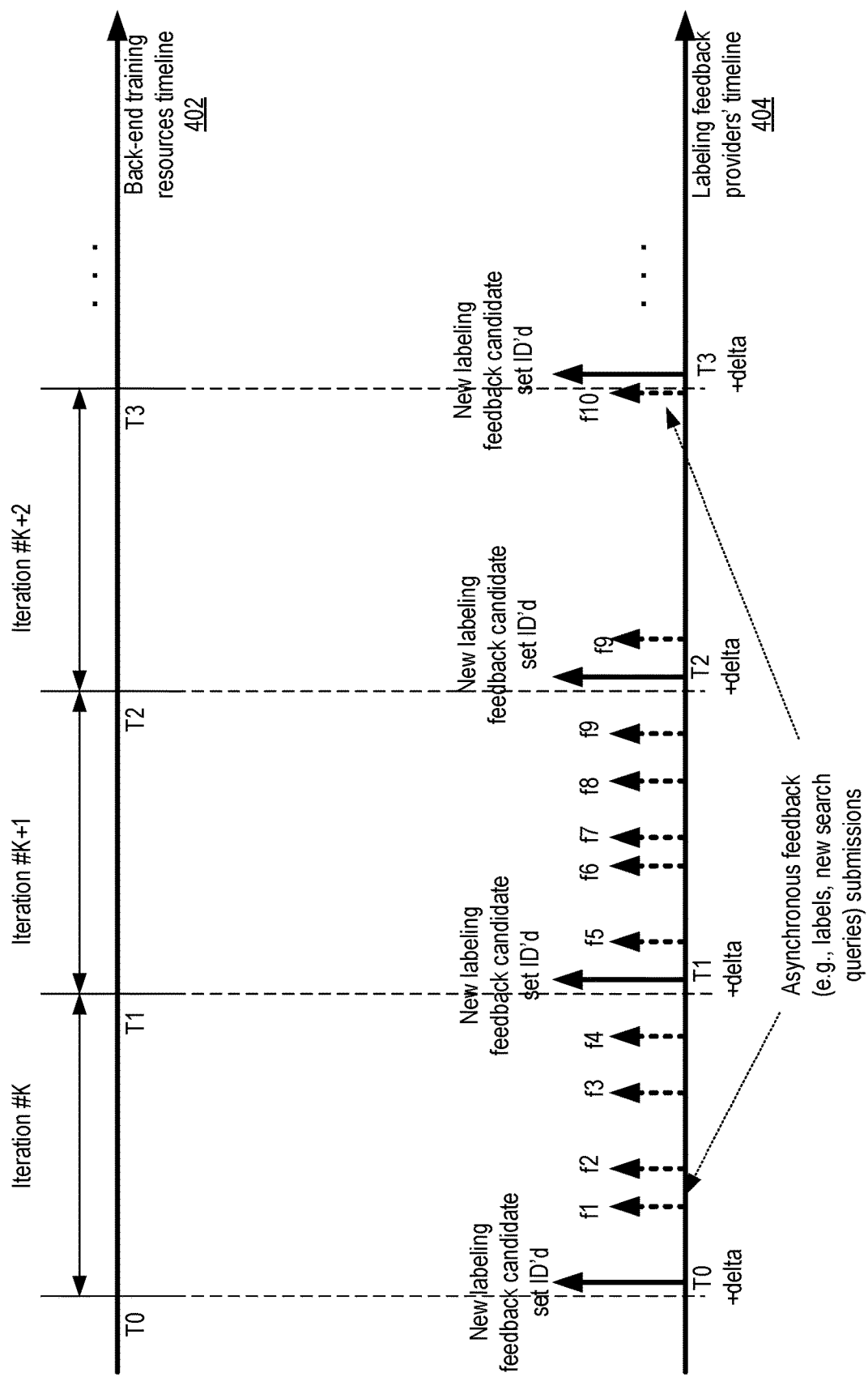
FIG. 4 illustrates example submissions of batches of labels to a classification service, asynchronously with respect to the start and end of classifier training iterations, according to at least some embodiments.

FIG. 4 illustrates example submissions of batches of labels to a classification service, asynchronously with respect to the start and end of classifier training iterations, according to at least some embodiments. Two timelines are shown to indicate the relationships between the timings of operations at the back end training resources of the classification service (which may have features and capabilities similar to those discussed above), relative to the timing of labeling feedback provided to the service by label providers. Back-end training resources timeline 402 shows training iteration #K starting at some time T0, and continuing till time T1, training iteration #(K+1) starting at T1 and continuing until T2, and iteration #(K+2) starting at T2 and ending at T3 in the depicted embodiment.

Along labeling feedback providers' timeline 404, the timing of two types of events during the various training iterations is illustrated. Shortly after a given training iteration completes and new training iteration is started, a new set of labeling feedback candidate data items may be identified (e.g., using results generated by the classifiers trained in the just-completed iteration), e.g., at times (T0+delta), (T1+delta), (T2+delta) and (T3+delta). At least a subset of the newly-identified candidates may be presented to individual ones of one or more label providers in the depicted embodiment, e.g., in a batched or paged manner with some small number of candidates being displayed in order of decreasing estimated influence on classifier learning as discussed earlier. Different label providers may submit batches of one or more labels for the candidates presented to them, and/or other types of feedback such as search queries or other filtering requests, at arbitrary points in time with respect to the start and end times of the training iterations in the depicted embodiment. For example, such feedback may be received at time f1, f2, f3, f4, between T0 and T1, times f5, f6, f7, f8 and f9 between times T1 and T2, and times f9 and f10 between T2 and T3 in the depicted example scenario. The specific times at which feedback is provided may depend, for example, on various factors such as how difficult it is to decide on labels of individual data items that are presented to a given label provider, how much labeling assistance (e.g., via highlighting of important attributes of the data items) the classification service is able to provide for various data items, the potentially differing capabilities or interest levels of the label providers, how busy the label providers may be with other work, and so on. In at least some embodiments, the labels received during a given training iteration may be collected and used to help train the classifiers for the next iteration. Search and other filter requests may be used to select and/or order candidates for presentation to label providers during the current and/or future training iterations in at least some embodiments. For example, consider a scenario in which 50 labeling feedback candidate data items have been selected and ordered for presentation to a given label provider in groups of 10 starting at time T1+delta in the example of FIG. 4. If, after viewing the first 10 candidates, the label provider submits a search request or some other filtering request, the order in which the remaining 90 items are presented may be changed, or in some cases a different set of items may be identified for presentation to the label provider based on the filter/search feedback and/or on active learning results pertaining to the filter/search results in at least one embodiment. Note that if a number of candidate data items has been identified for presentation to a particular label provider at a given point of time, in at least some embodiments this does not necessarily mean that the particular label provider is required to provide labels for all these candidates before the next training iteration can begin. The classification service may, for example, decide to initiate the next training iteration even if some of the candidates have not yet been labeled, or may attempt to obtain labels from multiple label providers for the same data item in some embodiments, and use one of the submitted labels (e.g., a label selected by the majority of the label providers that submitted labels for a given candidate data item). In various embodiments, operations illustrated along both timelines shown in FIG. 4 may collectively be considered part of the training iterations—that is, resources used for computations at the back end and resources involved in interactions with users may both contribute to a given training iteration.

Evolution of Labeling Candidate Selection Criteria

Figure 5:
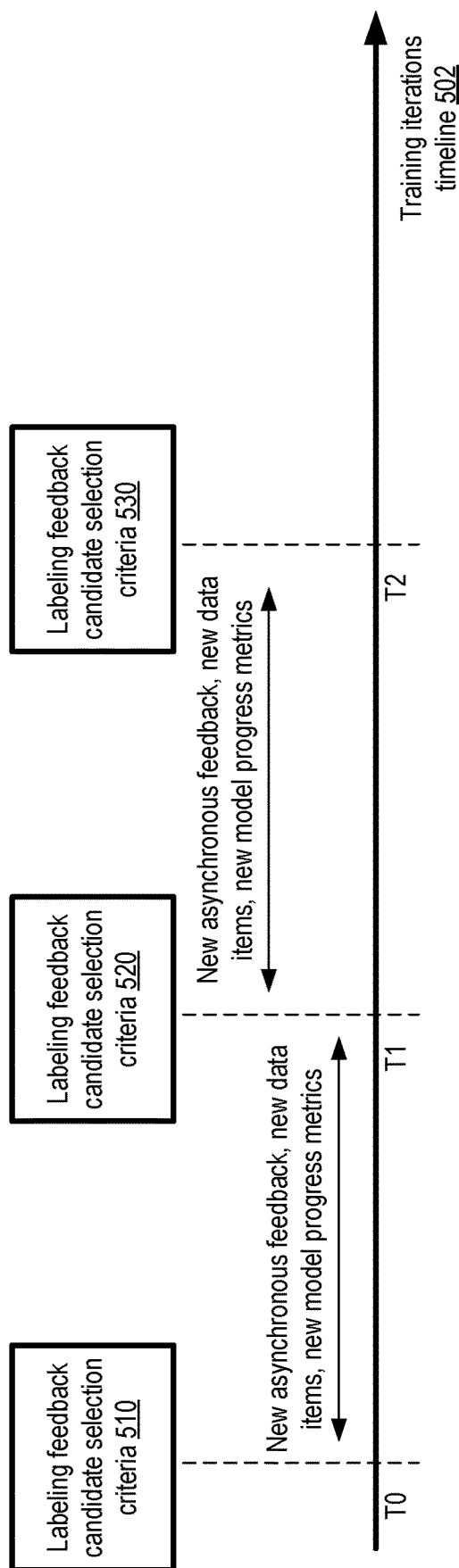
FIG. 5 illustrates an example of changing criteria for selecting labeling feedback candidates over time during classifier training, according to at least some embodiments.

In at least some embodiments, the contributing factors used for identifying and ranking labeling feedback candidate data items may change during the training process used for a given classification problem. FIG. 5 illustrates an example of changing criteria for selecting labeling feedback candidates over time during classifier training, according to at least some embodiments. Along timeline 502, new sets of labeling feedback candidates may be identified at times T0, T1 and T2, which may in some cases correspond approximately to the completion/start times of respective training iterations. At time T0, a first set of candidate selection criteria may be used. Between T0 and T1, however, a number of events that may influence the criteria used for selecting the next set of candidates may occur in the depicted embodiment—e.g., new asynchronous feedback may be received in the form of filters or search requests, new unlabeled data items may be obtained from the data sources being used, new model progress metrics may be collected, and so on. As a result, the selection criteria 520 employed at T1 may differ from those employed at T0. Similarly, between T1 and T2, additional feedback may be received from label providers, data scientists analyzing the progress of the classifiers, and the like, or new data items may be retrieved, and the criteria 530 used for selecting the next set of candidates may differ from those used at T1 (and/or those used at T0). In at least one embodiment, the classification service may adjust its criteria as soon as any new feedback or data is obtained—that is, a policy of continuous adjustment of selection criteria for labeling feedback may be employed, enabling even faster attainment of training sets that result in high-quality classifiers.

Adjustable Automation Levels

Figure 6:
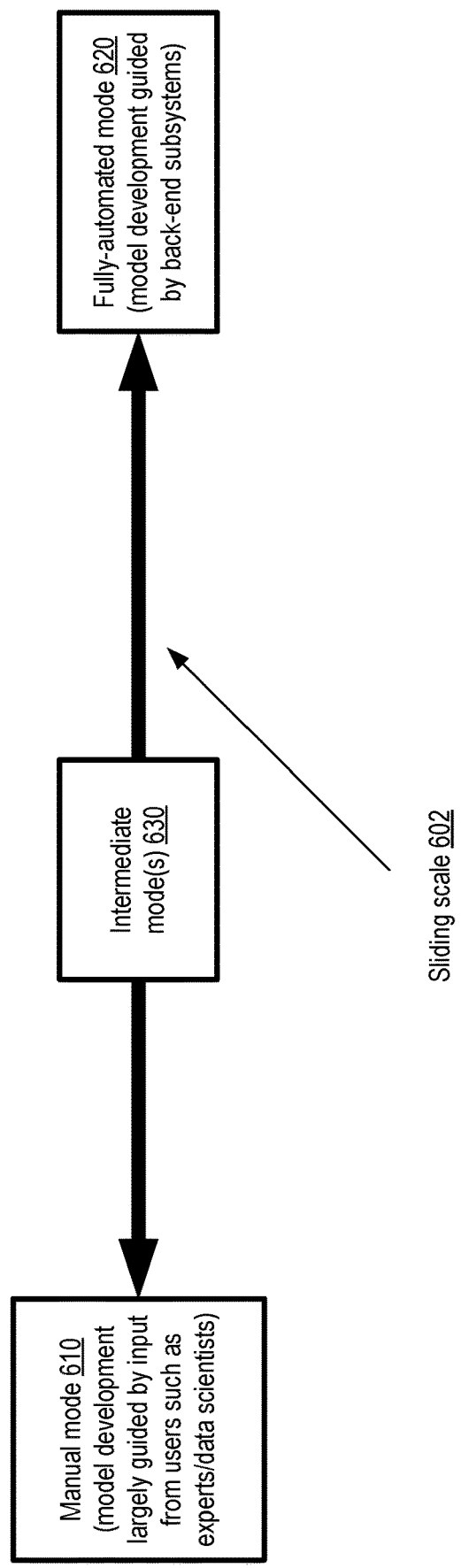
FIG. 6 illustrates example modes of classifier training, with respect to the extent to which decisions are made in an automated manner by the classification service, according to at least some embodiments.

FIG. 6 illustrates example modes of classifier training with respect to the extent to which decisions are made in an automated manner by the classification service, according to at least some embodiments. In the depicted embodiment, a client or user of the classification service (which may have features similar to those discussed in the context of FIG. 1) may use an interactive mode similar to a sliding scale 602 to specify the level of automation desired with respect to various decisions made during the training of one or more classifiers. At one extreme, a fully-automated mode 620 may be selected, in which the classification service's back-end subsystems make most of the decisions, such as exactly which types of models are to be used for classifiers, the settings for various hyper-parameters of the training process, the techniques/algorithms to be used to select candidates for labeling feedback, the set of metric thresholds and/or diagnosis tests used to terminate training, the set of training enhancement actions (if any) to be undertaken at various stages of the process, and so on. At the other extreme, a user or client skilled in machine learning may decide to provide input on many such decisions, or at least view and have a chance to approve/disapprove the decisions recommended, and may therefore opt to use the classification service in manual mode 610. In at least one embodiment, one or more intermediate modes 630 may also be selectable, e.g., with an interface element that can be used to determine which types of decisions are automated and which require or use client input. In effect, in the depicted embodiment, an indication may be obtained via an interactive interface of the level of automation to be implemented at one or more stages of a classification workflow, and depending on the desired level of automation, parameters for making various decisions (such as when to terminate the classification training) may be made by the service without necessarily requiring input or guidance from a user.

In some embodiments, a more granular control over automation levels may be provided, in which clients are shown a list of decision types and allowed to choose a subset of decision types on which they wish to provide input. In one embodiment, interface elements other than sliding scales may be implemented to enable users to decide the levels of automation—e.g., radio knob style interfaces may be implemented, or respective automation on/off checkboxes corresponding to the different types of decisions may be implemented. In various embodiments, using the kinds of automation adjustment interfaces shown in FIG. 6, the needs and capabilities of a wide variety of users may be accommodated by the classification service, including for example machine learning experts, subject matter domain experts, as well as individuals who have relatively little experience with machine learning or classification. In at least some embodiments, the level of automation may be changed during the course of training a given classifier using an interface similar to that shown in FIG. 6—e.g., early on during the training, a lower level of automation may be used, and as the training progresses more and more of the decision making responsibilities may be handed over to the classification service by increasing the level of automation.

Example Interactive Interface

Figure 7:
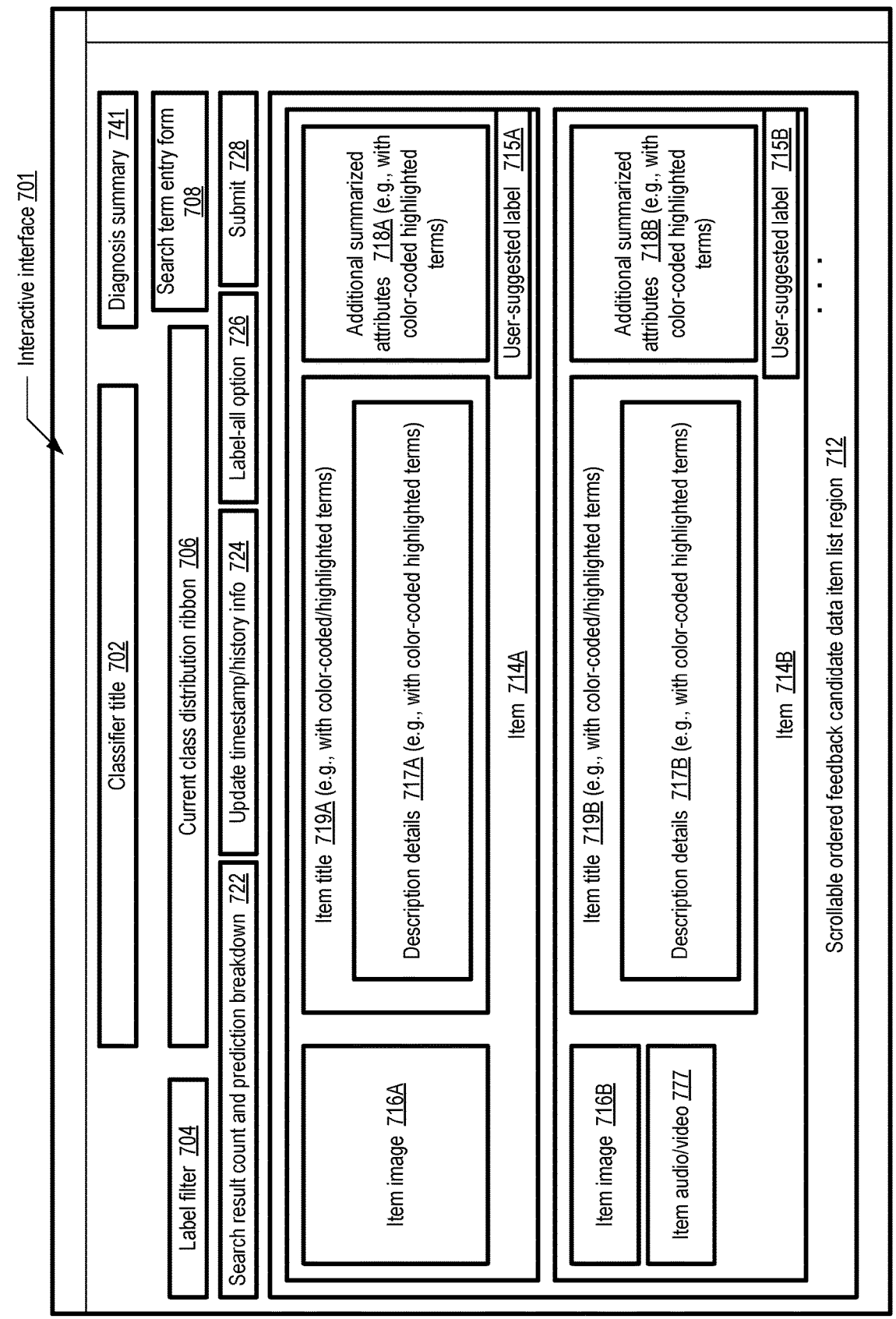
FIG. 7 illustrates an overview of an example interactive interface which may be used to display labeling feedback candidates and obtain labels to be used for training classifiers, according to at least some embodiments.

A number of different types of programmatic interfaces may be used for interactions between clients or users and a classification service of the kind discussed above in various embodiments. FIG. 7 illustrates an overview of an example interactive interface which may be used to display labeling feedback candidates and obtain labels to be used for training classifiers, according to at least some embodiments. In the depicted embodiment, interactive interface 701, which may for example be presented as a web page or as a graphical user interface (GUI), may comprise a scrollable ordered feedback candidate data item region 712, as well as numerous other panels or regions indicating various aspects of the classification development workflow. Various portions of the content displayed via the interactive interface 701 may be generated as part of a visualization data set by the classification service and transmitted to a client-side device for presentation to the client in some embodiments.

Within the scrollable region 712, information about a number of candidate items 714, such as items 714A or 714B for which labeling feedback may be provided by the viewer if desired, may be shown in the depicted embodiment. In the example scenario shown in FIG. 7, for each of the items, an item image 716 (e.g., 716A or 716B) may be shown towards the left of the display, a central region may comprise the item title 719 (e.g., 719A or 719B) and description details 717 (e.g., 717A or 717B), and a set of additional item attributes 718 (e.g., 718A or 718B) may be presented at the right. In at least some embodiments, audio/video recordings or segments 777 providing additional information about the data item may be included. Generally speaking, the specific data types and formats of the information pertaining to various data items included in the views presented via an interactive interface 701 may vary, e.g., among the different data items for a given classification problem and/or from one classification problem to another. An interface element 715 (e.g. 715A or 715B) may be used to provide a label for the item in the depicted embodiment. The order in which the data items are arranged in region 712 may, for example be based at least in part on a respective estimated rank, with respect to a metric such as an estimated impact on learning, associated with including individual ones of the data items in a training set for one or more training iterations of one or more classification models in the depicted embodiment. In various embodiments, in effect, the items displayed may be selected and presented in an order based on the extent to which they may contribute to faster learning and convergence of the classifier being generated, with those items that are estimated to provide greater benefits towards learning being presented before items that are expected to provide smaller benefits. In the scenario depicted in FIG. 7, for example, item 714A may be presented before item 714B under the assumption that the positive impact or learning contribution, with respect to the quality of the classifier obtained in one or more subsequent training iterations, of providing a label for item 714A may exceed (or at least be no smaller than) the positive impact of providing a label for item 714B. To help the user make label selection decisions, in at least some embodiment's terms that are correlated with membership in a given class may be highlighted in the item title 719, description details 717 and/or summarized attributes 718. Examples of such highlighting techniques are provided below.

In addition to the candidate items themselves, the interactive interface 701 may include a title 702 identifying the current classification task, a summary 741 of a set of diagnosis tests that may be used to help decide whether to terminate training of the classifier, a label filter element 704, a current class distribution ribbon element 706, a search term entry form element 708, a search result element 722, an update timestamp indicator element 724 a label-all option element 726 and/or a submit interface element 728 in the depicted embodiment. Note that at least some of the interface elements and regions shown in FIG. 7 may not be required in some embodiments, or may be arranged in a different layout than that shown.

The diagnosis summary 741 may indicate how many (or what fraction of) a selected set of diagnosis tests have been met in the most recent training iteration. The label filter 704 may be used to indicate to the classification service whether items that are currently being predicted as being members of a particular class (or have earlier been labeled as members of a particular class) should be presented to the user next. The current class distribution ribbon may provide a visualization of the manner in which the data items for which predictions have been generated are distributed among the set of classes, where the class boundaries lie, and so on. The entry form 708 may be used to enter search predicates or queries that are to be used to filter data items for presentation to the client. The number of items that were identified in response to the previously-submitted search, as well as the breakdown of those items among the classes may be presented in element 722. A timestamp indicating the time of completion of the last training iteration (or the most recent time at which the user has submitted feedback) may be indicated in element 724, together with interface elements to view more detailed historical information with respect to the training iterations. The label-all option element 726 may be used to label all the items currently selected (or currently being displayed) with a particular label, e.g., instead of the user having to select the same label for each item separately. The submit interface element 728 may be used, as indicated by its name, to submit the set of labels that the user has currently indicated for the individual items being displayed, to the classification service back end. Additional details regarding various aspects of these elements are provided below.

Attribute Highlighting

Figure 8:
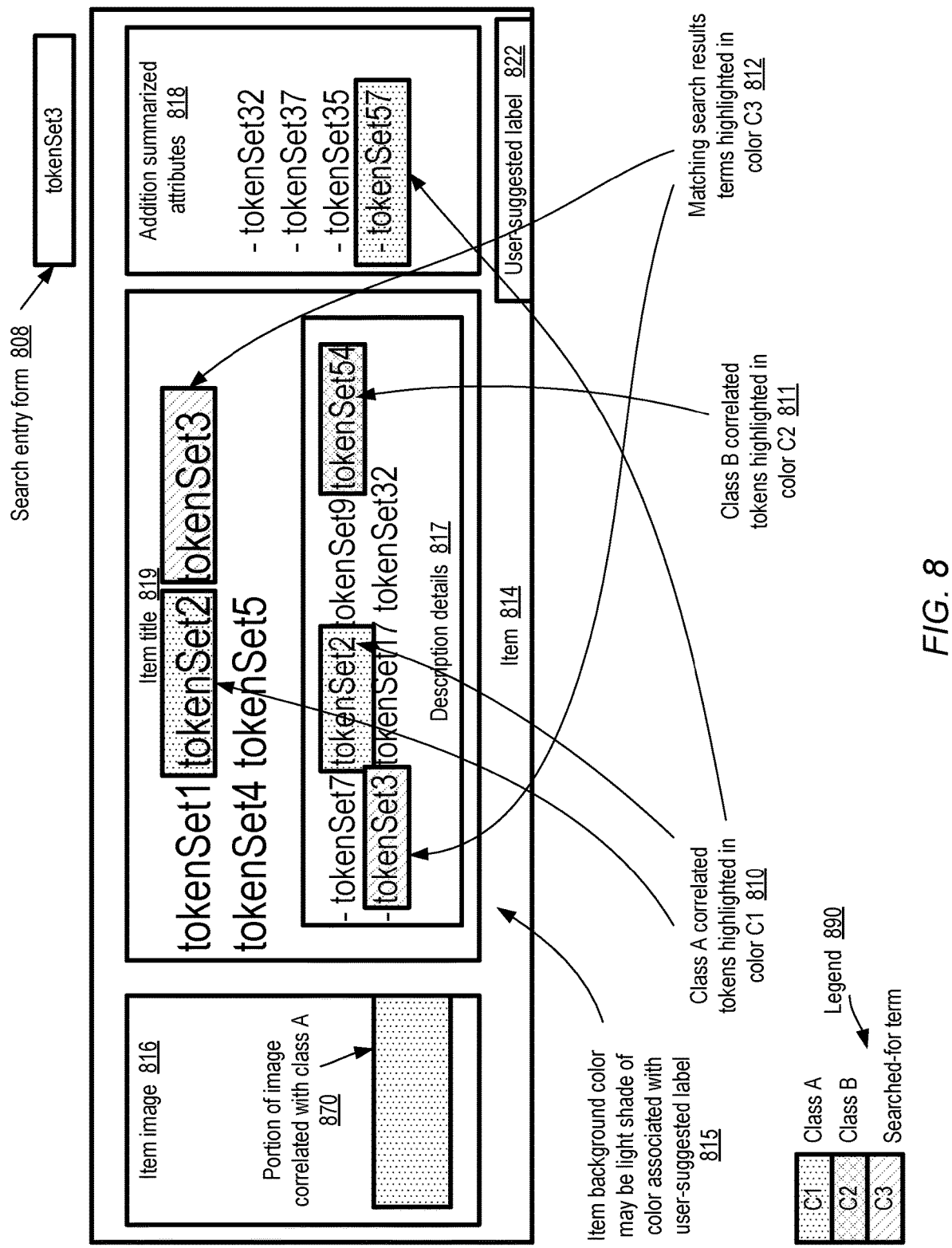
FIG. 8 illustrates examples of the use of highlighting to distinguish terms or tokens within labeling feedback candidates displayed via an interactive interface, according to at least some embodiments.

FIG. 8 illustrates examples of the use of highlighting to distinguish terms or tokens within labeling feedback candidates displayed via an interactive interface, according to at least some embodiments. In the example scenario depicted in FIG. 8, a binary classification model (for classes A and B) is being developed, and the example data items being used to train and test the binary classifier comprise a plurality of text token sets in addition to an item image 816. A token set may comprise some number of text tokens (such as words, punctuation, and the like) in the depicted embodiment. In the example scenario, the user has submitted a search query, and information about a particular item which is displayed via the interactive interface after the search query has been submitted is shown. As indicated in the search entry form box 808, the search predicate submitted by the user comprises a token set "tokenSet3" in the depicted example. Thus, the user has indicated that results for a search for items which comprise tokenSet3 in one or more attributes (or some set of tokens similar to tokenSet3) should be displayed, if such items are found by the classification service.

Among the items displayed to the user via the interactive interface, at least one item 814 which includes the searched-for token set tokenSet3, and which is not yet labeled, may be included in the depicted embodiment. In order to help the user provide a label for item 814, token sets 810 whose presence in an item's attributes have a high correlation with membership of the item within class A (as determined using the versions of the classifier that have been trained thus far) may be highlighted in a particular color C1, and token sets 811 whose presence in an item's attributes have a high correlation with membership of the item within class B may be highlighted in a different color C2. Furthermore, the occurrences of the searched-for terms 812 (tokenSet3 in the example shown) may be highlighted using a third color C3 in the depicted embodiment, as indicated in legend 890. The item title 819 and the description details section 817 includes tokenSet2, which is correlated with class A membership, and the additional summarized attributes section 818 includes tokenSet57, which is also correlated with class A membership. TokenSet54, which is correlated with class B membership and present in the description details section, is highlighted in color C2. TokenSet3 in the title 819 and the description details section 817, may be highlighted in a third color C3 to indicate that it corresponds to the searched-for terms. In some embodiments, relevant non-text portions of the information may also or instead be highlighted—e.g., as shown, portion 870 of image 816 may be highlighted to indicate a correlation of that portion of the image with class A. Similarly, in scenarios in which audio or video information about data items is presented, portions of the audio recording/segment or video which are correlated with target classes or search terms may be highlighted in at least one embodiment.

In addition to using highlighting and/or different colors for attribute elements correlated with class membership, in at least some embodiments, other types of visual signals may also be displayed in the depicted embodiment. For example, if the user selects the class A for the label 822 (or if the item being displayed was previously labeled as a class A member), the item background color 815 may be set to a light shade of color C1 in the depicted scenario, while if the user selects the class B, the item background color 815 may be set to a light shade of color C2. As a result of these and similar visual cues, users may be able to grasp various characteristics of the displayed candidates at a glance—e.g., whether the item's attributes (such as the title 819, the details 817 or the additional summarized attributes 818) are dominated by terms correlated with a particular class, how frequently the searched-for terms occur in the items, and which (if any) of the items being displayed have been labeled already as members of one class or another. Such visual signals may help to substantially simplify the work of label providers, classifier task managers (e.g., individuals who initiated the classification workflow), individuals responsible for debugging/analyzing the classification workflow, and so on in various embodiments. Various other types of visual cues (e.g., the use of different fonts in addition to or instead of different colors, varying intensities of colors to indicate the extent of correlation or matching with search terms) and/or other modes of cues (such as audio cues or tones representing the extent of correlation with the different classes when a particular token is hovered over with a mouse or other interface) may be used to provide similar types of information in various embodiments to help various types of users. Note that although visual cues have been indicated for binary classification by way of example in FIG. 8, similar techniques may be applied with equal success for multi-class classification problems in various embodiments.

Label Reconsideration Requests

Figure 9:
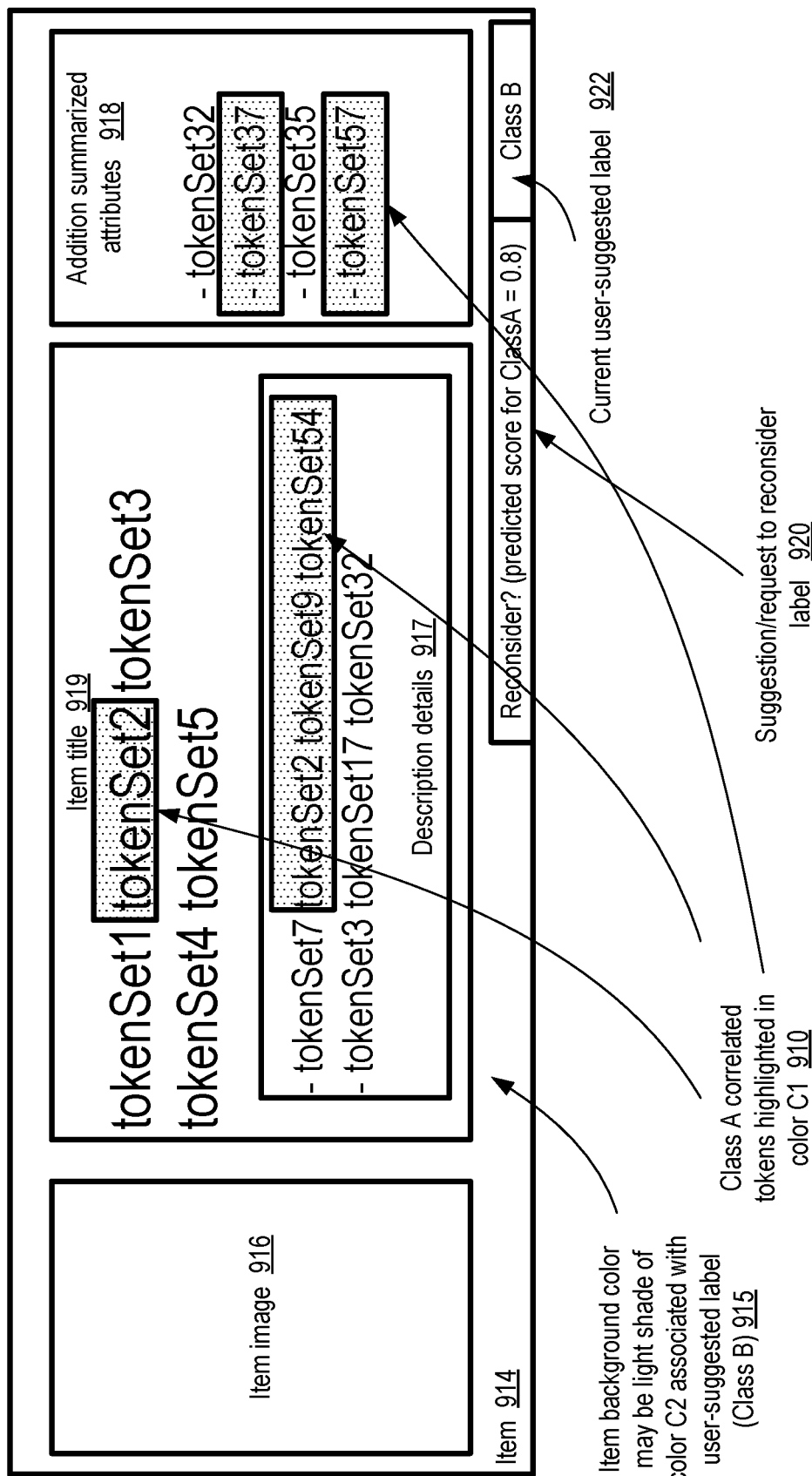
FIG. 9 illustrates an example scenario in which a label provider may be requested, via an interactive interface, to reconsider whether a previously-provided label is appropriate for a labeling feedback candidate, according to at least some embodiments.

In at least one embodiment, the classification service may generate class predictions for at least some data items for which labels have already been provided, e.g., in order to determine the extent to which the classifier differs in its conclusions from the label providers. FIG. 9 illustrates an example scenario in which a label provider may be requested, via an interactive interface, to reconsider whether a previously-provided label is appropriate for a labeling feedback candidate, according to at least some embodiments. In the depicted example, a data item 914 with item image 916 and title 919 has been provided a label corresponding to class B of a binary classification problem (where the other class is class A), as indicated in element 922. The background color 915 may therefore be a light shade of the color C2 corresponding to class B.

Although the item 914 is currently designated as a member of class B, a number of token sets 910 that are highly correlated with class A (and are therefore highlighted using color C1) may have been identified by the classification service based at least in part on analysis performed using one or more versions of the classifiers trained thus far, and no token sets that are highly correlated with class B may have been found in the depicted scenario. For example, tokenSet2 in the item title 919 and in the details section 917, tokenSet9 and tokenSet54 in the details section 917, and tokenSet37 and tokenSet57 in the summarized attributes section 918 may all be highly correlated with class A. membership. Furthermore, in the depicted embodiment, the classification service may have computed a high predicted score (e.g., 0.8) for class A membership for the item 914. A suggestion or request 920 for the user to reconsider the previously provided Class B label 922 may be included in the presented visualization data set in the depicted embodiment. In some embodiments, a prediction score which indicates that the current user-suggested label is incorrect may be indicated in the reconsideration request, while in other embodiments such a score may not necessarily be displayed. Other types of cues, such as a background color for the item information which suggests that the current label may potentially be inaccurate, may be used as indicators of reconsideration request in some embodiments. Note that at least in one embodiment, the request to reconsider a previously-supplied label may be sent to a different individual/user than the source of the previously-supplied label—e.g., to one of a set of trusted individuals who are permitted to change previously-provided labels.

User-Defined Labels and Recommended Searches

Figure 10:
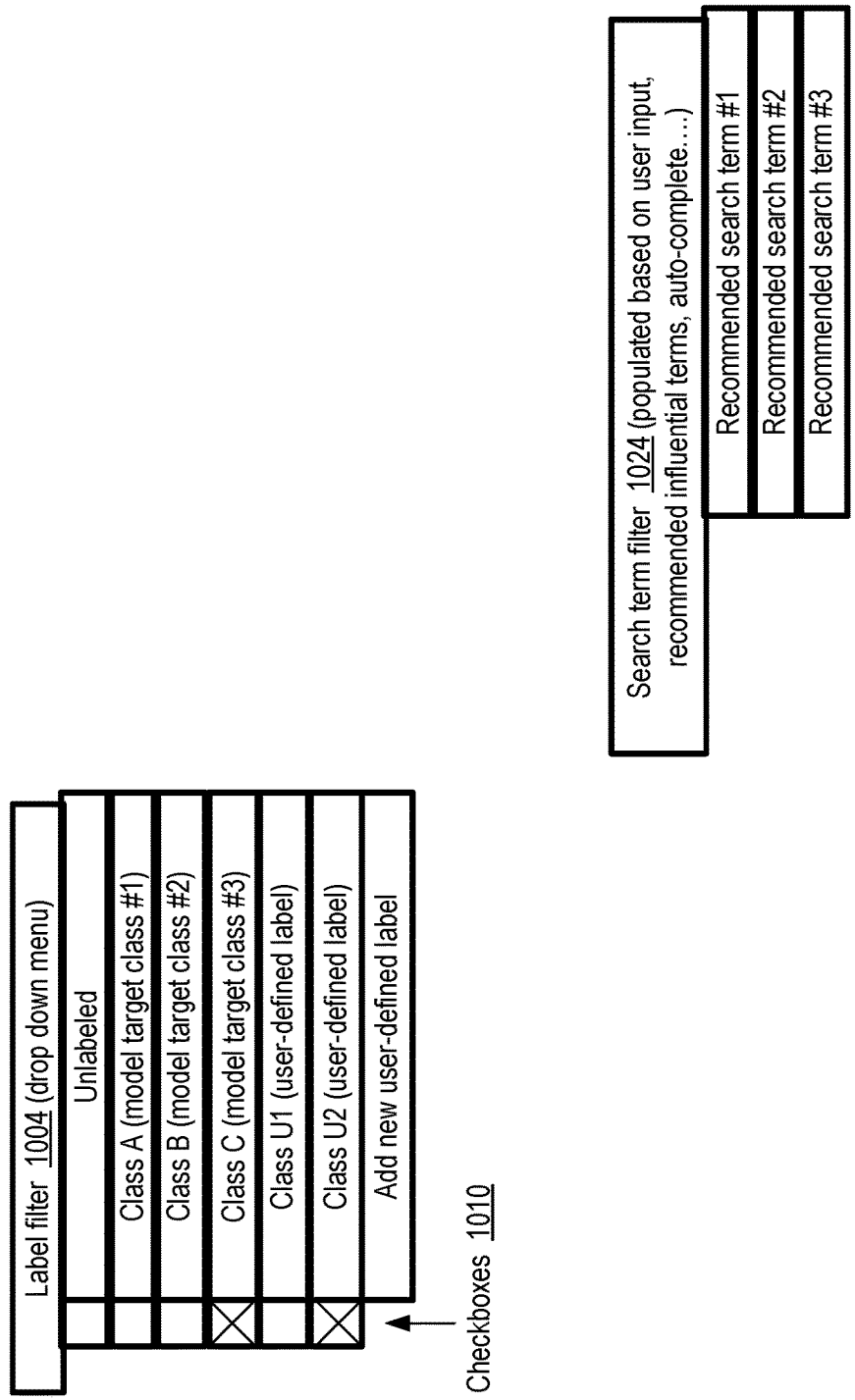
FIG. 10 illustrates examples of interface elements that may be used to indicate user-defined labels and recommended token sets for searches, according to at least some embodiments.

FIG. 10 illustrates examples of interface elements that may be used to indicate user-defined labels and recommended token sets for searches, according to at least some embodiments. The classes to which data items are to be eventually assigned (e.g., Class A and Class B in the binary classification examples shown in FIG. 8 and FIG. 9), which may be selected by the initiator or manager of the classification workflow, may be referred to as the target classes in some embodiments. In various embodiments, as a label provider or other user examines a set of labeling feedback candidate data items via an interactive interface of the classification service, they may notice similarities among a subset of the items, while still being unable to definitively decide on assigning the similar items to a particular target class of the classifier being developed. To help keep track of the similarities identified among such data items, user-defined labels may be created and stored, at least temporarily, for the items in various embodiments.

Such user-defined labels may be used as filter or search predicates in at least one embodiment. For example, when submitting a filtering request to the classification service for the set of data items to be presented next, a user may use a label filter 1004 of the type shown in FIG. 10. A drop-down menu of the currently defined/assigned labels, as well as an interface element which can be used to add a new user-defined label, may be presented in response to a programmatic interaction such as a mouse click within the label filter interface element 1004. The set of label filtering options presented may include the target classes such as Class A, Class B and Class C, the "Unlabeled" category (which may be used in the depicted embodiment for those data items which have not yet been designated as members of a particular class, either by label providers or by the classification service), as well as zero or more user-defined labels such as U1 and U2 in the depicted example scenario. Interface elements such as checkboxes 1010 may be provided to enable a user to select the set of labels/categories to be used to filter the next set of data items presented to the user in various embodiments.

In some embodiments, if and when a user eventually decides that all the data items that were assigned a particular user-defined label should be designated as members of a particular target class, a label filter 1004 may be used to retrieve all the items to which the user-defined label was assigned, and an interface element similar to the "label-all option" shown in FIG. 7 may be used to assign the data items in bulk to the particular target class. Such an approach may enable the label providers to avoid labeling such data items one at a time, thereby further enhancing the user experience of the label providers. In at least some embodiments, if a label provider decides that all the items with a user-defined label are to be assigned to a target class, the metadata stored at the classification service regarding the user-defined label may optionally be deleted—that is, information about user-defined labels may only be retained/stored for periods during which a decision about the target class of the items assigned the user-defined label has not yet been made. Such an approach may help to reduce the memory and storage resources required at the classification service in at least some embodiments, while still enabling users to take advantage of the user-defined label feature. In effect, in various embodiments, user-defined labels may serve as the equivalent of customizable annotations of various label providers, which can help them perform their tasks in a more streamlined manner. For example, consider a scenario in which a binary classification task comprises labeling whether an individual whose medical records are being examined suffers from a particular disease or not. While viewing data items that show demographic information, results of various medical tests, reports of symptoms and the like for various individuals, a label provider may notice that several of the individuals have a combination of a particular age range and a particular set of symptoms—e.g., the individuals are all between 40 and 50 years old and all exhibit a particular symptom S1. In such a scenario, a user-defined label "between40-50-withSymptomS" may be defined and used as described above as a custom annotation for such individuals' data items. Later, based on the decision reached by the label providers, all the individuals to whom the user-defined label was assigned may potentially be labeled in a single interaction with one of the target class labels if desired.

In the embodiment depicted in FIG. 10, a text box interface for a search term filter 1024 may be implemented. The search predicates transmitted to the classification service may be decided, for example, based on the combination of text entered in the text box, a set of recommended influential terms or token sets identified by the classification service, an auto-complete feature, and the like in the depicted embodiment. During various training iterations, the classification service may identify a set of tokens or terms whose presence in a data item is highly correlated with difficulty of classifying the item, and such token sets may be included as recommended search terms (e.g., recommended search terms #1, #2 and #3 in the example scenario shown in FIG. 10). If the user types in the first letter or first few letters of such a recommended search term, or letters that are similar to the recommended search terms, the recommended search terms may be shown as an option for the search term filter, thereby enabling the user to potentially reduce the among of text that has to be entered in the depicted embodiment to identify items for which providing labels would be most beneficial. In some embodiments, the user may not even have to enter any text before one or more recommended search terms are presented as options—e.g., such terms may be presented via a drop-down menu element as soon as the user clicks in a search term entry box. As the back-end of the classification service learns more about the classification task being performed, the use of the recommended searches may help simplify the task of the label providers by helping them to focus on the more important (from the perspective of improving the quality of the classifier) data items. The presentation of the recommended search terms may also help the user (e.g., a label provider or a data scientist debugging the classifier) get a better sense of what the classification service back-end has already learned, in the training iterations that have been completed thus far, regarding the classification problem being addressed in various embodiments. For example, by choosing a recommended search term and viewing the data items that include the recommended search term, a data scientist debugging the classifier may determine the kinds of attributes that cause classification scores of data items to be predicted close to the current class boundaries in some embodiments.

In at least some embodiments, recommended search terms may not necessarily be used to help users view difficult-to-classify data items—instead, for example, some recommended search terms may be highly correlated with class memberships, thereby enabling a user to view characteristics of data items that make the data items more easily classified. In one embodiment, a user may be able to specify, via a programmatic interface, the kinds of recommended search terms to be presented—e.g., whether recommendations for terms that lead to display of difficult-to-classify items should be provided, recommendations for terms that lead to display of easy-to-classify items should be provided, or both. Generally speaking, in various embodiments, recommended search terms or predicates may be identified based on the analysis of one or more metrics. For example, in one embodiment the variance of predicted class scores from an active learning committee of classifiers among items that contain a given search term may be used to identify the recommended search terms, in which case higher variance may represent greater difficulty of classification, and lower variance may represent greater ease of classification.

Class Distribution Information

Figure 11:
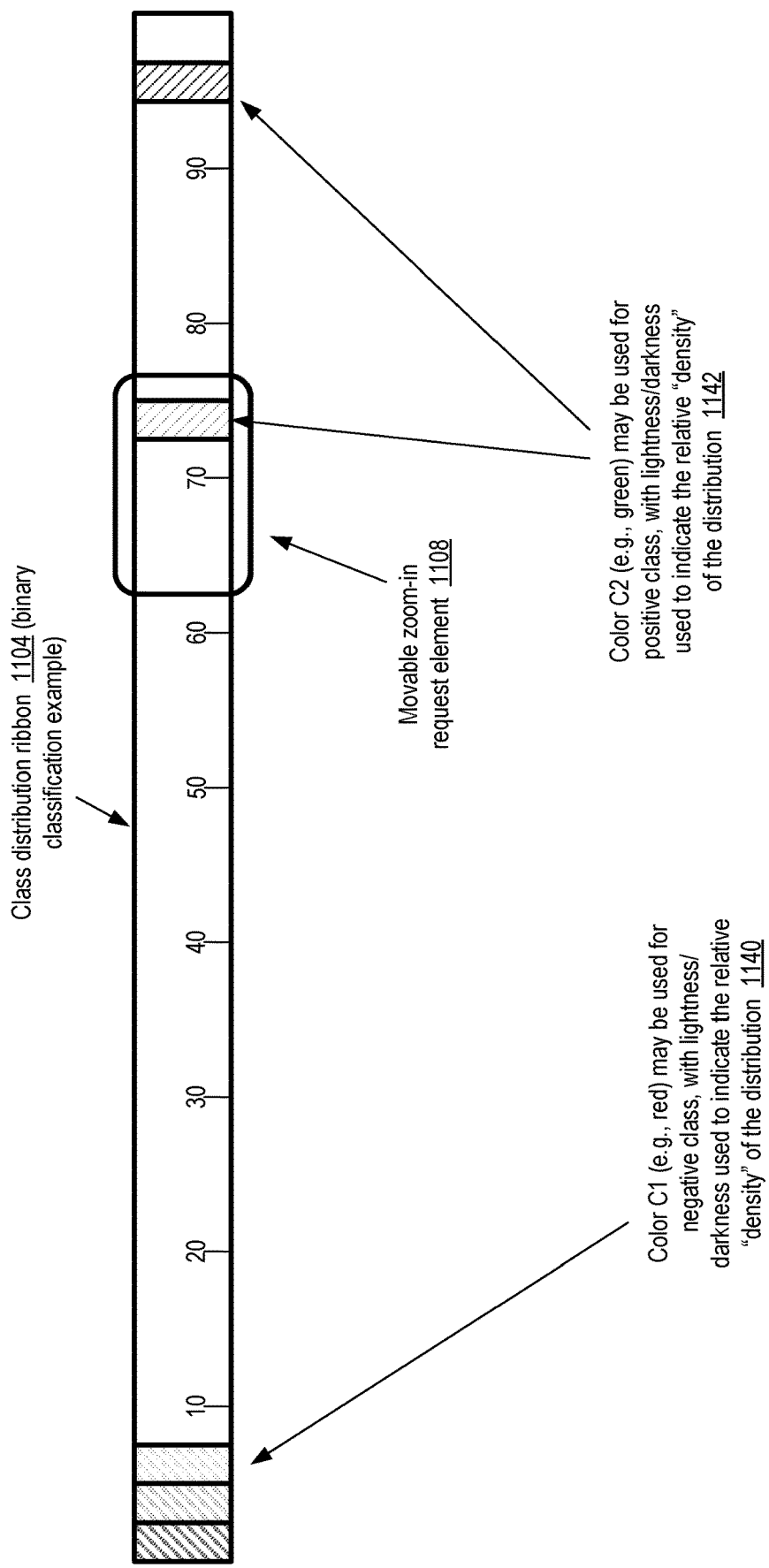
FIG. 11 illustrates an example interactive interface element for displaying class distribution information, according to at least some embodiments.

FIG. 11 illustrates an example interactive interface element for displaying class distribution information, according to at least some embodiments. In effect, in the depicted embodiment, a three-dimensional set of data pertaining to the distribution of predictions obtained during a particular set of one or more training iterations (such as the most recently completed training iteration) for a binary classifier may be provided using a combination of a ribbon-like visualization and the variation of color hues and intensities. The long edge of the ribbon (a long rectangular shape which may, for example, be positioned within a web-based interactive interface similar to that shown in FIG. 7) may comprise a binary class prediction score value axis numbered from 0 to 100 (with the 0 and 100 values being implied instead of explicitly displayed, as they can be inferred from the 10, 20, . . . , 90 values). If the two binary classes being considered are "positive" and "negative", for example, a score closer to 100 for a given data item may represent a higher probability that a data item is predicted as being part of the positive class in the depicted embodiment, while a score closer to 0 for a given data item may represent a higher probability that the data item is predicted as part of the negative class.

Small colored rectangles 1140 and 1142 may be placed at various positions within the ribbon 1104 in the depicted embodiment. The position along the 0-100 scale of a colored rectangle may indicate that some number or fraction of data items have been assigned the corresponding prediction scores—e.g., the three rectangles 1140 at the left may indicate that some number or fraction of data items have been assigned scores strongly indicative of the negative class, while the two colored rectangles 1142 between 70 and 100 may indicate that some number of data items have been assigned scores indicative of the positive class. Different colors may be used for positive and negative classes: e.g., red may be used for negative class data items, while green may be used for positive class data items in the depicted embodiments. To convey information about the relative density of the distribution with respect to each colored rectangle, in at least some embodiments the lightness/darkness or intensity of the hue may be used—e.g., a lighter/weaker shade of green or red may be used to indicate a smaller number of data items, while a darker/stronger shade of green or red may be used to indicate a larger number of data items have been assigned the corresponding range of scores. If, in one trivial example scenario, only a single intense green rectangle were shown at the "0" end of the scale, and only a single intense red rectangle were shown at the "100" end in the depicted embodiment, this would imply that as of the training iteration whose results are being represented via the ribbon, a large number of data items are predicted as "extremely negative", and a large number of data items are predicted as "extremely positive", with few or no data items in between. If, in contrast, colored rectangles of uniform color intensity occupied the entire ribbon, with no empty regions, this may indicate a fairly uniform distribution of scores between 0 and 100, indicating that per the current version of the classifier, the data items for which predictions have been generated are uniformly distributed among extremely positive, moderately positive, borderline, moderately negative, and extremely negative portions of the binary classification spectrum in the depicted embodiment.

A moveable and/or otherwise adjustable (e.g., expandable) zoom-in request interface element 1108 may be provided in the depicted embodiment, e.g., to enable users who are interested in finer-granularity details of the class distribution to view another ribbon showing details of the portion of the ribbon covered by the zoom-in request. Thus, for example, if a user clicks on the zoom-in request element as it is positioned in FIG. 11, the portion of the score range between approximately 62 and 76 may be shown in finer granularity.

Class Boundary Information

Figure 12:
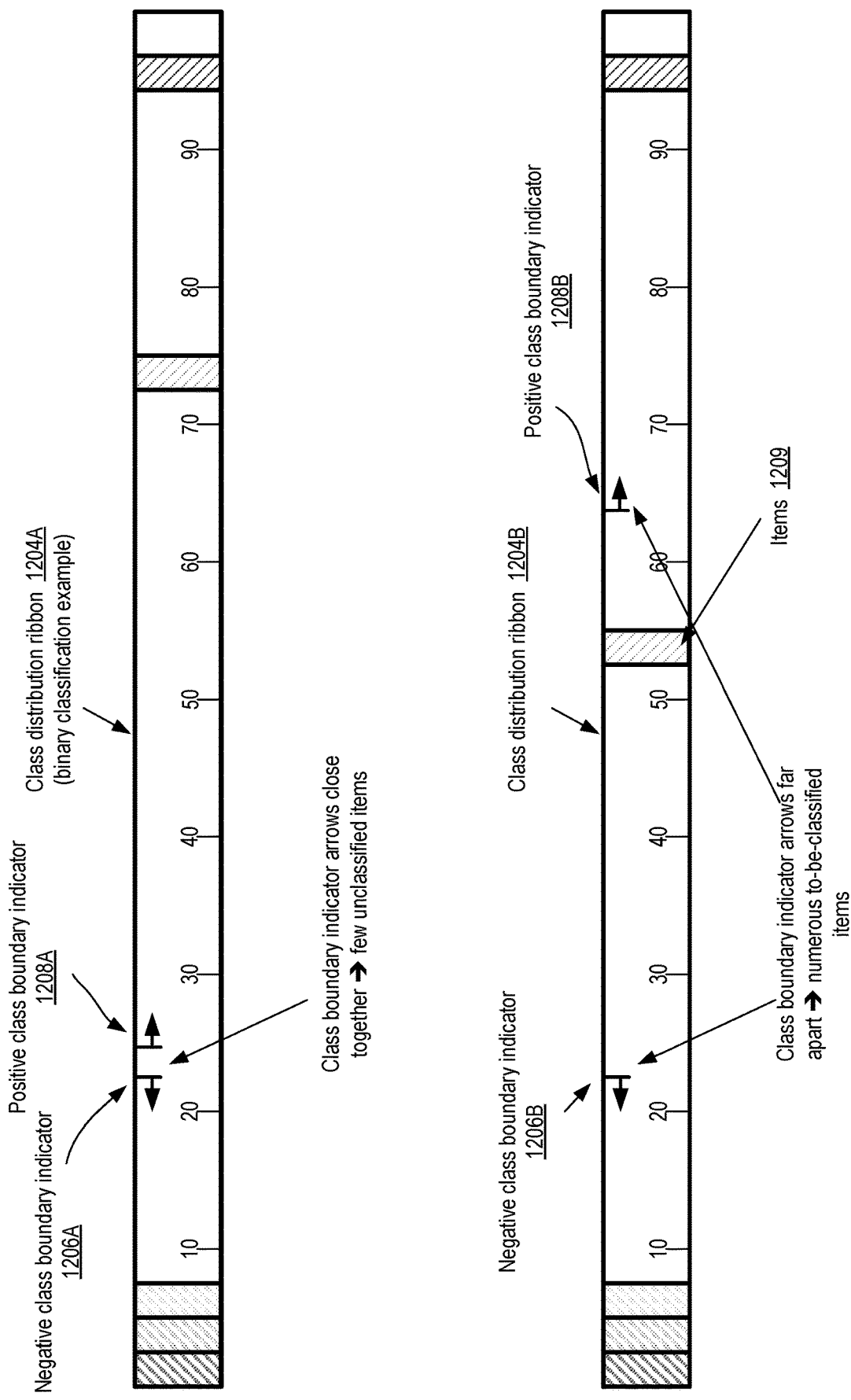
FIG. 12 illustrates example interactive interface elements that indicate the fraction of training observations whose class has not yet been determined, according to at least some embodiments.

In some embodiments, a class distribution ribbon similar to that discussed above may also provide information about class boundaries, which may, at least in the case of binary classification, in turn indicate the fraction of data items that have not yet been classified to a desired confidence level. FIG. 12 illustrates example interactive interface elements that indicate the fraction of training observations whose class has not yet been determined, according to at least some embodiments. As in the case of FIG. 11, a classifier for a binary classification problem is assumed to be under development in two example scenarios shown in FIG. 12. For each scenario, a respective class distribution ribbon (1204A or 1204B) is shown, with a pair of class boundary indicators. The left indicator 1206A or 1206B may indicate the range of predicted classification scores that are classified as negative with a selected confidence level such as 95%, while the right indicator 1208A or 1208B may indicate the range of predicted classification scores that are classified as positive with the selected confidence level.

The distance between the left and right indicators may provide (at least an approximate) an indication of the fraction of data items for which a classification prediction with a targeted confidence level has not yet been generated in the depicted embodiment. Thus, because the class boundary indicators are further apart in ribbon 1204B than in ribbon 1204A, a greater fraction of data items may remain to-be-classified in the scenario depicted using ribbon 1204B than in the scenario depicted in ribbon 1204A. Note that, at least in some cases, there may be some labeled data items (such as items 1209) which lie between the current class boundary indicators, indicating for example that while such items have been assigned predicted class scores, the items have not yet been placed in one of the target classes with the desired confidence levels. The class boundary indicators may thus provide a simple representation of the certainty or confidence levels of the current state of the classifier in at least some embodiments.

Summarized Metrics Status and Historical Trends Visualization

Figure 13:
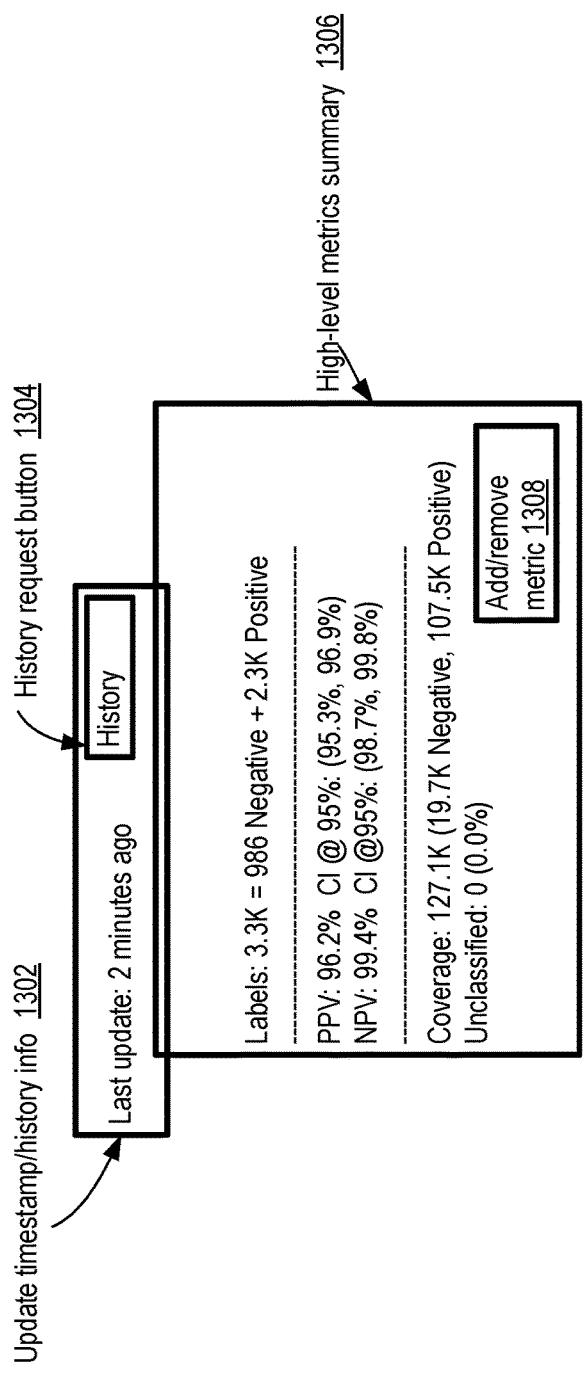
FIG. 13 illustrates an example interactive interface element that provides summarized information about a set of status indicators, according to at least some embodiments.

FIG. 13 illustrates an example interactive interface element that provides summarized information about a set of status indicators, according to at least some embodiments. Such an element may be included as part of web-based or other graphical interactive interface of a classification service in various embodiments, as also indicated in FIG. 7. An indication of the last update to the classifier (e.g., when the training of the iteration-final classifier of the most recent training iteration was completed) may be provided in an update timestamp/history information element 1302 of the interface in the depicted embodiment. A history request button 1304 may be used to submit a request for historical information pertaining to one or more classification model metrics; examples of the kinds of historical information that may be presented in some embodiments are provided below, e.g., in the context of FIG. 14.

In at least one embodiment, a high-level summary 1306 of selected model metrics may be provided, e.g., in response to a mouse click on the update timestamp and history information element 1302. Metrics summaries for a binary classification problem are shown by way of example in FIG. 13. The summary 1306 may, for example, indicate the total number of labels (approximately 3.3K or 3300 in the depicted scenario) that have been obtained at the classification service for the classification task being addressed, and provide a breakdown for the different classes (986 negative and approximately 2.3K or 2300 negative). PPV and NPV values with confidence intervals may be provided in some embodiments in the summary, as well as information about the current coverage level (e.g., the number of items that have been classified with the desired confidence levels, as well as the fraction that are as yet unclassified). In at least some embodiments, users may add new metrics to the list of metrics for which summarized and/or trend information is to be provided, or remove existing metrics, e.g., using the "add/remove metric" element 1308 in the depicted embodiment. Any of wide variety of metrics may be added/removed in different embodiments, depending on the problem domain and the type of classification (e.g., binary vs. multi-class) being attempted, such as for example PPV, NPV, accuracy, prevalence, precision, false discovery rate, false omission rate, recall, sensitivity, diagnostic odds ratio, F1 score or the like.

Figure 14:
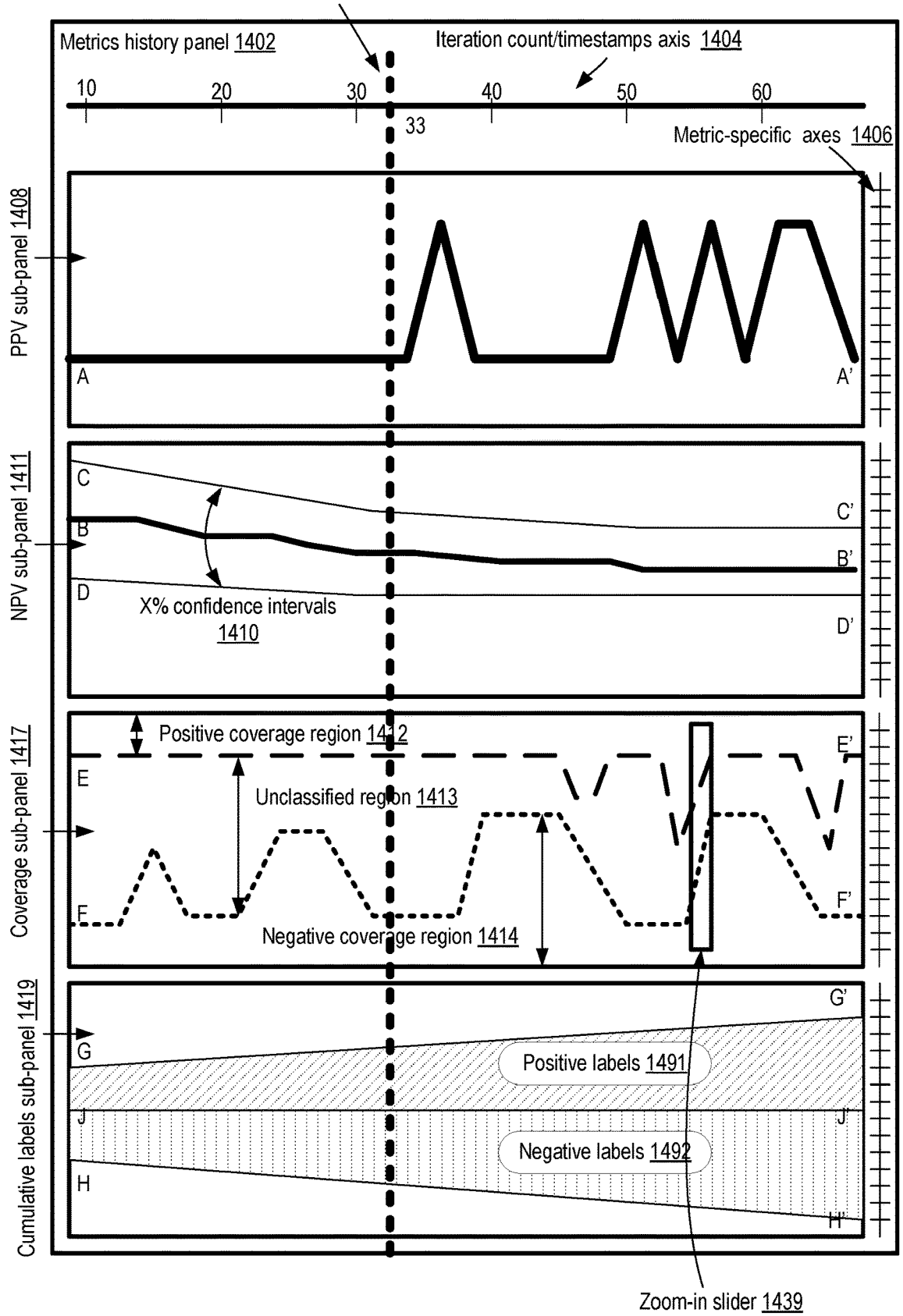
FIG. 14 illustrates an example interactive interface element that provides historical information about a set of status indicators, according to at least some embodiments.

FIG. 14 illustrates an example interactive interface element that provides historical information about a set of status indicators, according to at least some embodiments. A metrics history panel 1402 may be used to present a visualization data set associated with a set of metrics obtained from the training iterations that have been conducted thus far at the classification service with respect to a given classification problem in the depicted embodiment. The panel 1402 may, comprise a temporal axis 1404, which may for example show integer iteration identifiers and/or respective timestamps at which various training iterations were completed. Corresponding to individual ones of the iterations, values of a plurality of metrics may be displayed using respective sub-panels or graph display regions, such as PPV sub-panel 1408, NPV sub-panel 1411, coverage sub-panel 1417, and/or cumulative labels sub-panel 1419 in various embodiments. The particular metrics for which historical trend information is to be displayed may be indicated programmatically by authorized users or clients of the classification service in various embodiments. The presentation of the metrics values in a vertically stacked manner similar to that shown in FIG. 14 may be extremely helpful to analysts in that it may be easy to view the values of all the different metrics as of any given iteration or time, as indicated by vertical line 1490 in the depicted embodiment corresponding to iteration 33.

Historical trend information of the kind shown in FIG. 14 may be useful to data scientists interested in analyzing the progress of classifier development in various embodiments, as it may make it much easier to grasp how close the models are to convergence, to understand why some metrics have not yet met target thresholds, and at least in some cases to determine the kinds of guidance that should be provided (if any) to the classification service to enhance or accelerate future training iterations. As new data items are added to the training set, especially during early iterations of the overall training process, the mix of data item characteristics represented in the training sets may in some cases change substantially, which may potentially cause some metrics to fluctuate dramatically. For example, the line AA' in sub-panel 1408 shows substantial changes in PPV during a recent set of training iterations, which may indicate that a number of additional training iterations may be needed before PPV targets are met in the depicted example scenario.

With respect to at least some metrics, confidence bounds or intervals 1410 may also be indicated in the metrics history sub-panels in various embodiments. For example, with respect to NPV, the mean value over recent iterations is shown by line BB' in sub-panel 1411, while upper and lower confidence bounds (for some selected confidence interval such as 95%) may be indicated via lines CC' and DD' respectively. The confidence intervals for which such lines are to be displayed, as well as whether such lines should be displayed at all for a particular metric, may be selectable based on user-provided input in some embodiments.

A coverage sub-panel 1417 (shown for a binary classification problem in FIG. 14 by way of example) may be used in some embodiments to indicate the relative fractions of data items that are predicted to be members of different classes in various iterations, and may also be used to indicate the fraction of items that have not been classified with a targeted confidence level in the different iterations. For example, in sub-panel 1417, the distance between line EE' and the top of the panel in region 1412 may represent the fraction of items predicted (with a target confidence level) as being members of a positive class in a given iteration, the distance between line FF' and the bottom of the sub-panel in region 1414 may represent the fraction predicted as being members of the negative class, and the distances between lines EE' and FF' in the unclassified region 1413 may represent the fraction that are not yet classified in the various iterations for which the visualization is being provided. In sub-panel 1419, the cumulative numbers of positive labels 1491 (represented by the vertical distance between line GG' and JJ') collected from label providers with respect to various iterations, as well as the cumulative number of negative labels 1492 (represented by the vertical distance between line JJ' and HH') collected from label providers with respect to various iterations may be shown, indicating the growing size of the training set as the iterations proceed in the depicted embodiment. Metric-specific axes 1406 may be used to indicate the exact values for the different metrics in various embodiments. In at least some embodiments, interactive interface elements may be provided to enable users to view details for specific iterations, time ranges and/or iteration-count ranges, e.g., using zoom-in controls similar to slider 1439 shown in FIG. 14.

Diagnosis Tests for Training Progress and Termination

As indicated above, in at least some embodiments users may select and/or define a set of metrics for which respective values may be collected over classifier iterations, and for which visualization data sets may be prepared and presented to users. In some embodiments, a set of diagnosis tests may also be defined based on the status or trends in various metric values, which may be used as respective binary decision indicators to help determine whether/when to terminate training (i.e., to stop executing additional training iterations). FIG. 15 illustrates example interactive interface elements that provide information about a set of selected diagnosis tests pertaining to classifier training completion, according to at least some embodiments. The number and definitions of the tests may be determined, for example, by the classification service based on default settings for the type of classification problem being addressed, and/or based on programmatic user input. A summary indicating the number of diagnosis tests that have been passed with respect to the most recent training iteration may be provided via a diagnosis summary box 1502 in some embodiments, which may be presented as part of an interactive web-based or graphical user interface of the kind discussed in the context of FIG. 7.

In response to user input (e.g., when a user clicks within the diagnosis summary box 1502), a diagnosis details list 1504 may be presented via an interactive interface in at least some embodiments. A list of the names of the diagnosis tests being used and their current values, together with or more status indicator symbols, may be provided in at least one embodiment—e.g., a checkmark next to a diagnosis test name may indicate that the results of the test meet a targeted threshold criterion, an "X" symbol next to a diagnosis test name may indicate that the test's results are unsatisfactory, and so on. Symbols such as the "i" symbol shown next to the PPV Trend test entry may, for example, indicate that the corresponding diagnosis test has not yet designated as passed (satisfactory) or failed (unsatisfactory), so more analysis may be required. Other symbols may be used to indicate, for example, that additional information (that may not yet have been viewed) may be available pertaining to a given diagnosis test in some embodiments. Users may, in some embodiments, add new diagnosis tests to the list (e.g., using the "Add new diagnosis test" interface element 1592).

In at least one embodiment, users may designate some diagnosis tests as mandatory. Similarly, one or more diagnosis tests may be designated as optional in some embodiments.

In some embodiments, in order to provide guidance regarding the specific types of steps that should be taken to enhance or improve subsequent training, interface controls (such as the "prioritize" control elements 1594) may be used. For example, if a given diagnosis test is considered important by a user such as a data scientist and is far from passing, the user may click on a prioritize element 1594 to signal to the classification service to emphasize improvement of the results of that test, to the extent possible, in future training iterations in some embodiments. Note that such controls may not necessarily be provided or supported for some types of diagnosis tests, as it may hard to take specific actions focused primarily on such tests. The kinds of training enhancement actions that may be initiated for a particular diagnosis test may include, for example, selecting particular kinds of label feedback candidate data items, expanding the pool of label providers who have been effective at quickly providing labels for a particular class, and so on in various embodiments. In some embodiments prioritization controls of the kind indicated in FIG. 15 may not be implemented. In at least some embodiments, if a particular diagnosis test has not been passed, this may not necessarily imply that the training of the classifier has to continue—e.g., users may override the requirement that all diagnosis tests have to pass before training iterations are ended, and/or a resource limit associated with the training may be exhausted prior to the satisfactory completion of all the initially-identified diagnosis tests.

Interactive Programmatic Interfaces with Role Based Tabs

Figure 16:
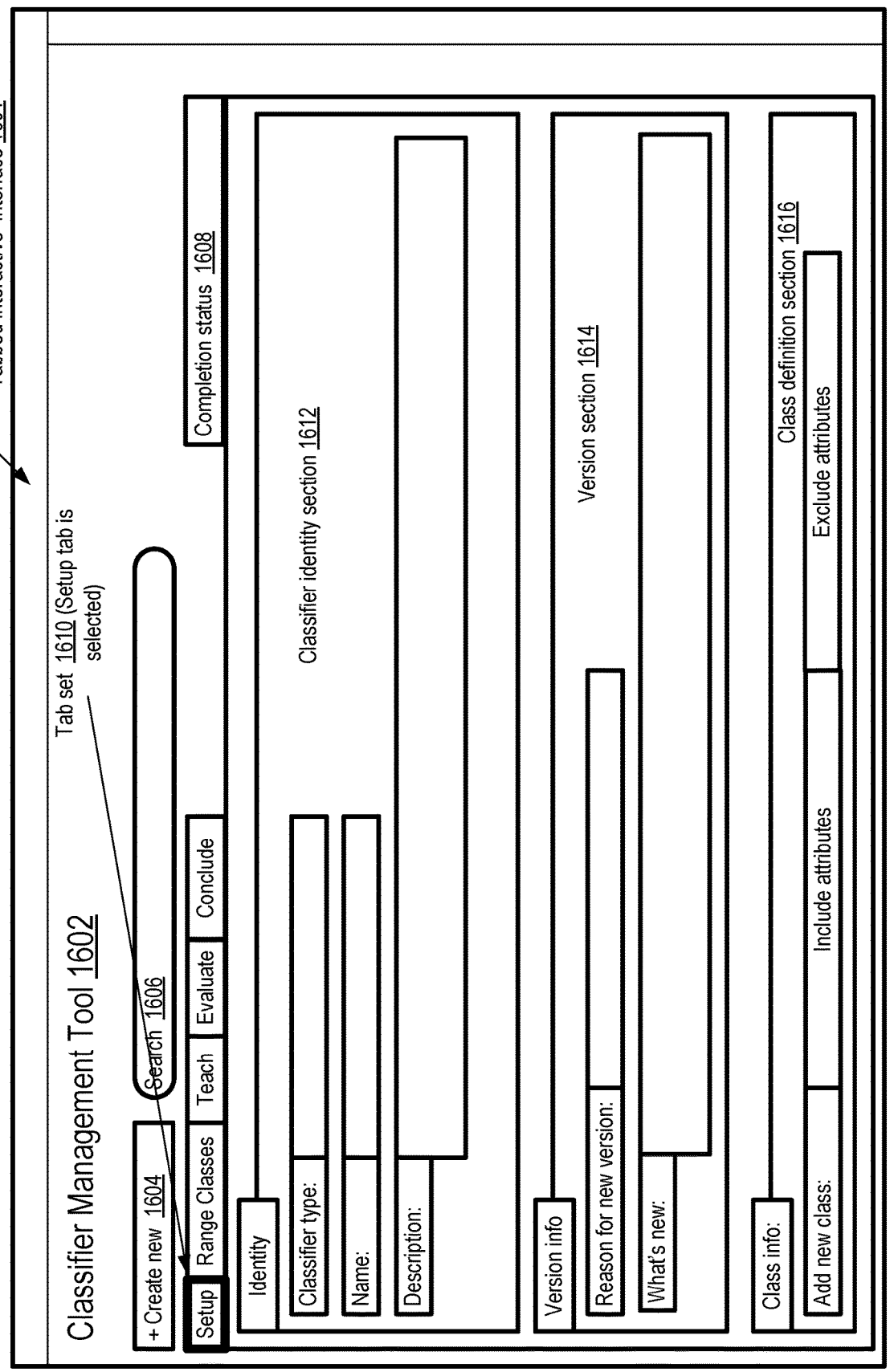
FIG. 16 illustrates aspects of an example configuration setup tab of an interactive interface for training classifiers, according to at least some embodiments.

In at least some embodiments, a set of interactive programmatic interfaces which is organized using tabs into portions corresponding (at least approximately) to different stages of classifier development and/or to different user roles may be implemented. FIG. 16 illustrates aspects of an example configuration setup tab of an interactive interface for training classifiers, according to at least some embodiments. As shown, tabbed interactive interface 1601 (which may be implemented, for example via a set of web pages and/or a graphical user interface) may indicate the name of the interface 1602 (e.g., "Classifier Management Tool"), one or more interface elements to create new classifier instances (e.g., the "Create new" element 1604) and/or to search for classifier instances (e.g., via search entry element 1606), a completion status element 1608, and a set 1610 of tabbed sub-panels in the depicted embodiment, including a Setup tab, a Range Classes tab, a Teach tab, an Evaluate tab and a Conclude Tab. In the example view depicted in FIG. 16, the Setup tab is selected as indicated by the thicker outline of the "Setup" name relative to the other tab names. The completion status element 1608 may, for example, be used to provide an overall summary of the status of the classification workflow that is underway in the depicted embodiment, and may in some embodiments be visible from multiple tabs (i.e., when any of several tabs happens to be selected).

The Setup tab interface controls may be used, as suggested by the name, to initiate a classifier workflow in various embodiments. The classifier identity section 1612 may, for example, be used to provide the classifier type (e.g., binary vs. multi-class), a name for the classifier, and/or a description of the classification effort (e.g., goals or objectives of the classifier, etc.) in the depicted embodiment. In at least some embodiments, several different versions of a classifier may be saved (and/or used in production environments) over time, and the version section 1614 may be used to indicate the reason for a new version being set up, the differences between the newer version and older versions, and so on. A class definition section 1616 may be used to provide information about the target classes into which data items are to be categorized in the depicted embodiment, and/or the manner in which data items from the data sources are to be selected to form the input data for training the classifier. For example, the names of target classes, the names and values of data item attributes to be used to select data items from data sources as part of the input data for the classification effort (which may be specified via the "include attributes" element) and/or the names of attributes and values of data item attributes to be used to exclude data items from the data sources when collecting input data for the classification effort (which may be specified via the "exclude attributes" element) may be indicated via the class definition section in at least some embodiments. The "include" and/or "exclude" attribute information provided by an entity responsible for setting up a classifier development workflow may, for example, be used by elements of the retrieval subsystem discussed earlier, e.g., in the context of FIG. 7, to extract subsets of relevant data from data sources.

Figure 17:
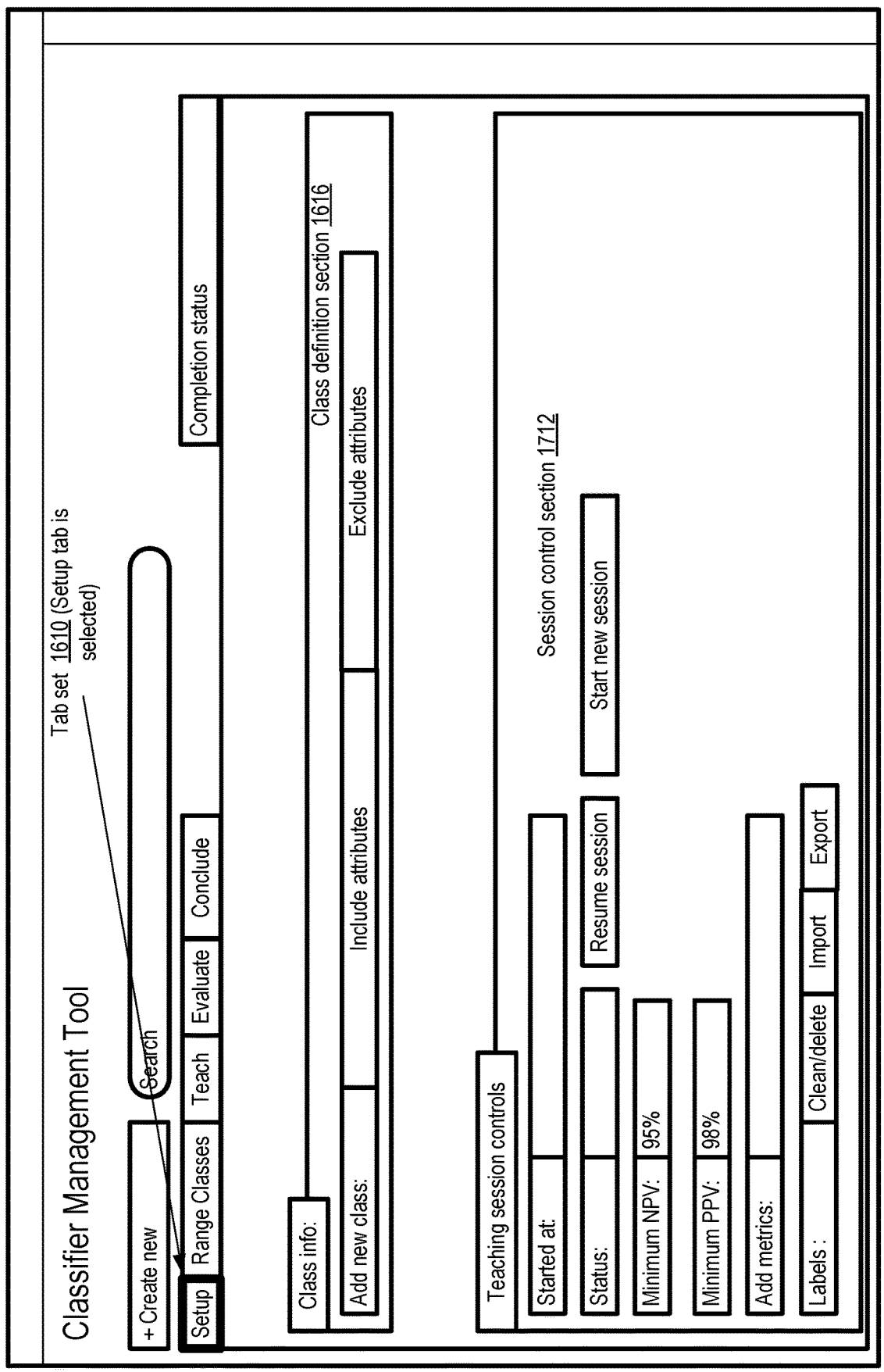
FIG. 17 illustrates additional aspects of an example configuration setup tab of an interactive interface for training classifiers, according to at least some embodiments.

FIG. 17 illustrates additional aspects of an example configuration setup tab of an interactive interface for training classifiers, according to at least some embodiments. The example view shown in FIG. 17 may, for example, be obtained by scrolling down starting from the view depicted in FIG. 17. Tab set 1610 still shows that the Setup tab is selected, as in FIG. 16. A portion of the class definition section 1616 is shown in FIG. 17 to indicate that the session control section 1712 may also be included as part of the same scrollable web page or graphical user interface view as the class definition section in at least some embodiments.

The session control section 1712 may be used to configure and manage interactive labeling sessions, which may also be referred to as "teaching sessions" in the depicted embodiment. For a given teaching session, the example interface depicted in FIG. 17 may indicate the starting time, the status of the session as a whole (e.g., whether the session is ongoing, suspended, etc.), as well as target training metric values pertaining to the session (minimum PPV, minimum NPV etc.). Interface elements may be provided to resume the session if it is suspended, to start new sessions, to add metrics, and so on in various embodiments. In the depicted embodiment, the session control section 1712 may include controls regarding importing, exporting and/or deleting labels. For example, if a given collection of data items is being re-used for a new classifier or a new version pf a previously-created classifier, labels may be extracted or imported from a data store in some embodiments, e.g., using the "Import" interface control shown in the session control section. Labels obtained during the session may be exported or saved (e.g., using the "Export" interface element) to a data store, from where they may later be extracted. Labels generated in a given session may also be deleted/cleaned (e.g., using the "Clean/delete" interface element) in various embodiments if desired. In at least some embodiments, users may be able to easily obtain explanatory information about some or all of the terms used in the interactive interface—e.g., by hovering the mouse over the "Minimum NPV" element of session control section 1712, an explanation of the NPV metric and/or why it may be beneficial to specify the metric may be provided. Similar explanatory interface elements may be implemented for the un-tabbed interfaces discussed earlier (e.g., the interface shown in FIG. 7 and its components) in various embodiments.

Example Class Range Tab View

Figure 18:
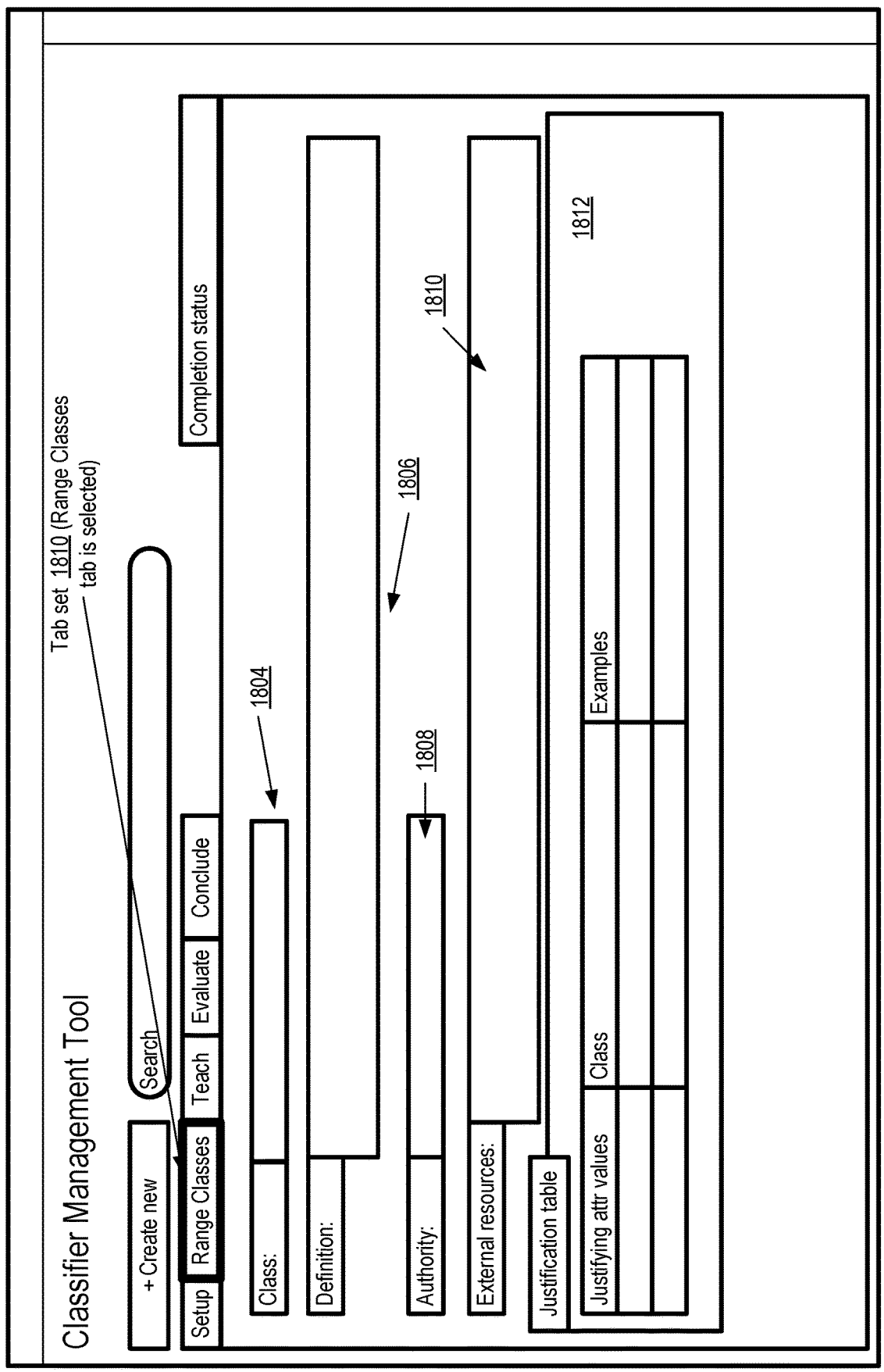
FIG. 18 illustrates aspects of an example class range definition tab of an interactive interface for training classifiers, according to at least some embodiments.

FIG. 18 illustrates aspects of an example class range definition tab of an interactive interface for training classifiers, according to at least some embodiments. In the depicted embodiment, a "Range Classes" tab of tab set 1610 may be selected, and used for example to indicate the definitions 1806 of various target classes and/or justifications for designating data items as members of the various target classes. The names 1804 of the target classes may have been indicated via the class definition portions of the setup tab view, as indicated above, in at least some embodiments. The portions of the interface shown on FIG. 18 may be used to provide information about the meaning or semantics of the classes, an authority 1808 or reference on whose basis a given class is being defined (for example, a regulation or law which may be used to classify items of an inventory), a set of external resources 1810 (such as web sites) that may be used to find out more information about the class, and so on. In at least some embodiments, a set of one or more justifying attributes may be entered, e.g., in a "justification table" section 1812 of the interface, to provide at least some level of reasoning why a given data item should be designated as a member of a particular class. Such justification information may, for example, be used to perform an initial rough classification effort, e.g., to obtain a small set of training data that can be used to start training iterations for the classifier being developed in some embodiments.

Example Labeling Feedback Tab View

Figure 19:
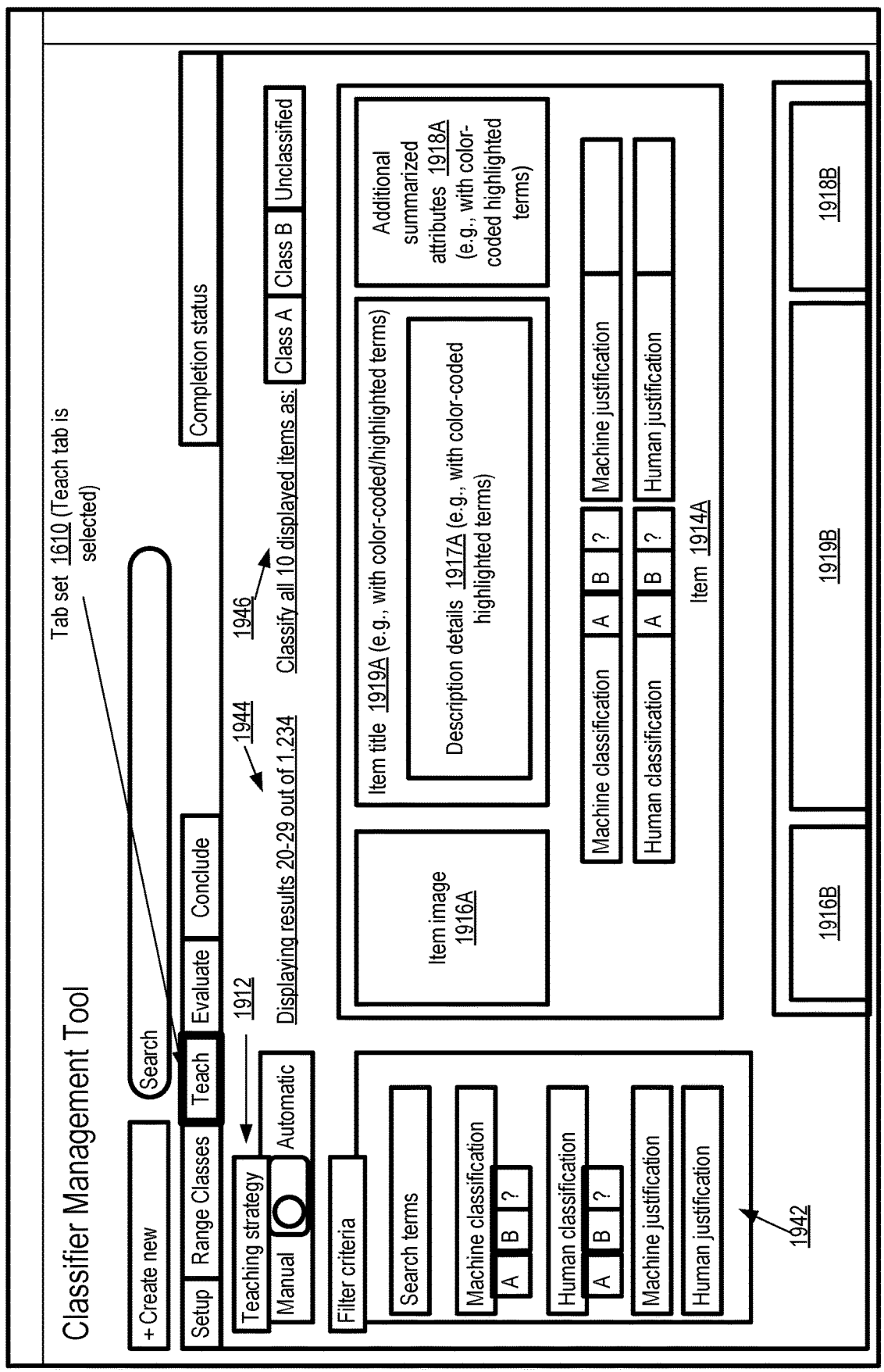
FIG. 19 illustrates aspects of an example labeling feedback tab of an interactive interface for training classifiers, according to at least some embodiments.

FIG. 19 illustrates aspects of an example labeling feedback tab of an interactive interface for training classifiers, according to at least some embodiments. The "Teach" tab may have been selected from the tab set 1610 to reach the labeling feedback section of the interface in the depicted embodiment top reach a portion of the interface usable by label providers (and/or other types of users). Manual, automatic or intermediary levels of automation may be selected for the labeling interactions in the depicted embodiment, e.g., using the "teaching strategy" interface element 1912. Filter criteria section 1942 may be used by a label provider to indicate search terms (for which recommended search predicates may be generated and presented as discussed earlier), classification service-generated class predictions (corresponding to the "machine classification" interface options) and/or labeler-provided labels (corresponding to the "human classification" interface options) in the depicted embodiment. For example, if a user wants to view data items that have been classified by the classification service as members of class "A", while being labeled as class "B" members by users, the machine classification option for class A may be selected, and the human classification option for class B may be selected using filter criteria section 1942 in the depicted embodiment. In addition, in the depicted embodiment, data items may be filtered using service-provide justifications (e.g., by entering text into the "Machine justification" text block of section 1942) and/or labeler-provided justifications (e.g., by entering text into the "Human justification" text block). Element 1944 of the Teach tab may indicate how many data item entries were retrieved in response to the previously-submitted filtering criteria (1,234 in the depicted scenario), and the subset (items 20-29 in the depicted scenario) that are currently being presented. Element 1946 may be used to label groups of data items in a single interaction, e.g., as members of class A, class B, or unclassified in the depicted embodiment.

The labeling candidate data items themselves may each be represented by a respective panel 1914, such as 1914A and 1914B in the depicted embodiment. For a given data item 1914, several pieces of information similar to those shown in FIG. 7 may be provided—e.g., an item image 1916 may be shown, an image title 1919 may be presented, description details 1917 may be provided, and additional summarized attributes 1918 may be included in the display in various embodiments. In the depicted embodiment, interface elements for information about the justifications or explanations for service-provided class predictions and/or labeler-provided class names may be included. For example, if a class prediction for data item has been made by the service, the class name may be indicted in the "Machine classification" portion of the item panel 1914, and a justification (if available) may be provided in the "Machine justification" element. Similarly, in the depicted embodiment, if/when the labeler decides to designate the item 1914 as a member of a particular class, the class may be indicated via the "Human classification" element of panel 1914 in the depicted embodiment.

Example Evaluation Tab View

Figure 20:
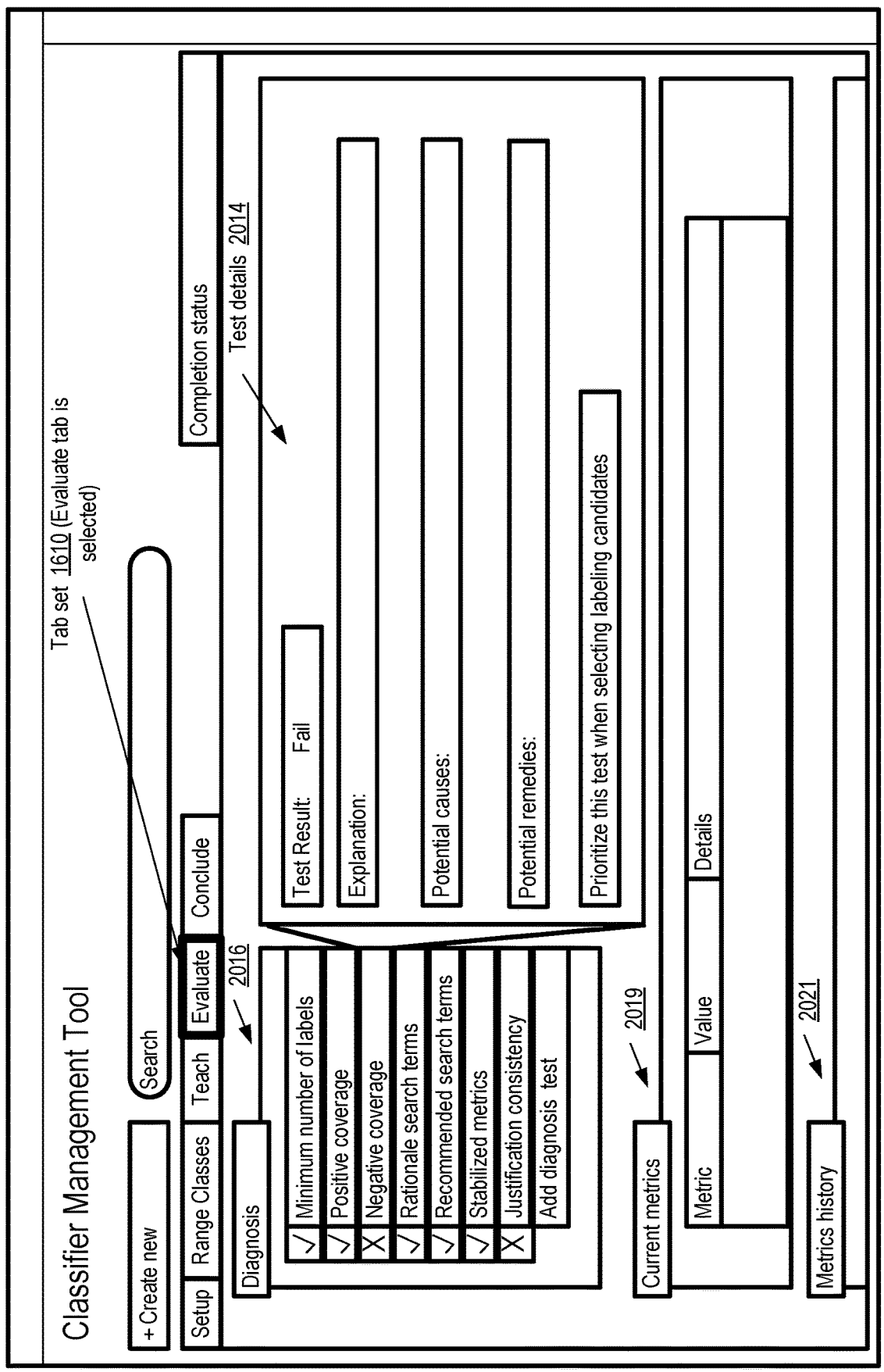
FIG. 20 illustrates aspects of an example evaluation tab of an interactive interface for training classifiers, according to at least some embodiments.

FIG. 20 illustrates aspects of an example evaluation tab of an interactive interface for training classifiers, according to at least some embodiments. In the evaluation tab, information about a set of diagnosis tests may be provided, and new diagnosis tests may be specified in at least some embodiments. In the diagnosis test list section 2016, a list of various diagnosis tests that have been identified for the current classifier development effort may be shown, along with a respective pass/fail status (indicated by a checkmark or an X respectively). An "Add diagnosis test" interface element may be used to introduce new diagnosis tests to the suite of tests being used for evaluating the state of the classifier in the depicted embodiment.

As a result of an interaction such as clicking on the name of a particular diagnosis test in list 2016, a panel comprising various types of detailed information 2014 may be displayed for that test. The details may include, for example, the current test result status (e.g., "Pass" or "Fail"), an explanation of the test, potential causes for an unsatisfactory status, zero or more potential remedies, and/or an interface element that may be used to prioritize the test when selecting additional labeling candidates in the depicted embodiment. Information about various metrics that are being collected (some of which may be used for the diagnosis test) may be provided in a current metrics panel 2019 of the evaluation tab in the depicted embodiment. Details of historical values and trends of selected metrics, similar to the kinds of information illustrated in FIG. 14, may be provided via one or more metrics history panels 2021 in the depicted embodiment.

Example Training Conclusion Tab View

Figure 21:
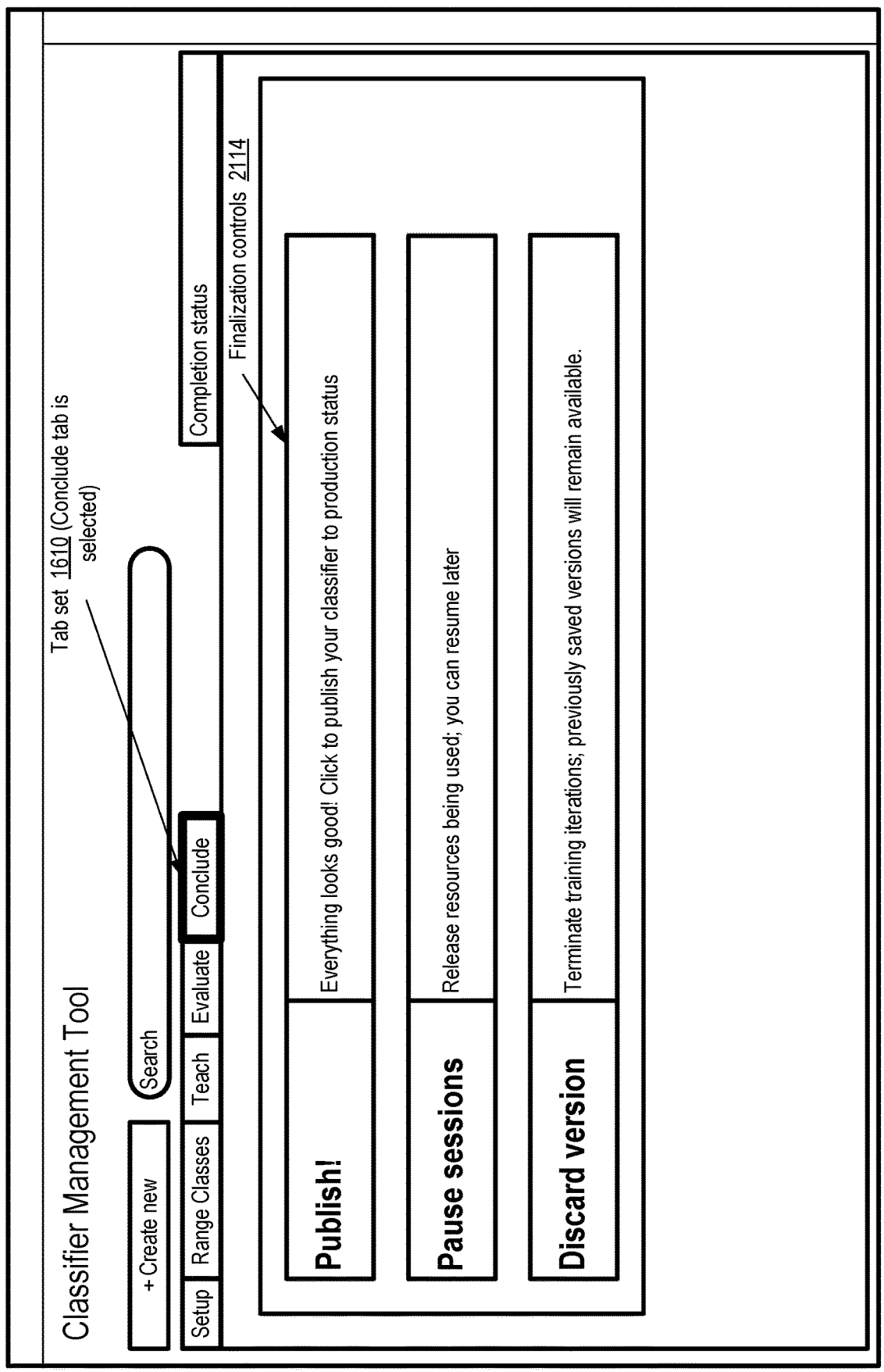
FIG. 21 illustrates aspects of an example training effort pause and termination tab of an interactive interface for training classifiers, according to at least some embodiments.

One of the tabs of a multi-tab interactive interface may be used to terminate further training and approve of a trained classifier in some embodiments. FIG. 21 illustrates aspects of an example training effort pause and termination tab of an interactive interface for training classifiers, according to at least some embodiments. The tab may be labeled the "Conclude" tab in the depicted embodiment. As shown, such a tab may provide at least three types of interactive controls in some embodiments: a "Publish" control to approve the classifier (for which various evaluation and/or diagnosis results may have been presented via the "Evaluate" tab"), a "Pause sessions" to stop further labeling and training at least temporarily, and a "Discard version" control to remove information about the current version's training iterations.

Note that although a set of diagnosis tests may have been selected (e.g., based on user input) to help make decisions as to when training of a model should be considered complete in various embodiments, the "Publish" interface element may be used to override the diagnosis-based termination of training—e.g., a given classifier may be approved and published for production use in some embodiments even if some diagnosis tests have not yet been passed. Analogously, in at least some embodiments, a classifier may not be approved or transitioned to production even if all the selected diagnosis tests have succeeded—e.g., an authorized user may discard the current version if desired regardless of how many diagnosis tests have succeeded. In at least one embodiment respective sets of users of a classification service may be granted permissions to access and/or interact with controls of different sets of tabs of the kind shown in FIG. 15-FIG. 21. For example, some users may be granted permissions to access and provide input via the Setup and Range classes tabs, others (e.g., label providers) via only the Teach tab, and yet others via the Evaluate and/or Conclude tabs. The multi-tab interface may allow a simplified way of separating responsibilities associated with various phases of the workflow of training a classifier using interactive guided labeling in various embodiments. It is noted that a given classification service or tool may employ any desired combinations of the elements and features illustrated in FIG. 7-FIG. 21 in various embodiments. At least some of the individual interface features shown in FIG. 7-FIG. 21 may not necessarily be implemented in some embodiments.

Classification Service API Overview

The classification service may implement a set of application programming interfaces (APIs) in various embodiments, which may be invoked from client-side devices (e.g., desktops, laptops, tablet devices, phones or the like) when clients of the service utilize interactive interface elements similar to those discussed above. That is, in such embodiments, the interactions of users with graphical or web-based interfaces (e.g., requests to start a new classifier training workflow, submissions of one or more labels for candidate data items, etc.) may be translated into respective underlying API calls. In at least some embodiments, one or more programmatic interactions with the service may be performed directly using API calls—e.g., a training workflow of a given classification effort may be initiated via an API call without using a graphical user interface.

Figure 22:
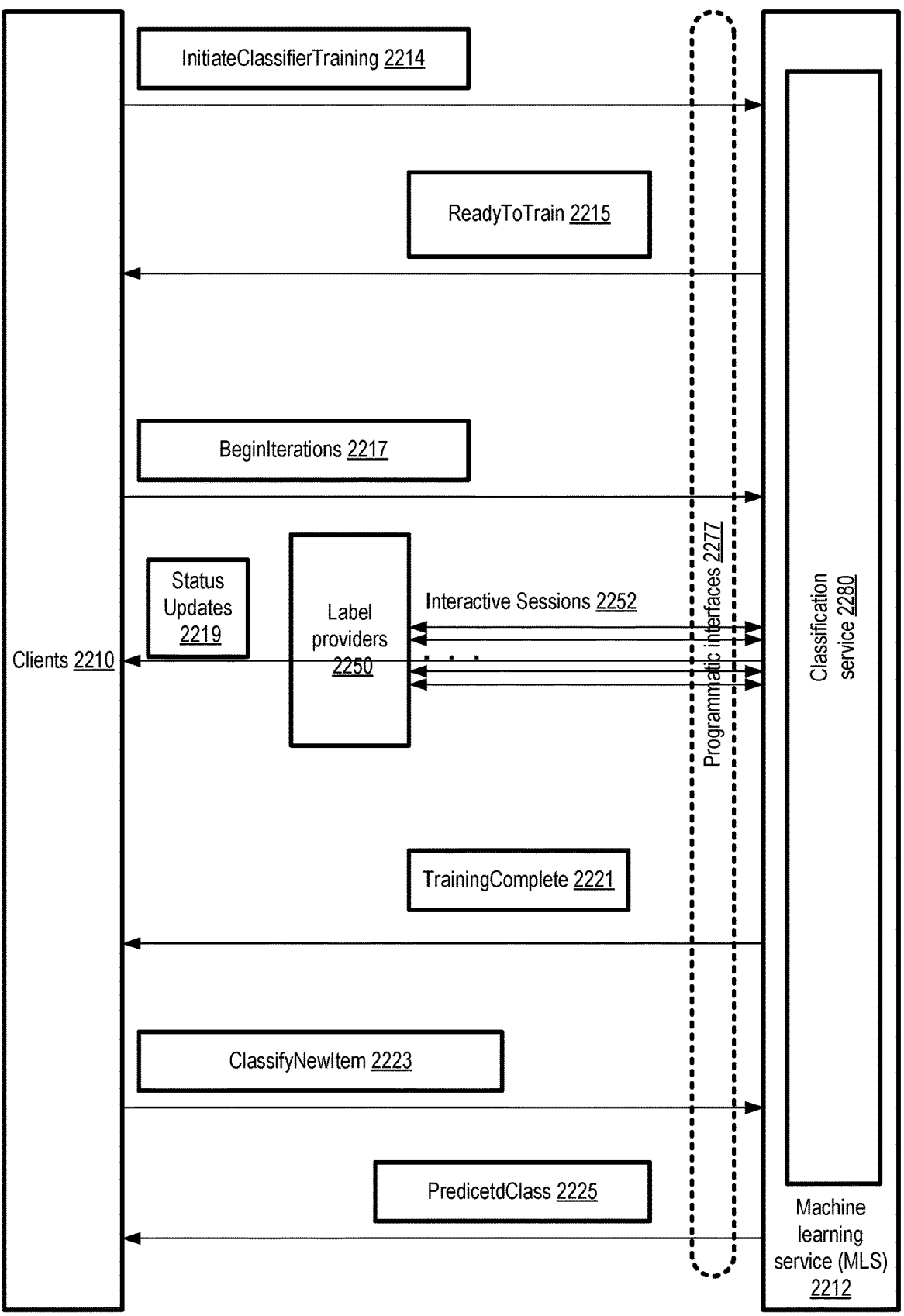
FIG. 22 illustrates a high-level overview of invocations of application programming interfaces for interactions between clients and a machine learning service utilizing interactive labeling feedback for classifier training, according to at least some embodiments.

FIG. 22 illustrates a high-level overview of invocations of application programming interfaces for interactions between clients and a machine learning service utilizing interactive labeling feedback for classifier training, according to at least some embodiments. As shown, a classification service 2280 may be implemented as a subcomponent of a more general machine learning service (MLS) 2212 in the depicted embodiment. The machine learning service 2212 may implement one or more programmatic interfaces 2277 for its clients 2210, including for example a set of APIs which may be invoked directly or indirectly by clients to submit requests for various machine learning tasks, receive responses to such requests, receive asynchronous notifications regarding the status of various tasks, and so on. Other types of programmatic interfaces, such as web-based interactive sites, command-line tools, or graphical user interfaces may also be implemented in various embodiments by the MLS.

A client 2210 may submit an InitiateClassifierTraining request 2214 to set up a classifier training configuration in the depicted embodiment. The request may indicate various properties of a desired classifier via respective parameters; example parameters that may be specified for such a request in some embodiments are discussed in further details below in the context of FIG. 23. In response to the request, preparatory actions may be undertaken at the MLS, such as identifying one or more labeling feedback providers that are available for the classifier, identifying a set of computing platforms to be used as training resources, and so on. When the MLS has completed its preparations, a ReadyToTrain response 2215 may be transmitted to the client 2210 in the depicted embodiment. In some embodiments, it may take some time to complete the preparations, and the ReadyToTrain response 225 may be provided by an asynchronous mechanism such as an email, a text message or the like.

The client 2210 may then submit a BeginIterations request 2217 to the MLS in the depicted embodiment to start the training iterations. The MLS may start one or more guided interactive labeling sessions 2252, similar to those discussed above, with a selected group of one or more label providers 2250 in various embodiments. A relatively small training set (whose labels may, for example, be assigned automatically by the MLS based on keywords associated with target classes) may be used for the first training iteration in some embodiments, and the training set may then be enlarged via the sessions 2252 based on presentation of labeling candidate data items to the label providers 2250. The labeling candidate data items may be presented as part of a visualization data set in an order based on a respective rank, with respect to estimated learning contribution, associated with including individual ones of candidates in a training set for a subsequent training iteration in at least some embodiments. As a result of the ordering, even if a label provider is able to provide just a few labels for the candidates presented at the start of the ordered collection, the MLS may be able to include more useful labels in the training sets for subsequent iterations than if randomly-selected data items had been labeled in such embodiments. The submissions of the labels by label providers 2250 may be asynchronous with respect to the start/end of any given training iteration in various embodiments—e.g., when a given training iteration is completed at the back-end servers of the MLS, the set of labels that have been submitted since the most recent training set was constructed may be used to expand the training set for the next training iteration. In at least one embodiment, the label providers 2250 may not necessarily be made aware of the starting and ending of training iterations—instead, they may iteratively receive new sets of labeling candidates, submit labels and/or filtering criteria for data items as and when desired, until the training is eventually terminated.

Status indicators or updates 2219 with respect to various classifier training metrics may be provided, e.g., automatically or in response to additional programmatic requests, to the clients by the MLS 2212 in the depicted embodiment. In at least some embodiments, a set of metrics whose status is to be provided may be defined and/or selected by the clients 2210; in other embodiments, the MLS 2212 may select a default set of metrics for which status indicators are to be provided, e.g., based on the type of classification (binary versus multi-class) being performed, and/or based on the problem domain being addressed. In some cases the status indicators may be derived from trends in the underlying metrics—e.g., a stability status may be determined with respect to a given metric based on the variation among the most recent N values collected for a given metric. Based on objectives associated with the status indicators and/or the underlying metrics, one or more training enhancement actions may be undertaken in various embodiments—e.g., the kinds of labeling feedback candidate items to be presented to one or more label providers may be determined such that the value of a particular metric may be expected to move in a desired direction.

Eventually, e.g., after some set of specified training objectives have been satisfied and/or a budget for training resources or time has been exhausted, a TrainingComplete message 2221 may be transmitted from the MLS to the client in the depicted embodiment. Alternatively, in some embodiments, training iterations may be terminated at the initiative of the client, e.g., in response to receiving a programmatic request to terminate the training. After the training is complete, a trained version of the classifier (e.g., the iteration-final classifier of the most recent training iteration) may be used to classify data items that were not used during training. For example, in the depicted embodiment, a ClassifyNewItem request 2223 may be submitted programmatically to the MLS, and a PredictedClass response 2225 may be sent in response based on the prediction generated by the trained model. A number of other types of programmatic interactions via interfaces 2277 may be supported in various embodiments, and some of the programmatic interactions indicate sin FIG. 22 may not be supported in at least one embodiment.

Example Classifier Training Request

Figure 23:
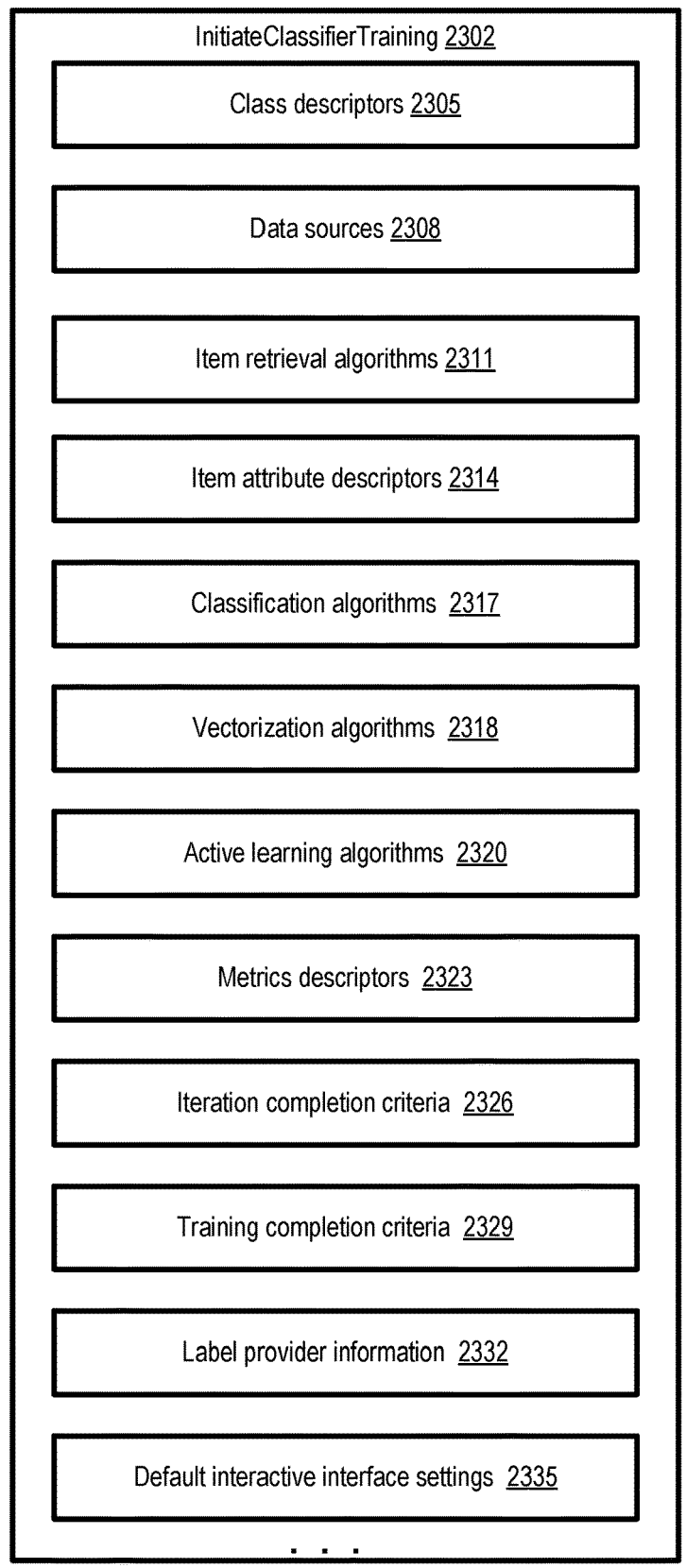
FIG. 23 illustrates example elements of a programmatic request to initiate training of a classifier, according to at least some embodiments.

FIG. 23 illustrates example elements of a programmatic request to initiate training of a classifier, according to at least some embodiments. As shown, an InitiateClassifierTraining request 2302 may include, among other parameters, a class descriptors parameter 2305, a data sources parameter 2308, identifiers or names of one or more item retrieval algorithms 2311, a set of item attribute descriptors 2314, identifiers or names of one or more classification algorithms 2317, identifiers or names of one or more vectorization algorithms 2317, identifiers or names of one or more active learning algorithms 2320, one or more metrics descriptors 2323, one or more iteration completion criteria 2326, one or more training completion criteria 2329, label provider information 2332, and/or a set of default interactive interface settings 2335 in the depicted embodiment.

The class descriptors parameter 2305 may be used to specify the target classes into which data items are to be categorized in the depicted embodiment, and/or one or more specific attribute values (such as keywords included in the titles/descriptions of the data items) that may be used to create an initial training set. The data sources 2308 may, for example, identify databases, log files, web sites or the like from which the data items may be retrieved by the classification service, as well as credentials to be used to access the data items in some embodiments. Item retrieval algorithms 2311 may, for example, indicate how data items relevant to the classification effort should be obtained from the data sources—e.g., whether a search based on keywords should be used, whether all the data items of a given data source should be retrieved, whether decryption/decompression is to be performed (and if so, the algorithms to be used for decryption/decompression). Attribute descriptors 2314 may indicate the names and descriptions of various relevant attributes of the data items, and how various relevant attributes of data items may be parsed/extracted from the raw data items if needed in at least some embodiments.

The specific algorithm(s) to be used, e.g., at least for the final classifier of various training iterations, such as a logistic regression algorithm, a neural network-based algorithm, or the like may be indicated via the classification algorithms parameter 2317 in the depicted embodiment. One or more algorithms to be used for generating feature vectors from the raw attribute values may be indicated via vectorization algorithms parameter 2318 in some embodiments. Active learning algorithms (such as query by committee, expected error reduction, variance reduction, or the like) to be used to help rank label feedback candidate data items, such that more useful (from the point of view of accelerating learning) data items have a higher probability of being labeled earlier in the process of expanding the training set, may be specified via the active learning algorithms parameter 2320 in the depicted embodiment.

Information about one or more metrics to be collected from the training iterations may be provided via metrics descriptors parameter 2323 in some embodiments. A given training iteration may comprise one or more epochs (passes through the training data set available for the iteration in some embodiments. Rules to determine when a given training iteration is to be considered complete (e.g., when a specified number of epochs is completed, when the difference in a metric value from a previous epoch falls below a threshold, when a specified amount of time has elapsed, when a specified amount of processing resources have been consumed, etc.) may be indicated via iteration completion criteria parameter 2326 in some embodiments. Similarly, in at least some embodiments, training completion criteria parameter 2329 may include a set of rules (e.g., the set of diagnosis tests that have to be passed, an overall training budget expressed in terms of resource usage or time, etc.) to be used by the classification service to stop scheduling further training iterations.

In some embodiments, at least some level of guidance regarding label providers to be used during the classification effort may be provided to the classification service as part of a classifier training initiation request. For example, in the depicted embodiment, the label provider information parameter 2332 may be used to indicate a set of label providers that may be available, or may have the requisite subject matter knowledge, to provide labels for the classifiers. The maximum or minimum number of classifiers to be used, and/or a budget associated with label generation (e.g., in a scenario where the label providers are being paid based at least in part on the number or rate of labels they provide) may be indicated in parameter 2332 in some embodiments. In at least one embodiment, one or more settings for the interactive programmatic interfaces to be used, such as the number of candidate data items to be presented at a time to a given label provider, may be specified via parameter 2335.

In one embodiment, some or all of the parameters indicated in FIG. 23 may be specified as part of a configuration file in some selected format (e.g., JavaScript Object Notation (JSON), Extended Markup Language (XML) or the like). In at least some embodiments, one or more of the parameters indicated in FIG. 23 may not necessarily be included in a training initiation request by a client. In various embodiments, default values may be selected at the classification service for some parameters for which specific values are not provided by the client. In some embodiments, values for individual ones of the parameters may be specified in separate programmatic interactions—that is, not all the parameter values may be sent in the same request. Other parameters, not indicated in FIG. 23, may be transmitted to the service in some embodiments.

Customized Labelling Sessions

Figure 24:
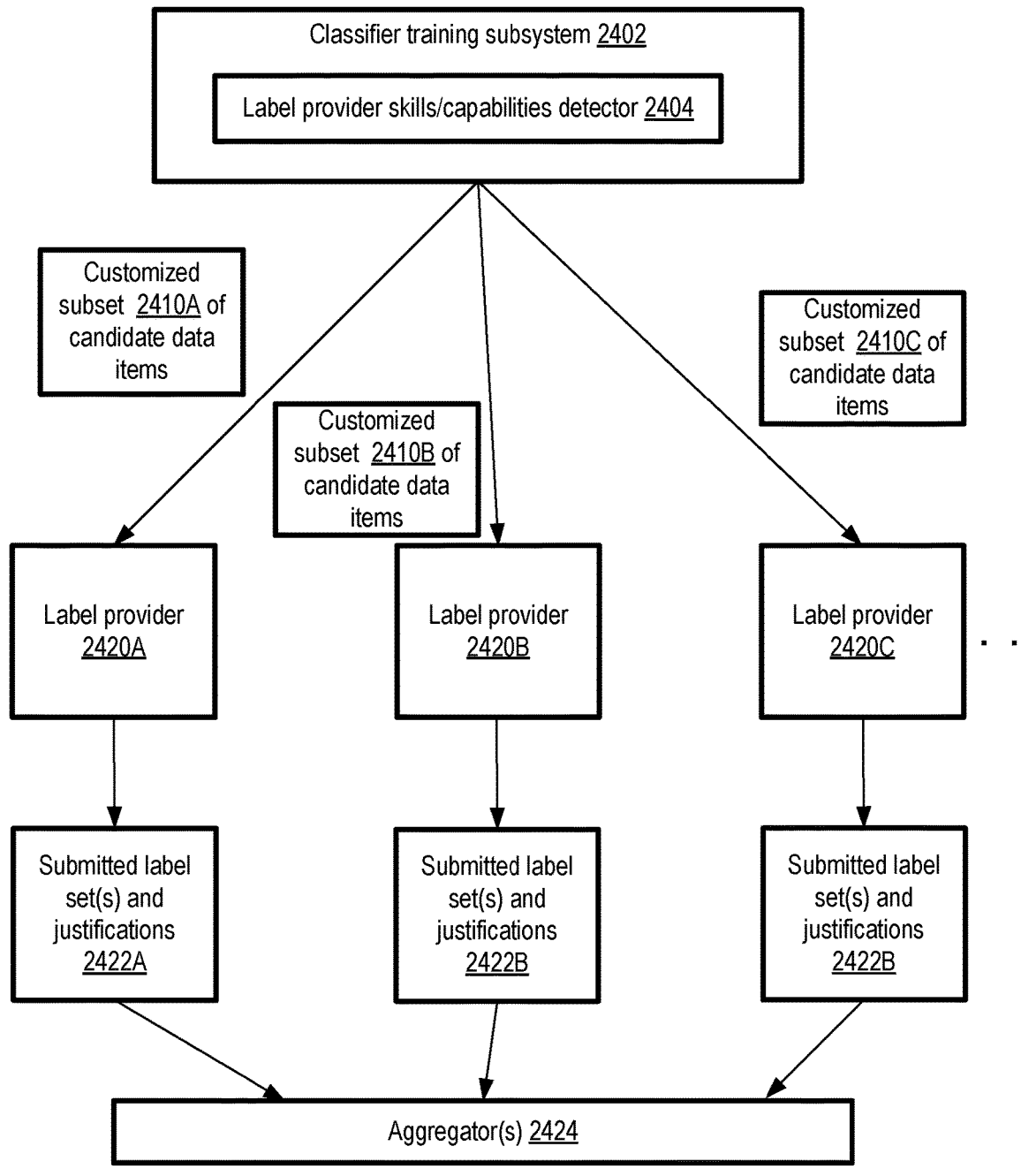
FIG. 24 illustrates an example scenario in which the set of candidate data items presented for labeling feedback may be customized for respective label providers, according to at least some embodiments.

In scenarios in which multiple label providers are used, individual ones of the label providers may have differing capabilities and responsiveness characteristics—e.g., some label providers may be faster or otherwise superior to others with respect to identifying data items of particular classes, and so on. FIG. 24 illustrates an example scenario in which the set of candidate data items presented for labeling feedback may be customized for respective label providers, according to at least some embodiments. In the depicted embodiment, a classifier training subsystem 2402 may comprise, among other components, a label provider skills/capabilities detector 2404 implemented using one or more computing devices. Such a detector may, for example, keep track of how quickly different label providers such as 2420A, 2420B or 2420C respond to label feedback requests, the extent to which the labels provided by the different label providers 2420 tend to agree with the class predictions generated at the training subsystem, and so on. Using such metrics, respective profiles of the different label providers may be generated in at least some embodiments.

In turn, the profiles or characteristics of the label providers may be used in some embodiments to customize the respective subsets of candidate data items that are presented to the various label providers. For example, customized subset 2410A may be presented to label provider 2410A, customized subset 2410B may be presented to label provider 2420B, and customized subset 2420C may be provided to label provider 2420C. In one embodiment, the skills/capabilities detector may itself employ machine learning models to help select the set of labeling candidate data items to be presented to the individual label providers. The subsets 2410 may differ from one another, for example, in size (e.g., label providers that provide feedback faster may be presented with more candidates), in data item attributes (e.g., a label provider that has been identified as being better at discriminating among hard-to-label data items may be presented with candidate data items that are ranked higher in degree of labeling difficulty, and so on), and so on.

In at least one embodiment, the programmatic interfaces of the classification service may be used by authorized entities (e.g., the data scientists analyzing the progress of the classifier, stakeholders on whose behalf the classifier is being trained, and so on) to view the labels (and/or justifications for such labels) produced by individual ones of the label providers. For example, a user may be able to view label sets and justifications 2422A corresponding to one or more submission by label provider 2420A during a guided labeling session, label sets and justifications 2422B from label provider 2420B, label sets and justifications 2422C from label provider 2420C, and so on in the depicted embodiment. In at least some embodiments, to ensure the privacy of individuals performing the roles of label providers, personal identification information pertaining to any given label provider may be obfuscated and/or made inaccessible to other users of the interactive interfaces, but an anonymized identifier (e.g., LP0034 or "label provider 34" for one of a pool of 50 label providers) may be used to distinguish the label providers and their work products from one another. In at least one embodiment, based on an analysis of metrics status or trends, one of the training enhancement operations that may be implemented may comprise increasing or decreasing the size of a pool of label providers being used for a given classifier training exercise. In some embodiments, respective labels for a given data item may be obtained from different label providers, and one or more aggregator(s) 2424 may reconcile the differences (if any) among the labels obtained for that data item. For example, if label providers 2420A and 2420C provided label L1, while label provider 2420B provided label L2, an aggregator 2424 may examine the corresponding justifications (and/or use a majority-vote-based technique) to determine the label that should be used for the data item.

Provider Network Environment

Figure 25:
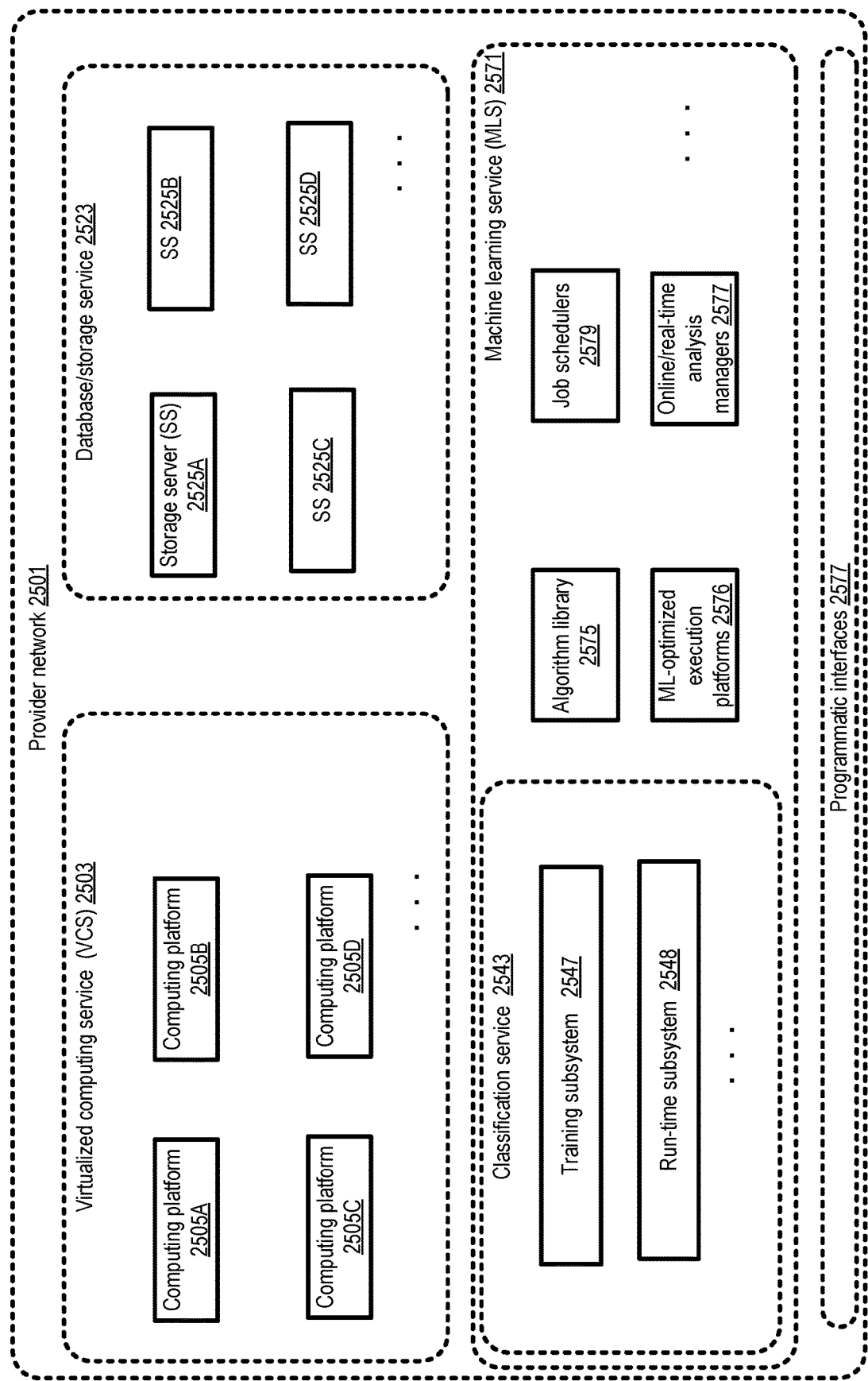
FIG. 25 illustrates an example provider network environment in which a classification service may be implemented, according to at least some embodiments.

In at least some embodiments, the classification service may be implemented as part of a suite of services of a provider network. FIG. 25 illustrates an example provider network environment in which a classification service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 2501 may comprise resources used to implement a plurality of services, including for example a virtualized computing service (VCS) 2503, a database/storage service 2523, and a machine learning service (MLS) 2571. The machine learning service 2571 in turn may comprise a classification service 2543 (which may have at least some of the features and functionality of the classification service discussed in the context of FIG. 1 and other figures) in at least some embodiments; in other embodiments, the classification service may be implemented as a separate service rather than as a component of the MLS. Components of a given service may utilize components of other services in the depicted embodiment—e.g., for some machine learning tasks, a component of the machine learning service 2571 may utilize virtual machines implemented at computing platforms such as 2505A-2505D of the virtualized computing service, the raw data and/or metadata for various machine learning tasks may be stored at storage servers 2525 (e.g., 2525A-2525D) of storage service 2523, and so on. Individual ones of the services shown in FIG. 25 may implement a respective set of programmatic interfaces 2577 which can be used by external and/or internal clients (where the internal clients may comprise components of other services) in the depicted embodiment.

As shown, the classification service 2543 may comprise, among other components, a training subsystem 2547 and a run-time subsystem 2548 in the depicted embodiment. The training subsystem may comprise one or more computing devices that collectively coordinate the implementation of the training iterations and the asynchronous labeling sessions as discussed earlier in various embodiments. The run-time subsystem may comprise one or more computing devices which may be used to manage the execution of trained classifiers to provide class predictions after the training iterations are complete. The classification service 2543 may interact with one or more other services of the provider network in at least two ways in the depicted embodiment. First, resources of other services, such as computing platforms 2505 or storage servers 2525 may be used to perform some of the computations involved in classifier training and execution, and/or to store input data or results of classifiers—e.g., one or more of the data sources from which data items are retrieved may comprise resources of the database/storage service. The storage service 2523 and/or the VCS 2503 may each provide high levels of availability, data durability, and failure resilience, enabling workloads associated with a large collection of classification customers to be handled in various embodiments. Of course, in various embodiments, algorithms obtained from algorithm library 2575 may be used for various aspects of classifier training, labeling feedback candidate selection and the like. In some embodiments, execution platforms 2576 that are optimized specifically for machine learning algorithms may be employed for classifier training and/or execution. Job schedulers 2579 may coordinate resource allocation and scheduling for numerous classifier development efforts concurrently in some embodiments. In one embodiment, online/real-time analysis managers 2577 of the MLS may be used to respond to classification requests for streaming data records as soon as the records are obtained.

In some embodiments, the techniques for supporting the training and execution of classifiers may be implemented without acquiring resources of network-accessible services such as those shown in FIG. 25. For example, a standalone tool implemented at one or more computing devices which are not part of a network-accessible service may be used in some embodiments.

Methods for Implementing a Classification Service

Figure 26:
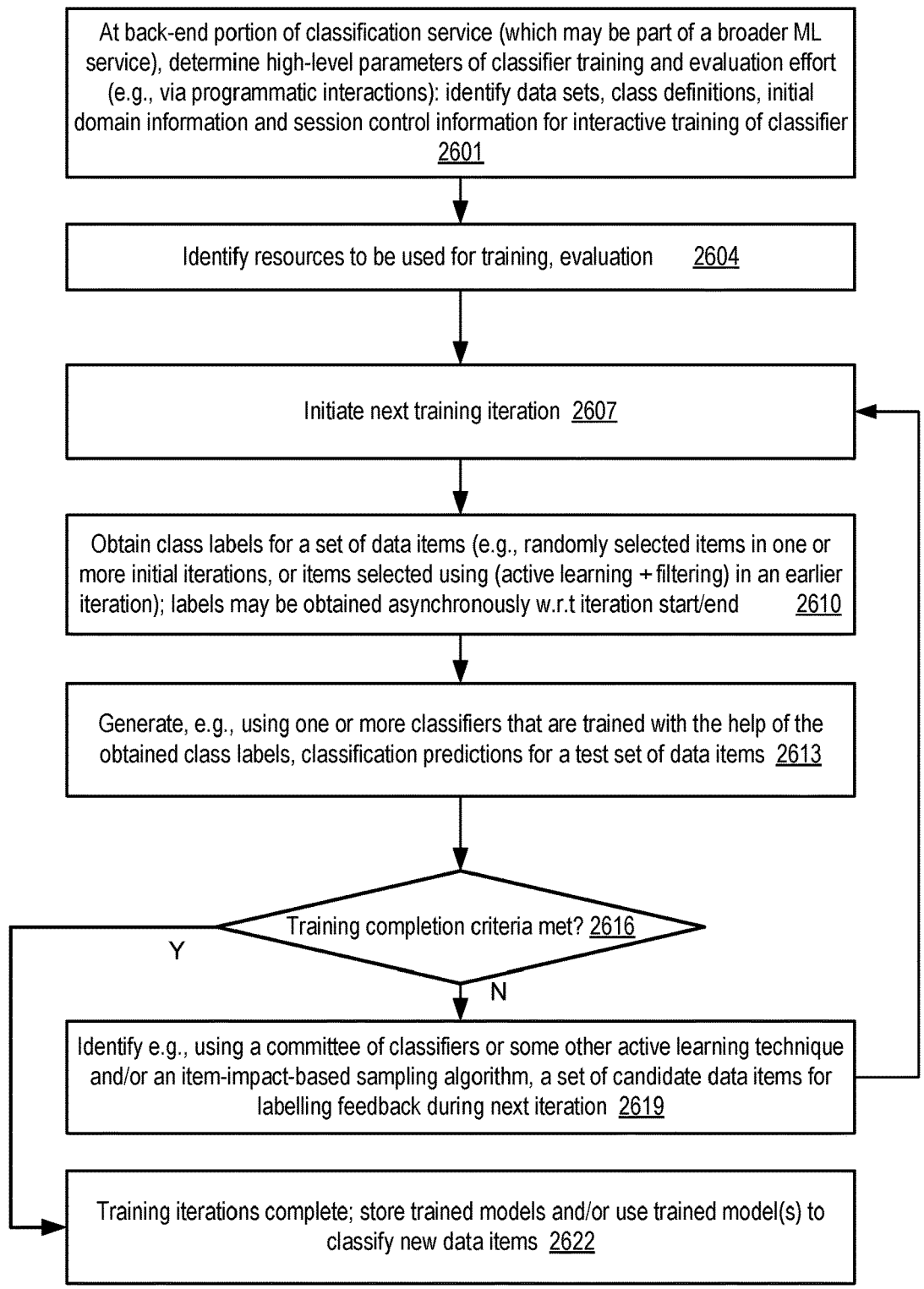
FIG. 26 is a flow diagram illustrating aspects of operations that may be performed to train classifiers with the help of interactive labeling feedback sessions, according to at least some embodiments.

FIG. 26 is a flow diagram illustrating aspects of operations that may be performed to train classifiers with the help of interactive labeling feedback sessions, according to at least some embodiments. High-level parameters (as well as meta-parameters) of a classifier training and evaluation effort may be determined (element 2601). At least some of the parameters or meta-parameters may be obtained from programmatic requests submitted by clients of a classification service and/or a broader machine learning service of the kinds discussed earlier in some embodiments. Other parameters may be selected by the service itself in various embodiments. Based on guidance provided by the clients regarding the classification tasks to be performed and/or a knowledge base of the classification service, a set of data sources and associated data item retrieval techniques may be determined, the type of machine learning models to be used for the classification and/or active learning may be identified, class definitions of the target classes may be obtained and stored, an initial training set (e.g., with labels assigned based on keywords alone, or obtained from a set of label providers), metrics to be collected during the training iterations may be selected, session control information (e.g., the number of guided labeling feedback sessions to be used) and the like may be identified in the depicted embodiment. The specific set of resources to be used for training and evaluation may be identified as well at the service (element 2604), e.g., from a pool of such resources available at the service or accessible from the service.

One or more training iterations may be initiated for the classification problem being addressed (element 2607), in which the resources identified in operations corresponding to element 2604 may be utilized. At a high level, a given training iteration may comprise at least two categories of operations in various embodiments: back-end operations at the classification service, in which one or more classifiers may be trained using the available labeled data, and front-end or client-side operations, in which new labels (or, in some cases, corrected labels) may be requested and obtained from a set of label providers via a set of guided labeling feedback sessions. The two types of operations may be performed asynchronously of one another in various embodiments—e.g., new versions of models may be trained after an updated training set is identified, without waiting for responses for all outstanding labeling candidates, and new labeling candidates may be presented in the labeling sessions in batches, with the batches being presented independently of exactly when the training iterations are completed or initiated at the back end. The overall goal of the workflow may comprise accumulating a training set of labeled data items that are more likely to contribute to classifier learning than other data items quickly, such that a classifier which meets desired quality criteria is trained as soon as possible, in various embodiments.

A set of class labels may be obtained for some number of data items (element 2610). The set of data items for which labeling feedback is solicited from a pool of label providers may be selected using any of a variety of techniques in various embodiments—e.g., for some early iterations, random selection/sampling may be used, while for other iterations, active learning in combination with filtering based on user-supplied filtering criteria of the kinds discussed above (including for example search terms) may be used. As mentioned earlier, any combination of a variety of active learning algorithms, including query-by-committee, uncertainty sampling and the like may be used in different embodiments. At least in some embodiments, the current status of various training metrics and/or diagnosis test results may be used to help select the candidate data items. Using the class labels that have been obtained/accumulated thus far, one or more classifiers (such as a committee of classifiers) may be trained in various embodiments (element 2613). In some embodiments, as mentioned earlier, two types of classifiers may be trained: one group of classifiers trained using respective subsets of the available labeled data, and an iteration-final classifier trained with all the available labeled data. In one such embodiment, the results obtained from the iteration-final classifier may be used to determine the overall training progress, while the results obtained from the first group may be used to help select additional candidates for labeling feedback (e.g., based on the variance in class predictions measured for various data items of the test sets, or based on the proximity of the predicted classes to class boundaries). Depending on the nature of the classification problem being addressed, binary or multi-class classification models may be used in various embodiments. Any of a wide variety of classification algorithms may be used in different embodiments, including for example logistic regression, neural network based algorithms, tree-based algorithms such as Random Forest and the like.

If training completion criteria are met (as detected in element 2616), training iterations may be terminated (element 2622) (i.e., no additional iterations may be scheduled) in various embodiments. A trained classifier (e.g., the iteration-final classifier of the last completed training iteration) may be stored and/or used to generate and provide class predictions for various data items that were not used for training. A variety of training completion criteria may be used in different embodiments—e.g., training may be terminated if a set of quality criteria are met by the classifier(s) being developed, or if a resource or time budget is exhausted. In at least one embodiment a set of diagnosis tests may be identified to help decide when a classifier reaches an acceptable quality level. If training completion criteria are not met (as also detected in operations corresponding to element 2616), a set of additional candidate data items may be identified for labeling feedback in a subsequent training iteration (element 2619), e.g., with the help of an active learning algorithm, impact-based sampling (in which items whose impact on one or more training metrics is estimated, if the items were labeled and included in a training data set) and/or other sampling algorithms, and the next training iteration may be initiated. In the next training iteration, operations corresponding to elements 2607 may again be performed in the depicted embodiment.

Figure 27:
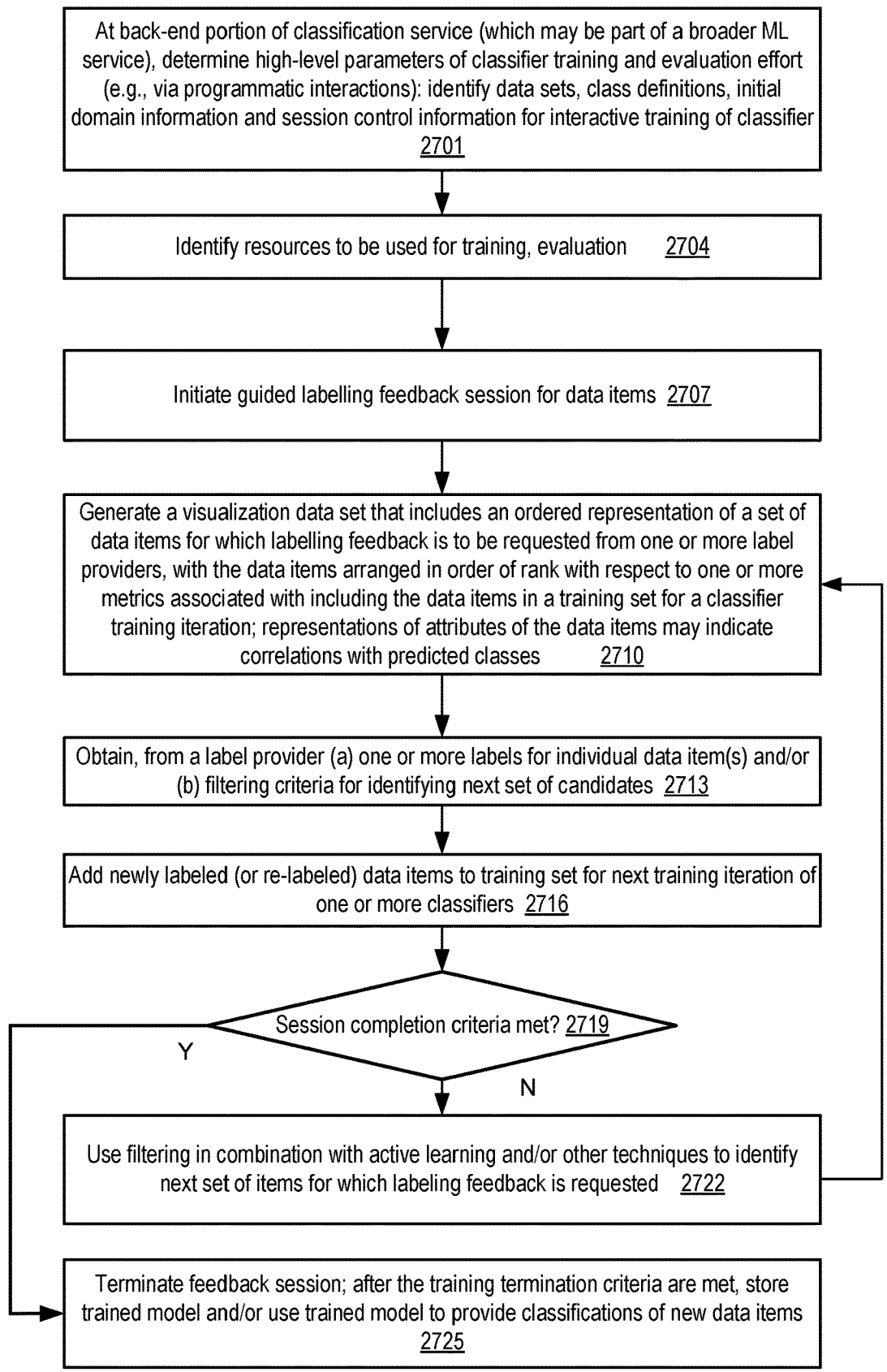
FIG. 27 is a flow diagram illustrating aspects of operations that may be performed during interactive labeling sessions of a classification service, according to at least some embodiments.

FIG. 27 is a flow diagram illustrating aspects of operations that may be performed during interactive labeling sessions of a classification service, according to at least some embodiments. High-level parameters (as well as meta-parameters) of a classifier training and evaluation effort may be determined (element 2701). Such parameters may include, for example, the type of classifier to be used, the type of active learning algorithm to be used, and so on. At least some of the parameters or meta-parameters may be obtained via requests submitted by clients, e.g., of a classification service and/or a broader machine learning service of the kind described above via a programmatic interface in some embodiments. Other parameters may be selected by the service itself in various embodiments. Based on the guidelines/preferences of the clients regarding the classification tasks to be performed, a set of data sources and associated retrieval techniques may be determined, the type of machine learning models to be used for the classification and/or active learning may be identified, class definitions of the target classes may be obtained and stored, an initial training set (e.g., with labels assigned based on keywords alone), session control information (e.g., the number of guided labeling feedback sessions to be used) and the like may be identified in the depicted embodiment. The specific set of resources to be used for training and evaluation may be identified as well at the service (element 2704), e.g., from a pool of such resources available at the service or accessible from the service.

A guided labeling feedback session may be initiated in the depicted embodiment (element 2707), which may proceed concurrently with asynchronous classifier training iterations at the back-end of the service. That is, the starting and ending of a training session may not necessarily be synchronous with the start or end of a feedback session, or with any individual interaction (such as label submission, a filter criteria submission, etc.) of any given label provider. The sessions may be described as "guided" in various embodiments because the service may present labeling feedback candidate data items to label providers in a specific order, with various kinds of annotations/highlighting, metrics information and filtering tools in the interactive interface, such that the interface as a whole helps the label providers to submit more useful labels to the service earlier in the training process in various embodiments. For example, during a given session in one embodiment, a visualization data set may be presented via the interactive programmatic interface, in which information about several labeling candidate data items is included, with the data items arranged in an order based at least in part on a respective rank assigned to the data items with respect to estimated learning contribution and/or one or more other metrics. In addition, in at least some embodiments, a presented view of a data item may indicate (e.g., via highlighting, color, font, etc.) one or more attributes of the data item whose correlation with membership in a particular target class exceeds a threshold.

During the feedback session, respective labels for one or more of the presented data items may be obtained, together with a filter criterion to be used to select additional data items for presentation via additional visualization data sets in some embodiments (element 2713). In at least some embodiments, the ranking and/or selection of individual data items for presentation via the interactive interface may thus be based not just on metrics generated and analyzed at the classification service, but also on filter criteria indicated by the label provider, training status information collected at the service from recent training iterations, results of diagnosis tests of the kind described earlier, and so on. Filtering criteria, which may for example include search terms, target or user-defined labels, ranges of classification scores indicated via an element (such as a distribution ribbon of the kind described above) of the interactive interface, and so on, may for example help a label provider to focus on data items that are of interest to the label providers, or have characteristics on which the label provider has some expertise and also help the model learn quickly. The set of newly-labeled (or re-labeled) data items may be added to the training set to be used for one or more training iterations (e.g., the next training iteration) in various embodiments (element 2716). As more training iterations are performed, additional labels for data items that have been identified as likely to contribute to faster or more goal-directed learning may thus be used to gradually increase the training set size in various embodiments.

If session completion criteria have been met (as detected in element 2719) after a particular submission of labels and/or filtering criteria, the session may be ended (element 2725) in the depicted embodiment. Any combination of various criteria may be used to end a given session in different embodiments—e.g., if the classifier has satisfied its diagnosis tests or an authorized entity has decided that further training is not needed, if a budget associated with the training or the session has been used up, if the label provider has stopped providing labels at a desired rate or of a desired quality level, and so on. After the training process as a whole is terminated, a trained classifier model (whose training set includes labels provided in the session) may be stored and/or used to generate and provide classification predictions for one or more previously-unseen or new data items in various embodiments.

If the session completion criteria are not met (as also detected in element 2719), a combination of filtering (if filtering criteria were provided), active learning (such as query by committee, uncertainty sampling or the like as discussed earlier), and/or other techniques (such as an indicated priority of a particular diagnosis test) may be used to identify next set of candidate data items for which labeling feedback is requested in the depicted embodiment (element 2722). Operations corresponding to element 2710 onwards may then be performed again using the new candidates (and/or any data items that remain unlabeled from among the set of data items prepared earlier for presentation) in various embodiments, until eventually the session is terminated. Thus, at least in some embodiments, multiple visualization data sets may potentially be generated and presented to a given label provider during a given labeling session.

In various embodiments, a label provider need not necessarily provide labels for all the items selected for the label provider before a new visualization data set is generated and presented. In some embodiments, during a given session, a label provider may request (e.g., via various filtering criteria) that data items for which labels have already been generated, or for which class predictions have already been generated, be presented to the label provider—that is, not all the data items presented to a label provider may necessarily be candidates for labeling feedback; instead some items may help the label provider to learn about what has already been done during the training workflow underway, which may in turn help the label provider provide (or correct) at least some labels. Some search terms or search query predicates may be recommended by the service in various embodiments, e.g., based on the detection of correlations between such terms/ predicates and membership in various classes. In one embodiment, label providers may create user-defined labels, e.g., for temporary grouping of some set of data items, and use such user-defined labels to filter the data items during a session. Bulk labeling of data items (e.g., using a "label all" interface element) may be used to reduce the number of individual mouse clicks or other interactions required from label providers in at least some embodiments. In at least some embodiments, in addition to a label for a given data item, a label provider may provide a justification or reason why a particular label was selected (or why a previously-assigned label was changed). In one embodiment, when a data item for which a target class has been predicted by a classifier is presented via the interactive interface, a justification for the prediction may also be provided, helping the label provider understand the reasons for the prediction (which in turn may help the label provider label other similar items, for example). In at least one embodiment, a graphical representation of a statistical distribution of data items (such as a ribbon of the kind discussed earlier) for which predictions have been generated may be presented to a label provider during a feedback session. The label provider may use an element of the programmatic interface to provide an indication of a selected sub-range of class scores of the distribution as a filtering criterion in such an embodiment, causing representations of data items with predicted class scores in the sub-range to be presented. Thus, the graphical display of predicted class distributions may provide another type of filtering capability in at least some embodiments. The graphical display of predicted class scores may indicate a current set of class boundaries (i.e., the scores used to distinguish among classes, with a selected confidence level, as of a recent training iteration) in at least some embodiments.

In some embodiments in which multiple labeling feedback sessions are set up with respective label providers, the service may analyze the feedback (e.g., labels, search terms and other filtering criteria, etc.) obtained from individual ones of the label providers, and tailor the sets of data items to individual label providers based on such analysis. In effect, respective capability and/or interest profiles may be set up for individual ones of the label providers based on the work they have done thus far, and such profiles may be included in the set of factors (along with other factors such as estimated learning contributions, etc.) used to identify data items for presentation to the label providers. For example, if a given label provider has been found to be especially proficient and quick at accurately labeling items of target class C1, but not as proficient at accurately labeling items of target class C2, items that are estimated to have a higher probability of being labeled as C1 may be preferentially selected for the label provider.

Figure 28:
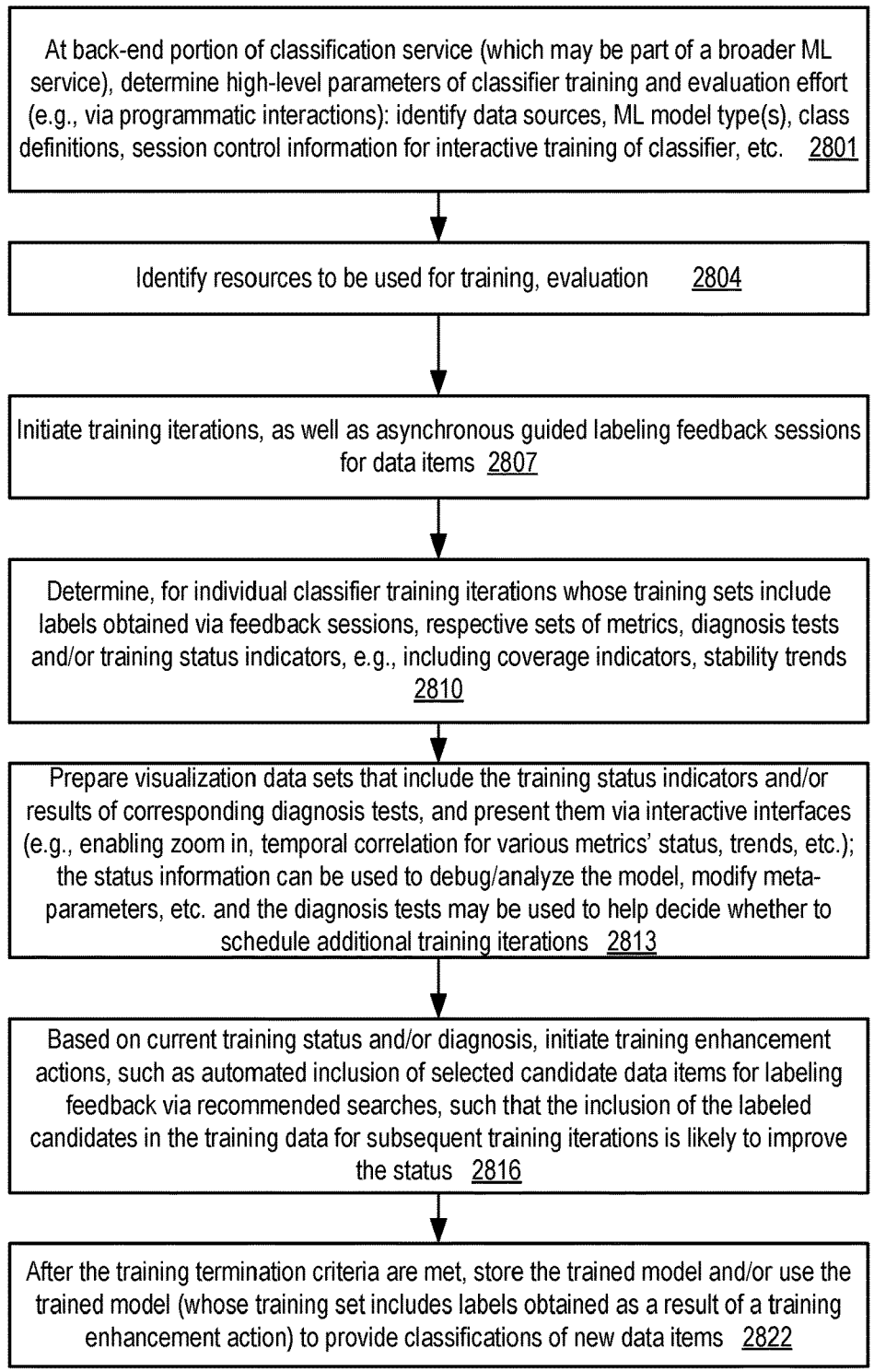
FIG. 28 is a flow diagram illustrating aspects of operations that may be performed to present visual representations of training status indicators during classifier training, according to at least some embodiments.

FIG. 28 is a flow diagram illustrating aspects of operations that may be performed to present visual representations of training status indicators during classifier training, according to at least some embodiments. In the depicted embodiment, a set of parameters (as well as meta-parameters) of a classifier training and evaluation effort may be determined (element 2801). At least some of the parameters or meta-parameters may be obtained via requests submitted via a programmatic interface, e.g., of a classification service of the kind discussed above and/or a broader machine learning service in some embodiments. Other parameters may be selected by the service itself in various embodiments. Based on the information obtained regarding the classification tasks to be performed, a set of data sources and associated retrieval techniques may be determined, the type of machine learning models to be used for the classification and/or active learning, class definitions of the target classes may be obtained and stored, session control information (e.g., the number of guided labeling feedback sessions to be used) and the like may be identified in the depicted embodiment. The specific set of resources to be used for training and evaluation may be identified as well at the service (element 2804), e.g., from a pool of such resources available at the service or accessible from the service.

Training iterations of the kind discussed above may be initiated (element 2807), along with the accompanying asynchronous guided labeling feedback sessions in the depicted embodiment. As more training iterations are performed, additional labels for data items that have been identified as likely to contribute to faster or more goal-directed learning may be obtained asynchronously from label providers in the feedback sessions, gradually increasing the training set size in various embodiments. As discussed earlier, the set of labeling candidates presented to a given label provider may be ordered based at least in part on a respective rank, with respect to estimated learning contribution, associated with including individual ones of the labeling candidates in a training set for a particular training iteration of one or more classification models in some embodiments.

A number of metrics may be collected with regard to individual training iterations as well as for sequences of training iterations, and such metrics may be used to generate training status indicators that can be presented visually to users/clients of the service, such as data scientists that may wish to analyze/debug the training progress in various embodiments. Corresponding to individual ones of a plurality of classifier training iterations whose training sets include labels obtained via the feedback sessions, respective sets of metrics, status indicators and/or diagnosis tests may be identified in various embodiments (element 2810). Such indicators may include, among others, (a) a representation of a fraction of a group of data items for which classification results that have been obtained in a particular classifier training iteration do not meet a threshold criterion and/or (b) a representation of a stability trend of a particular training metric over a plurality of classifier training iterations in some embodiments. The particular set of metrics for which status information is to be collected and/or displayed may vary, e.g., based on input received from the users of the service in various embodiments—that is, different users may specify respective sets of metrics and status information to be derived from the metrics. In some embodiments, the service may itself select at least a subset of the metrics whose status is to be indicated, e.g., based on the types of classifier (binary or multi-class) being developed. Any combination of a variety of metrics may be collected and presented in different embodiments, including for example (a) a positive predictive value (PPV), (b) a negative predictive value (NPV), (c) an accuracy, (d) a prevalence, (e) a precision, (f) a false discovery rate, (g) a false omission rate, (h) a recall, (i) a sensitivity, (j) a diagnostic odds ratio, and/or (k) an F1 score. In at least one embodiment, the metrics collected and presented may include a count of the number of labels that have been obtained for one or more target classes.

Visualization data sets comprising the status indicators (and/or results of diagnosis tests) may be prepared at the service, e.g., automatically at selected time intervals, and/or in response to requests submitted via the interactive interfaces being implemented by the service in various embodiments (element 2813). The presentation of a given visualization data set may include various types of panels and layout components in different embodiments. In at least one implementation, a first display component may include (a) respective values of a plurality of selected status indicators as of a first classifier training iteration and (b) a plurality of values of an individual status indicator as of respective successive classifier training iterations. As such, a viewer of the presented data may be able to easily see the values of various metrics for a given training iteration or point in time, and may also be able to see how one or more of the metrics changed across multiple training iterations in such embodiments. The interactive interface used for presenting the status information may, for example, include zoom-in capabilities, temporal correlation elements (e.g., elements which can be used to simultaneously inspect values for a number of different metrics/status indicators at a given point in time), and so on. Such information may be used to debug/analyze the model being trained in various embodiments, to initiate modifications of model meta-parameters etc.

In at least one embodiment, users may be able to view the specific labels and/or associated justification information provided by an individual label provider, and/or to view the differences between training sets of a pair of training iterations. In one embodiment, the service may provide a visual indication of explanatory factors associated with a change in a training metric between one training iteration and another—e.g., a set of terms that were present in data items that were added to the training set between iterations I1 and I2, and that are highly correlated with membership in a particular class, may be displayed.

In some embodiments, after a visualization of a particular data set comprising status information is presented, one or more training enhancement actions may be initiated, e.g., based on objectives associated with the status indicators that were shown (element 2816). A number of different types of enhancement actions intended to accelerate the training process may be initiated in different embodiments, such as expanding/contracting the pool of label providers, selecting label candidates that are expected to help meet specific objectives associated with the status indicators (such as increasing the coverage for various target classes), customizing the label candidates transmitted to different label providers, modifying the training iteration intervals, and so on. In effect, in various embodiments, objective associated with one or more specific metrics whose status indicators are presented to users may help to guide the subsequent iterations of training in the depicted embodiment. In some embodiments, the service may present alternative training enhancement actions that may be undertaken, and a client of the service may select the particular actions to be implemented. In other embodiments, a client may indicate a particular status indicator or metric as having a higher priority than others, and such guidance may be used to identify the specific actions to be initiated.

As the iterations proceed, more status indicators may be gathered and the presentation may be updated. In some embodiments, a set of metrics-based diagnosis tests may be selected (e.g., by the service itself or based on programmatic input from users), such that the results of the tests may be used to determine whether further training iterations should be scheduled or not. In various embodiments in which such diagnosis tests are identified, the current results (and/or trends in the results) of the diagnosis tests may be displayed visually, and/or an indication of the number or fraction if diagnosis tests that have been passed may be provided visually. The results of the diagnosis tests may be used, for example, to automatically determine whether additional training iterations are to be initiated. The different diagnosis tests may be prioritized relative to one another in some embodiments, e.g., based on programmatic input from users, and such prioritization may further help identify training enhancement actions in at least one embodiment. In some embodiments, if results of a particular diagnosis test are not yet satisfactory, or show a trend that is unsatisfactory, a remedial action with respect to the test may be initiated (similar to the training enhancement actions mentioned above), e.g., either automatically by the service or in response to programmatic requests. In at least some embodiments, a user may submit a request to view data items for which the label indicated by a label provider differs from the class label predicted by the latest version of the classier, e.g., in order to help debug the model.

Eventually, the training iterations may be terminated, and a trained version of the classifier model or models (whose training set included labels obtained as a result of implementation of one or more of the training enhancement actions) may be stored and/or used to provide predicted classifications of new data items to one or more destinations in the depicted embodiment (element 2822). In at least one embodiment in which diagnosis tests are used to determine when to terminate training, an authorized user may override the diagnosis-test-based decision—e.g., a classifier may be approved for production use even if one or more diagnosis tests have not yet been passed, or, alternatively, additional model training iterations may be scheduled even if all the selected diagnosis tests have been passed.

It is noted that in various embodiments, some of the operations shown in FIG. 26, FIG. 27 or FIG. 28 may be implemented in a different order than that shown in the figure, or may be performed in parallel rather than sequentially. Additionally, some of the operations shown in FIG. 26, FIG. 27 or FIG. 28 may not be required in one or more implementations.

Use Cases

The techniques described above, of implementing a classification service or tool which can be used to quickly develop classifiers of desired quality levels using a flexible interactive interface may be extremely useful in a variety of scenarios. More and more business problems are being solved with the help of machine learning techniques, among which classification (both binary and multi-class classification) is a very frequently used technique. In order to develop a classifier, labeled training data is required, and the labeling effort (which usually involves human labelers) may often represent a significant fraction of the resources, cost and time associated with the classifier development workflow as a whole. In the techniques described, training may be initiated using a very small training set. Results of the training iterations may be used, e.g., using active learning methodologies, to quickly identify more "useful" unlabeled data, for which labels may be obtained via asynchronous labeling sessions with some set of label providers. As more and more labels for useful data items are accumulated, the quality of the classifiers produced in the training iterations may increase rapidly. The interactive user interface supported may enable at least three groups of entities involved in the classification effort to perform their tasks more quickly and effectively: (a) stakeholders responsible for starting, managing and terminating classification efforts, (b) label providers, who may have little machine learning expertise and (c) data scientists or analysts who wish to monitor the progress of classifier development, debug problems, and so on. Using the combination of the streamlined customizable back-end classifier development workflow and the interactive interface, orders of magnitude reduction in the overall resources and time consumed for obtaining high-quality classification models may be achieved in some cases.

Illustrative Computer System

Figure 29:
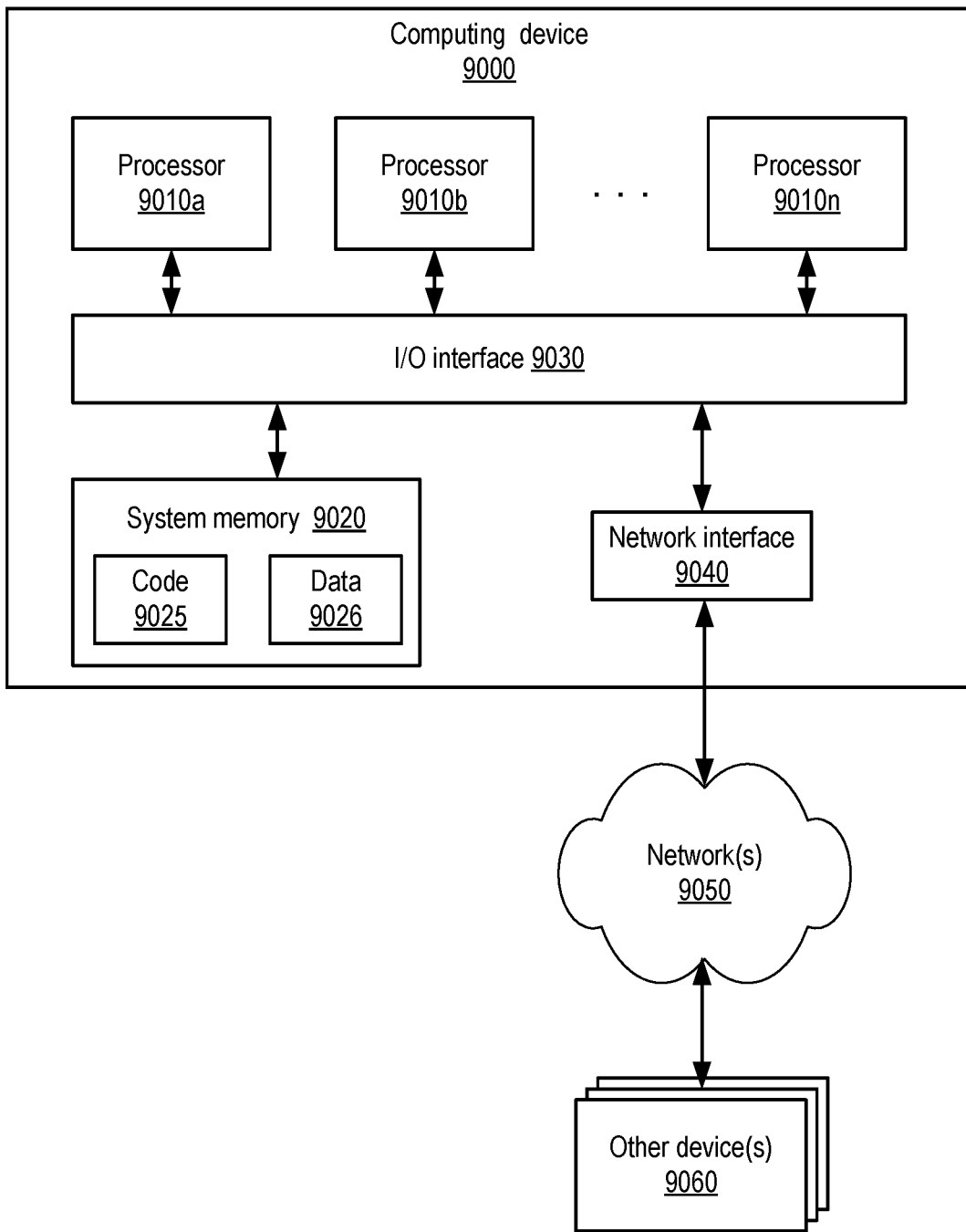
FIG. 29 is a block diagram illustrating an example computing device that may be used in at least some embodiments.

In at least some embodiments, a server that implements a portion or all of one or more of the technologies described herein, including the techniques for various front-end and/or back-end components of a classification service or tool may include a general-purpose computer system that includes or is configured to access one or more computer-accessible media. FIG. 29 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 28, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 28 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 29 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Embodiments of the disclosure can be described in view of the following clauses:

1. A system, comprising:
   one or more computing devices of an artificial intelligence-based classification service;
   wherein the one or more computing devices are configured to:
      perform one or more training iterations until a training completion criterion is met, wherein a particular training iteration comprises at least:

obtaining, via an interactive programmatic interface, respective class labels for at least some data items of a particular set of data items identified as candidates for labeling feedback in a previous training iteration, wherein at least some class labels of the respective class labels are obtained asynchronously with respect to (a) a start of the particular training iteration and (b) an end of the previous training iteration;

generating, using one or more classifiers, classification predictions corresponding to a test set, wherein an individual classifier of the one or more classifiers is trained using a training set that includes at least some labels obtained using the interactive programmatic interface; and identifying, based at least in part on (a) the classification predictions and (b) an active learning algorithm, another set of data items as candidates for labeling feedback with respect to the next training iteration; and provide, after the training completion criterion has been met, a respective classification prediction obtained from a particular classifier with respect to one or more data items, wherein the particular classifier was trained using a particular training set, wherein labels for at least some items of the particular training set were obtained in the one or more training iterations.

2. The system as recited in clause 1, wherein the one or more computing devices are configured to:

generate a first machine learning model to identify at least a first attribute value of one or more data items, such that a correlation between the presence of the attribute value and a variation in classification prediction of the one or more data items exceeds a threshold; and identify, using the first attribute, at least one data item as a candidate for labeling feedback in the particular training iteration.

3. The system as recited in any of clauses 1-2, wherein the one or more computing devices are configured to:

include, as a candidate for labeling feedback in the particular training iteration, a data item for which a label has been obtained from a label provider.

4. The system as recited in any of clauses 1-3, wherein the active learning algorithm comprises one or more of: (a) a query-by-committee algorithm, (b) an uncertainty sampling algorithm, (c) an expected model change algorithm, (d) an expected error reduction algorithm, (e) a variance-reduction algorithm, and/or (f) a density-weighted algorithm.

5. The system as recited in any of clauses 1-4, wherein identifying the other set of data items as candidates is based at least in part on a filter criterion indicated by a label provider.

6. A method, comprising:

performing, by one or more computing devices:

one or more classifier training iterations until a training completion criterion is met, wherein a particular classifier training iteration comprises at least:

obtaining, via an interactive interface, asynchronously with respect to a start of the particular classifier training iteration, respective class labels for at least some data items of a particular set of data items identified as candidates for labeling feedback in an earlier classifier training iteration;

identifying, based at least in part on an analysis of classification predictions generated using one or more classifiers whose training set includes at least one label obtained using the interactive interface, another set of data items as candidates for labeling feedback with respect to the next training iteration; and storing a classifier trained using a particular training set, wherein labels for at least some items of the particular training set were obtained in the one or more training iterations.

7. The method as recited in clause 6, wherein the one or more classifiers comprise a first classifier and a second classifier, wherein the training set of the first classifier differs from the training set of the second classifier, and wherein the analysis of classification predictions comprises generating a measure of variation between respective classification predictions generated with respect to a particular data item by individual ones of the one or more classifiers.

8. The method as recited in any of clauses 6-7, further comprising performing, by the one or more computing devices:

obtaining an indication, via the interactive interface, of a level of automation to be implemented at one or more stages of a classification workflow which includes the one or more classifier training iterations; and determining, based at least in part on the level of automation, a classification algorithm to be used for the particular classifier.

9. The method as recited in any of clauses 6-8, wherein obtaining the respective class labels comprises:

obtaining, subsequent to detecting that a first submit request has been received via the interactive interface, a first group of class labels, wherein individual labels of the first group of class labels are assigned to respective data items of a first group of data items; and obtaining, subsequent to detecting that a second submit request has been received via the interactive interface, a second group of class labels, wherein individual labels of the second group of class labels are assigned to respective data items of a second group of data items.

10. The method as recited in clause 9, further comprising performing, by the one or more computing devices:

in response to detecting that the first submit request has been received, causing a representation of the second group of data items to be presented via the interactive interface.

11. The method as recited in any of clauses 6-9, further comprising performing, by the one or more computing devices:

selecting, based at least in part on a filtering criterion indicated via the interactive interface, at least one data item as a candidate for labeling feedback.

12. The method as recited in any of clauses 6-9 or 11, further comprising performing, by the one or more computing devices:

determining, based at least in part on input received via a programmatic interface, an indication of (a) a data source and (b) a classification objective of the one or more classifier training iterations;

retrieving, from the data source, the particular set of data items; and providing, via the interactive interface, an indication to one or more label submitters of the classification objective.

13. The method as recited in any of clauses 6-9 or 11-12, further comprising performing, by the one or more computing devices:

determining, based at least in part on input received via a programmatic interface, one or more feature processing operations to be performed on the particular set of data items; and including, in input provided to the one or more classifiers, results of the feature processing operations.

14. The method as recited in any of clauses 6-9 or 11-13, further comprising performing, by the one or more computing devices:

determining, based at least in part on input received via a programmatic interface, a model type of at least one classifier of the one or more classifiers, wherein the model type comprises one or more of: (a) a logistic regression model or (b) a neural network-based model.

15. The method as recited in any of clauses 6-9 or 11-14, further comprising performing, by the one or more computing devices:

determining the number of label providers to include in a set of label providers to be utilized for at least the particular training iteration; and determining, based at least in part on analysis of earlier interactions with individual members of the set of label providers, a respective group of data items to be presented as candidates for labeling feedback to individual members of the set of label providers in the particular training iteration.

16. A non-transitory computer-accessible storage medium storing program instructions that when executed on one or more processors cause the one or more processors to:

perform one or more classifier training iterations until a training completion criterion is met, wherein a particular classifier training iteration comprises at least:

obtaining, via an interactive interface, asynchronously with respect to a start of the particular classifier training iteration, respective class labels for at least some data items of a particular set of data items identified as candidates for labeling feedback in an earlier classifier training iteration;

identifying, based at least in part on an analysis of classification predictions generated using one or more classifiers whose training set includes at least one label obtained via the interactive interface, another set of data items as candidates for labeling feedback with respect to the next training iteration; and store a classifier trained using a particular training set, wherein labels for at least some items of the particular training set were obtained in the one or more training iterations.

17. The non-transitory computer-accessible storage medium as recited in clause 16, wherein the instructions when executed on one or more processors cause the one or more processors to:

generate a first machine learning model to identify at least a first attribute value of one or more data items, such that a correlation between the presence of the attribute value and a variation in classification prediction of the one or more data items exceeds a threshold; and identify, using the first attribute, at least one data item as a candidate for labeling feedback in the particular classifier training iteration.

18. The non-transitory computer-accessible storage medium as recited in any of clauses 16-17, wherein the one or more classers whose predictions are used to identify the other set of candidates data items comprise a first classifier and a second classifier, wherein the instructions when executed on the one or more processors:

generate, for a third classifier, a training set that includes (a) at least some data items of a training set of the first classifier and (b) at least some data items of a training set of the second classifier;

obtain, as part of the particular classifier training iteration, classification results from the third classifier for one or more data items;

utilize the classification results obtained from the third classifier to identify one or more attribute values whose correlation with predicted membership in a class exceeds a threshold; and provide an indication of the one or more attribute values via the interactive programmatic interface.

19. The non-transitory computer-accessible storage medium as recited in any of clauses 16-18, wherein the instructions when executed on one or more processors cause the one or more processors to perform the one or more classifier training iterations based at least in part on determining that a programmatic request has been received at a network-accessible service of a provider network.

20. The non-transitory computer-accessible storage medium as recited in any of clauses 16-19, wherein identifying the other set of data items as candidates is based at least in part on a filter criterion indicated by a label provider.

Embodiments of the disclosure can also be described in view of the following clauses:

1. A system, comprising:

one or more computing devices of an artificial intelligence-based classification service;

wherein the one or more computing devices are configured to:

initiate a labeling feedback session with a label provider;

cause, during the labeling feedback session, one or more visualization data sets to be presented to the label provider via an interactive programmatic interface, including a particular visualization data set which comprises an ordered representation of one or more data items for which labeling feedback is requested, wherein the order in which the one or more data items are arranged is based at least in part on a respective rank, with respect to estimated learning contribution, associated with including individual ones of the data items in a training set for a particular training iteration of one or more classification models, and wherein a presented view of a first data item of the one or more data items indicates a particular attribute of the first data item whose correlation with a particular predicted class exceeds a threshold;

obtain, during the feedback session, indications from the label provider via the interactive programmatic interface of (a) respective labels for one or more data items of the one or more visualization data sets and (b) a filter criterion to be used to select one or more other data items to be presented via the interactive programmatic interface; and provide, to one or more destinations, a classification prediction corresponding to a data item, wherein the classification prediction is obtained from a classification model trained using a training set which includes at least one label of the respective labels.

2. The system as recited in clause 1, wherein at least one label of the respective labels is obtained asynchronously with respect to one or more training iterations of the one or more classification models.
3. The system as recited in any of clauses 1-2, wherein the filter criterion indicates a particular class label.
4. The system as recited in clause 3, wherein a classification model of the one or more classification models is configured to predict, for a particular data item, a class label selected from a first set of target class labels, and wherein the particular class label (a) is not a member of the first set and (b) is assigned to a second data item via the interactive programmatic interface as a user-defined temporary class label.
5. The system as recited in any of clauses 1-3, wherein the one or more computing devices are configured to:
provide an indication, via the interactive programmatic interface, of a plurality of recommended search query predicates identified based at least in part on analysis of one or more classifier training metrics.
6. A method, comprising:
performing, by one or more computing devices:
causing, during a first labeling feedback session of one or more labeling feedback sessions, a first visualization data set to be presented via an interactive programmatic interface, wherein the first visualization data set comprises a representation of one or more data items for which labeling feedback is requested for generating a training set of one or more classifiers, wherein at least a first data item of the one or more data items is identified based at least in part on an estimated rank, with respect to one or more metrics, associated with including the first data item in a training set;
obtaining, via the interactive programmatic interface during the first labeling feedback session, (a) respective labels for the one or more data items, including the first data item, represented in the first visualization data sets and (b) a filter criterion to be used to select one or more other data items to be presented via the interactive programmatic interface; and
storing a classifier trained using a training set which includes at least one label of the respective labels.
7. The method as recited in clause 6, wherein in the presentation of the first visualization data set, a representation of the first data item indicates a particular attribute of the first data item whose correlation with a particular predicted class exceeds a threshold.
8. The method as recited in any of clauses 6-7, wherein the first data item has a plurality of attributes including a first attribute and a second attribute, and wherein in the representation of the first data item, a first color is used to indicate that the first attribute is correlated with a first target class of the one or more classifiers, and a second color is used to indicate that the second attribute is correlated with a second target class of the one or more classifiers.
9. The method as recited in any of clauses 6-8, further comprising performing, by the one or more computing devices, wherein the indication of at least one label is obtained asynchronously with respect to one or more classifier training iterations.
10. The method as recited in any of clauses 6-9, wherein the filtering criterion indicates a particular class label associated with the one or more other data items.
11. The method as recited in any of clauses 6-10, further comprising performing, by the one or more computing devices:
obtaining an indication, via the interactive interface, of a level of automation to be implemented at one or more stages of a classification workflow which includes the first labeling feedback session; and
determining, based at least in part on the level of automation, respective thresholds for one or more metrics to be used to terminate the classification workflow.
12. The method as recited in any of clauses 6-11, wherein the filtering criterion indicates a first search query predicate.
13. The method as recited in clause 12, further comprising performing, by the one or more computing devices:
providing an indication, via the interactive programmatic interface, of a plurality of recommended search query predicates identified based at least in part on analysis of one or more classifier training metrics, wherein the plurality of recommended search query predicates includes the first search query predicate.
14. The method as recited in any of clauses 6-12, wherein the one or more data items for which labeling feedback is requested comprise a second data item for which a label was obtained earlier via the interactive programmatic interface, the method further comprising performing, by the or more computing devices:
selecting the second data item for presentation for label reconsideration, based at least in part on a determination of a difference between the label obtained for the second data item via the interactive programmatic interface, and a predicted class score of the second data item.
15. The method as recited in any of clauses 6-12 or 14, further comprising performing, by the one or more computing devices:
obtaining, during the first labeling feedback session, an indication via the interactive programmatic interface of a justification for assignment of a first label to the first data item; and
causing the justification to be displayed via the interactive programmatic interface to one or more entities.
16. A non-transitory computer-accessible storage medium storing program instructions that when executed on one or more processors cause the one or more processors to:
cause, during a first labeling feedback session of one or more labeling feedback sessions, a first visualization data set to be presented via an interactive programmatic interface, wherein the first visualization data set comprises a representation of one or more data items for which labeling feedback is requested for generating a training set of one or more classifiers, wherein at least a first data item of the one or more data items is identified based at least in part on an estimated rank, with respect to one or more metrics, associated with including the first data item in a training set;
obtaining, via the interactive programmatic interface during the first labeling feedback session, (a) respective labels for the one or more data items of the first visualization data set and (b) a filter criterion to be used to select one or more other data items to be presented via the interactive programmatic interface; and
storing a classifier trained using a training set which includes at least one label of the respective labels.
17. The non-transitory computer-accessible storage medium as recited in clause 16, wherein the instructions when executed on the one or more processors cause the one or more processors to:

causing a graphical representation of a statistical distribution of classified data items to be presented via the interactive programmatic interface.

18. The non-transitory computer-accessible storage medium as recited in any of clauses 16-17, wherein the instructions when executed on the one or more processors cause the one or more processors to:

obtaining an indication, via the interactive programmatic interface, of a selected sub-range of class scores of the statistical distribution; and cause representations of one or more data items with predicted class scores in the selected sub-range to be displayed via the interactive programmatic interface.

19. The non-transitory computer-accessible storage medium as recited in any of clauses 16-18, wherein the instructions when executed on the one or more processors cause the one or more processors to:

cause an indication of a predicted classification score corresponding to a class boundary identified with a particular confidence level to be included in the graphical representation of the statistical distribution.

20. The non-transitory computer-accessible storage medium as recited in any of clauses 16-19, wherein the first labeling session is initiated with a first label provider, wherein the instructions when executed on the one or more processors cause the one or more processors to:

identify, for a second labeling session initiated with a second label provider, a particular collection of data items to be labeled, wherein members of the particular collection are selected based at least in part on an analysis of labels provided earlier by the second label provider.

21. The non-transitory computer-accessible storage medium as recited in any of clauses 16-20, wherein the estimated rank is determined at least in part on an active learning algorithm, wherein the active learning algorithm comprises one or more of: (a) a query-by-committee algorithm, (b) an uncertainty sampling algorithm, (c) an expected model change algorithm, (d) an expected error reduction algorithm, (e) a variance-reduction algorithm, or (f) a density-weighted algorithm.

22. The non-transitory computer-accessible storage medium as recited in any of clauses 16-21, wherein the first visualization data set comprises an indication that at least a portion of an attribute of a particular data item is correlated with a particular target class of a classifier of the one or more classifiers, wherein the indication comprises a highlighting of one or more of: (a) a text token, (b) at least a portion of an image, (c) at least a portion of a video, or (d) at least a portion of an audio recording.

Embodiments of the disclosure can also be described in view of the following clauses:

1. A system, comprising:
one or more computing devices of an artificial intelligence-based classification service;
wherein the one or more computing devices are configured to:
determine, corresponding to individual ones of a plurality of classifier training iterations, respective sets of status indicators, wherein a first set of status indicators includes at least (a) a representation of a fraction of a first group of data items for which classification results that have been obtained in a particular classifier training iteration do not meet a threshold criterion and (b) a representation of a stability trend of a particular training metric over a plurality of classifier training iterations, wherein a training data set of the particular classifier training iteration comprises at least some labels obtained in response to a presentation of one or more data items of the first group as candidates for labeling feedback;

cause, in response to a programmatic request, a first visualization data set comprising at least one set of status indicators to be presented via an interactive programmatic interface, wherein presentation of the first visualization data set includes an indication, within a first display, of (a) respective values of a plurality of selected status indicators as of a first classifier training iteration and (b) a plurality of values of an individual status indicator as of respective successive classifier training iterations;

initiate, subsequent to presentation of the first visualization data set, one or more training enhancement actions, wherein a particular training enhancement action comprises selecting, based at least in part on an objective associated with a particular status indicator, one or more data items for which respective labeling feedback is to be obtained programmatically during one or more of the classifier training iterations; and provide, to one or more destinations, a classification prediction corresponding to a particular data item, wherein the classification prediction is obtained from a classification model trained using a training set which includes at least one label obtained as a result of implementation of the particular training enhancement action.

2. The system as recited in clause 1, wherein the one or more computing devices are configured to:
identify, based at least in part on input received programmatically, an indication of a set of training metrics of which respective status indicators are to be included in the visualization data set.

3. The system as recited in any of clauses 1-2, wherein the one or more computing devices are configured to:
identify, based at least in part on a type of classifier that is to be trained, at least one training metric of which a status indicator is to be provided in the visualization data set.

4. The system as recited in any of clauses 1-3, wherein the one or more computing devices are configured to:
present, via the interactive programmatic interface, an indication of one or more of (a) one or more labels provided by a selected label provider whose labels were used as part of the training set for the particular training iteration or (b) a justification provided by the selected label provider for a label of the one or more labels.

5. The system as recited in any of clauses 1-4, wherein the one or more training enhancement actions comprise modifying a size of a pool of label providers from which labeling feedback is to be obtained.

6. A method, comprising:
performing, by one or more computing devices:
determining, corresponding to individual ones of a plurality of classifier training iterations, respective sets of status indicators, wherein a first set of status indicators includes at least a representation of a trend of a particular training metric over a plurality of classifier training iterations;

causing, in response to a request obtained via an interactive programmatic interface, a first visualization data set corresponding to at least one set of status indicators to be presented via an interactive programmatic interface;

initiating, subsequent to presentation of the first visualization data set, one or more training enhancement actions, wherein a particular training enhancement action comprises selecting, based at least in part an objective associated with a particular status indicator, one or more data items for which respective labeling feedback is to be obtained programmatically in a subsequent classifier training iteration; and storing a classification model trained using a training set which includes at least one label obtained as a result of implementation of the particular training enhancement action.

7. The method as recited in clause 6, further comprising performing, by one or more computing devices:

obtaining, based at least in part on input received via the interactive programmatic interface, an indication of a set of training metrics of which respective status indicators are to be provided via the interactive programmatic interface, wherein the visualization data set comprises at least one status indicator of the respective status indicators.

8. The method as recited in clause 7, wherein the set of training metrics comprises one or more of: (a) a positive predictive value (PPV), (b) a negative predictive value (NPV), (c) an accuracy, (d) a prevalence, (e) a precision, (f) a false discovery rate, (g) a false omission rate, (h) a recall, (i) a sensitivity, (j) a diagnostic odds ratio, or (k) an F1 score.

9. The method as recited in any of clauses 6-7, further comprising performing, by the one or more computing devices:

providing an indication, in response to input received via the interactive programmatic interface, of a difference in training data sets between a first classifier training iteration and a second classifier training iteration of the plurality of classifier training iterations.

10. The method as recited in any of clauses 6-7 or 9, further comprising performing, by the one or more computing devices:

providing, based at least in part on an analysis of a difference in training data sets between a first classifier training iteration and a second classifier training iteration of the plurality of classifier training iterations, an indication of one or more candidate explanatory factors associated with a difference in training metrics between the first and second classifier training iterations.

11. The method as recited in any of clauses 6-7 or 9-10, further comprising performing, by the one or more computing devices:

causing an indication of results of a set of diagnosis tests, with respect to one or more classifier training iterations of the plurality of classifier training iterations, to be presented via the interactive programmatic interface, wherein a first diagnosis test of the set of diagnosis tests comprises determining whether a particular first status indicator meets a threshold condition.

12. The method as recited in clause 11, further comprising performing, by the one or more computing devices:

causing, with respect to a particular diagnosis test of the set of diagnosis tests whose result does not meet a threshold criterion, an explanation of a recommended remedial action to be presented via the interactive programmatic interface;

determining that the recommended remedial action has been approved; and initiating the recommended remedial action.

13. The method as recited in any of clauses 11-12, further comprising performing, by the one or more computing devices:

identifying at least one diagnosis test of the set of diagnosis tests based at least in part on input received via the interactive programmatic interface.

14. The method as recited in any of clauses 11-13, further comprising performing, by the one or more computing devices:

detecting that a directive to optimize classifier training iterations in an automated mode has been indicated via the interactive programmatic interface; and automatically initiating, without receiving a request pertaining to a particular diagnosis test whose result does not meet a threshold criterion, a remedial action pertaining to the particular diagnosis test.

15. The method as recited in any of clauses 6-7 or 9-11, further comprising performing, by the one or more computing devices:

causing an indication of a difference between (a) a previously-provided label for a particular data item and (b) a predicted class label of the particular data item to be indicated via the interactive programmatic interface.

16. A non-transitory computer-accessible storage medium storing program instructions that when executed on one or more processors cause the one or more processors to:

determine, corresponding to individual ones of a plurality of classifier training iterations, respective sets of metrics;

cause a first visualization data set to be presented via an interactive programmatic interface, wherein the first visualization data set comprises of results of one or more diagnosis tests, wherein a first diagnosis test of the set of diagnosis tests comprises determining whether a particular metric of the respective sets of metrics meets a threshold condition;

determine, based at least in part on a result of the first diagnosis test, whether to initiate one or more additional classifier training iterations.

17. The non-transitory computer-accessible storage medium as recited in clause 16, wherein the particular metric includes a count of a respective number of labels corresponding to one or more target classes of a classifier, wherein the labels corresponding to the one or more target classes are part of a training set for a particular classifier training iteration, wherein at least a subset of the labels corresponding to the one or more target classes is obtained in one or more labeling sessions from one or more label providers.

18. The non-transitory computer-accessible storage medium as recited in clause 17, wherein the subset of the labels is obtained asynchronously with respect to a start or end of an individual classifier training iteration of the plurality of classifier training iterations.

19. The non-transitory computer-accessible storage medium as recited in any of clauses 16-17, wherein an individual classifier training iteration of the plurality of classifier training iterations comprises training one or more of: (a) a binary classifier or (b) a multi-class classifier.

20. The non-transitory computer-accessible storage medium as recited in any of clauses 16-17 or 19, wherein the instructions when executed on the one or more processors cause the one or more processors to:
determine, based at least in part on programmatic input, the first diagnosis test, wherein the determination to initiate an additional training iteration is based at least in part on programmatic input overriding a result of the first diagnosis test.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence-based classification service;
wherein the one or more computing devices are configured to:
determine, corresponding to individual ones of a plurality of classifier training iterations, respective sets of status indicators, wherein a first set of status indicators includes at least (a) a representation of a fraction of a first group of data items for which classification results that have been obtained in a particular classifier training iteration do not meet a threshold criterion and (b) a representation of a stability trend of a particular training metric over a plurality of classifier training iterations, wherein a training data set of the particular classifier training iteration comprises at least some labels obtained in response to a presentation of one or more data items of the first group as candidates for labeling feedback;
cause, in response to a programmatic request, a first visualization data set comprising at least one set of status indicators to be presented via an interactive programmatic interface, wherein presentation of the first visualization data set includes an indication, within a first display, of (a) respective values of a plurality of selected status indicators as of a first classifier training iteration and (b) a plurality of values of an individual status indicator as of respective successive classifier training iterations;
initiate, subsequent to presentation of the first visualization data set, one or more training enhancement actions, wherein a particular training enhancement action comprises selecting, based at least in part on an objective associated with a particular status indicator, one or more data items for which respective labeling feedback is to be obtained programmatically during one or more of the classifier training iterations; and
provide, to one or more destinations, a classification prediction corresponding to a particular data item, wherein the classification prediction is obtained from a classification model trained using a training set which includes at least one label obtained as a result of implementation of the particular training enhancement action.

2. The system as recited in claim 1, wherein the one or more computing devices are configured to:
identify, based at least in part on input received programmatically, an indication of a set of training metrics of which respective status indicators are to be included in the visualization data set.

3. The system as recited in claim 1, wherein the one or more computing devices are configured to:
identify, based at least in part on a type of classifier that is to be trained, at least one training metric of which a status indicator is to be provided in the visualization data set.

4. The system as recited in claim 1, wherein the one or more computing devices are configured to:
present, via the interactive programmatic interface, an indication of one or more of
(a) one or more labels provided by a selected label provider whose labels were used as part of the training set for the particular training iteration or
(b) a justification provided by the selected label provider for a label of the one or more labels.

5. The system as recited in claim 1, wherein the one or more training enhancement actions comprise modifying a size of a pool of label providers from which labeling feedback is to be obtained.

6. A method, comprising:
performing, by one or more computing devices:
determining, corresponding to individual ones of a plurality of classifier training iterations, respective sets of status indicators, wherein a first set of status indicators includes at least a representation of a trend of a particular training metric over a plurality of classifier training iterations;
causing, in response to a request obtained via an interactive programmatic interface, a first visualization data set corresponding to at least one set of status indicators to be presented via an interactive programmatic interface;
initiating, subsequent to presentation of the first visualization data set, one or more training enhancement actions, wherein a particular training enhancement action comprises selecting, based at least in part an objective associated with a particular status indicator, one or more data items for which respective labeling feedback is to be obtained programmatically in a subsequent classifier training iteration; and
storing a classification model trained using a training set which includes at least one label obtained as a result of implementation of the particular training enhancement action.

7. The method as recited in claim 6, further comprising performing, by one or more computing devices:
obtaining, based at least in part on input received via the interactive programmatic interface, an indication of a set of training metrics of which respective status indicators are to be provided via the interactive programmatic interface, wherein the visualization data set comprises at least one status indicator of the respective status indicators.

8. The method as recited in claim 7, wherein the set of training metrics comprises one or more of: (a) a positive predictive value (PPV), (b) a negative predictive value (NPV), (c) an accuracy, (d) a prevalence, (e) a precision, (f) a false discovery rate, (g) a false omission rate, (h) a recall, (i) a sensitivity, (j) a diagnostic odds ratio, or (k) an F1 score.

9. The method as recited in claim 6, further comprising performing, by the one or more computing devices:
providing an indication, in response to input received via the interactive programmatic interface, of a difference in training data sets between a first classifier training iteration and a second classifier training iteration of the plurality of classifier training iterations.

10. The method as recited in claim 6, further comprising performing, by the one or more computing devices:
providing, based at least in part on an analysis of a difference in training data sets between a first classifier training iteration and a second classifier training iteration of the plurality of classifier training iterations, an indication of one or more candidate explanatory factors associated with a difference in training metrics between the first and second classifier training iterations.

11. The method as recited in claim 6, further comprising performing, by the one or more computing devices:
causing an indication of results of a set of diagnosis tests, with respect to one or more classifier training iterations of the plurality of classifier training iterations, to be presented via the interactive programmatic interface, wherein a first diagnosis test of the set of diagnosis tests comprises determining whether a particular first status indicator meets a threshold condition.

12. The method as recited in claim 11, further comprising performing, by the one or more computing devices:
causing, with respect to a particular diagnosis test of the set of diagnosis tests whose result does not meet a threshold criterion, an explanation of a recommended remedial action to be presented via the interactive programmatic interface;
determining that the recommended remedial action has been approved; and
initiating the recommended remedial action.

13. The method as recited in claim 11, further comprising performing, by the one or more computing devices:
identifying at least one diagnosis test of the set of diagnosis tests based at least in part on input received via the interactive programmatic interface.

14. The method as recited in claim 11, further comprising performing, by the one or more computing devices:
detecting that a directive to optimize classifier training iterations in an automated mode has been indicated via the interactive programmatic interface; and
automatically initiating, without receiving a request pertaining to a particular diagnosis test whose result does not meet a threshold criterion, a remedial action pertaining to the particular diagnosis test.

15. The method as recited in claim 6, further comprising performing, by the one or more computing devices:
causing an indication of a difference between (a) a previously-provided label for a particular data item and (b) a predicted class label of the particular data item to be indicated via the interactive programmatic interface.

16. A non-transitory computer-accessible storage medium storing program instructions that when executed on one or more processors cause the one or more processors to:
determine, corresponding to individual ones of a plurality of classifier training iterations, respective sets of metrics;
cause a first visualization data set to be presented via an interactive programmatic interface, wherein the first visualization data set comprises of results of one or more diagnosis tests, wherein a first diagnosis test of the set of diagnosis tests comprises determining whether a particular metric of the respective sets of metrics meets a threshold condition;
determine, based at least in part on a result of the first diagnosis test, whether to initiate one or more additional classifier training iterations.

17. The non-transitory computer-accessible storage medium as recited in claim 16, wherein the particular metric includes a count of a respective number of labels corresponding to one or more target classes of a classifier, wherein the labels corresponding to the one or more target classes are part of a training set for a particular classifier training iteration, wherein at least a subset of the labels corresponding to the one or more target classes is obtained in one or more labeling sessions from one or more label providers.

18. The non-transitory computer-accessible storage medium as recited in claim 17, wherein the subset of the labels is obtained asynchronously with respect to a start or end of an individual classifier training iteration of the plurality of classifier training iterations.

19. The non-transitory computer-accessible storage medium as recited in claim 16, wherein an individual classifier training iteration of the plurality of classifier training iterations comprises training one or more of: (a) a binary classifier or (b) a multi-class classifier.

20. The non-transitory computer-accessible storage medium as recited in claim 16, wherein the instructions when executed on the one or more processors cause the one or more processors to:
determine, based at least in part on programmatic input, the first diagnosis test, wherein the determination to initiate an additional training iteration is based at least in part on programmatic input overriding a result of the first diagnosis test.

* * * * *